(12) United States Patent
Miura et al.

(10) Patent No.: US 8,080,957 B2
(45) Date of Patent: Dec. 20, 2011

(54) MOTOR CONTROL DEVICE AND MOTOR-DRIVEN POWER STEERING SYSTEM USING THE SAME

(75) Inventors: Tomohiro Miura, Maebashi (JP); Masahiro Maeda, Maebashi (JP); Yousuke Imamura, Maebashi (JP); Lilit Kovudhikulrungsri, Maebashi (JP)

(73) Assignee: NSK, Ltd., Tokyo (JP)

( * ) Notice: Subject to any disclaimer, the term of this patent is extended or adjusted under 35 U.S.C. 154(b) by 559 days.

(21) Appl. No.: 12/296,661

(22) PCT Filed: Apr. 11, 2007

(86) PCT No.: PCT/JP2007/058005
§ 371 (c)(1),
(2), (4) Date: Oct. 9, 2008

(87) PCT Pub. No.: WO2007/119755
PCT Pub. Date: Oct. 25, 2007

(65) Prior Publication Data
US 2009/0167224 A1    Jul. 2, 2009

(30) Foreign Application Priority Data

Apr. 11, 2006  (JP) .................................. 2006-109134
Sep. 4, 2006  (JP) .................................. 2006-239271

(51) Int. Cl.
*H02P 6/10*    (2006.01)
(52) U.S. Cl. .............. 318/400.23; 318/400.01; 318/700; 318/807; 318/808; 318/825
(58) Field of Classification Search ............. 318/400.23, 318/400.01, 700, 807, 808, 825, 727
See application file for complete search history.

(56) References Cited

U.S. PATENT DOCUMENTS

| | | | |
|---|---|---|---|
| 6,727,669 B2 * | 4/2004 | Suzuki et al. ................. | 318/139 |
| 6,927,548 B2 * | 8/2005 | Nishizaki et al. ............. | 318/432 |
| 7,187,154 B2 * | 3/2007 | Ta et al. ........................ | 318/799 |
| 7,240,761 B2 * | 7/2007 | Nagase et al. ................ | 180/443 |
| 7,339,346 B2 | 3/2008 | Ta et al. | |

(Continued)

FOREIGN PATENT DOCUMENTS

JP    61-231894 A    10/1986

(Continued)

OTHER PUBLICATIONS

International Search Report dated Jul. 17, 2007 (two (2) pages).
Form PCT/IB/338 (one (1) page); Form PCT/IB/373 (one (1) page) and Form PCT/ISA/237 (four (4) pages) totaling (six (6) pages), 2007.

*Primary Examiner* — Walter Benson
*Assistant Examiner* — David Luo
(74) *Attorney, Agent, or Firm* — Crowell & Moring LLP

(57) ABSTRACT

An object of the present invention is to provide a motor control device capable of suppressing voltage composite vector fluctuation to increase the output of a brushless motor, and a motor-driven power steering system using this device. The present control device calculates motor phase current command values based on a target current and a rotor rotational position detection value, calculates voltage command values based on the motor phase current command values and phase current detection values, and supplies phase currents to a three-phase brushless motor based on the voltage command values. The present control device outputs the phase current command values so that the absolute value of a composite vector of respective phase drive voltages is substantially a value $\sqrt{3}/2$ times the power supply voltage.

20 Claims, 24 Drawing Sheets

U.S. PATENT DOCUMENTS

| | | | |
|---|---|---|---|
| 7,383,110 B2 * | 6/2008 | Suzuki | 701/41 |
| 7,443,131 B2 * | 10/2008 | Ta et al. | 318/807 |
| 7,548,035 B2 * | 6/2009 | Endo et al. | 318/432 |
| 2008/0018277 A1 | 1/2008 | Ta et al. | |
| 2008/0018278 A1 | 1/2008 | Ta et al. | |

FOREIGN PATENT DOCUMENTS

| | | |
|---|---|---|
| JP | 2001-54300 A | 2/2001 |
| JP | 2003-199390 A | 7/2003 |
| JP | 2004-201487 A | 7/2004 |
| JP | 2006-158198 A | 6/2006 |

\* cited by examiner

TORQUE RIPPLE (ELECTRICAL ANGLE SIXTH-ORDER COMPONENT) MEASUREMENT RESULTS

TORQUE RIPPLE (MAX-MIN) MEASUREMENT RESULTS

AVERAGE TORQUE MEASUREMENT RESULTS

MOTOR CONTROL DEVICE AND MOTOR-DRIVEN POWER STEERING SYSTEM USING THE SAME

TECHNICAL FIELD

The present invention relates to a motor control device for controlling a three-phase brushless motor with back electromotive voltages having harmonic components superimposed therein, i.e., what is called a harmonic motor, and to a motor-driven power steering system using the motor control device.

BACKGROUND ART

As a control device for this kind of three-phase brushless motor with induced voltages having harmonic components superimposed therein, for example, a motor drive control device proposed by the present applicant in the past, which comprises: a vector control phase command value calculation unit that calculates a phase current command value for each phase of a motor using vector control; a motor current detection unit that detects a motor phase current for each phase of the motor; and a current control unit that controls phase currents of the motor based on the phase current command values and the motor phase currents, wherein the vector control phase command value calculation unit includes: a respective phase-counter electromotive voltage calculation unit that calculates a counter electromotive voltage for each phase; a d-q voltage calculation unit that calculates voltages ed and eq, which are d-axis and q-axis components of a counter electromotive voltage from the back electromotive voltages of the respective phases; a q-axis target current calculation unit that calculates a current command value Iqref, which is a q-axis component, from the voltages ed and eq; a d-axis target current calculation unit that calculates a current command value Idref, which is a d-axis component; and a respective phase-current command calculation unit that calculates a phase current command value for each phase from the current command values Iqref and Idref is known (see, for example, Japanese Patent Laid-Open No. 2004-201487).

DISCLOSURE OF THE INVENTION

However, in the conventional art example described in the above Patent Document 1 above an energy balance equation is applied to calculate a q-axis current Iq that determines a motor torque, based on the current command value Iref and a rotor electrical angle θ, induced voltage models (EMF: Electromotive Force) eq(θ) and ed(θ), and d-axis current Id, and accordingly, it is possible to control the torque to be constant even for a three-phase brushless motor with induced voltages containing harmonic waves. However, the aforementioned conventional art example has an outstanding problem in that when the torque of a harmonic motor is controlled to be constant, the motor drive voltage waveforms necessary for applying the currents are substantially distorted according to the harmonic waves of the induced voltages, and as a result, the power supply voltage cannot effectively be used, hindering enhancement of the motor output. Here, the motor drive voltage waveforms where the power supply voltage is effectively used indicate that a composite voltage vector of drive voltages for three phases is constant.

In other words, in the aforementioned conventional art example, the three-phase motor back electromotive voltage waveforms are converted into biaxial rotational coordinates, and accordingly, when back electromotive voltages EMFu, EMFv and EMFw, shown in FIG. 18, which contain the fifth or seventh-order harmonic components involved in the motor torque, are converted into back electromotive voltages $e_d$ and $e_q$ in the d and q-axes of a rotor rotational coordinate system, the back electromotive voltages $e_d$ and $e_q$ as shown in FIG. 19, have sin waveforms six times the electrical angular velocity, which are shifted from each other by 90 degrees. Here, in the case of a sine-wave motor with back electromotive voltages not containing harmonic waves, the back electromotive voltage $e_d$ and $e_q$ of the d and q-axes have constant values.

Where a q-axis current $I_q$ is calculated according to the conditional expression for a constant torque indicated by follows Eq. (1) below and according to expression follows Eq. (2) below, using the back electromotive voltages $e_d$ and $e_q$, the q-axis current $I_q$, as shown in FIG. 20, contains a 6n-th (n=1, 2, 3 ...) order harmonic component (the d-axis current $I_d$ is a direct-current value including "0" and is 50 A in FIG. 20).

[Formula 1]

$$T\omega_m = (2/3)K_t i_{ref}\omega_m = i_u e_u + i_v e_v + i_w e_w = i_q e_q = i_d e_d \quad (1)$$

$$i_q = \frac{\frac{2}{3}K_t i_{ref}\frac{1}{p}\omega_e - e_d i_d}{e_q} \quad (2)$$

Here, T is a motor torque, $\omega_m$ is a motor mechanical velocity, $K_t$ is a motor torque constant, $i_{ref}$ is a motor torque command current, $i_u$ is a U-phase current, $i_v$ is a V-phase current, $i_w$ is a W-phase current, $e_u$ is a U-phase back electromotive voltage (EMF), $e_v$ is a V-phase back electromotive voltage (EMF), $e_w$ is a W-phase back electromotive voltage (EMF), $I_q$ is a q-axis current, $I_d$ is a d-axis current, $e_q$ is a q-axis back electromotive voltage (EMF) and $e_d$ is a d-axis back electromotive voltage (EMF).

The motor drive voltages in this case, which are calculated according to a motor characteristic equation indicated in follows Eq. (3) below, are shown in FIG. 21.

[Formula 2]

$$\begin{bmatrix} V_d \\ V_q \end{bmatrix} + \begin{bmatrix} R + \frac{d}{dt}L & \omega_e L \\ -\omega_e L & R + \frac{d}{dt}L \end{bmatrix} \begin{bmatrix} i_d \\ i_q \end{bmatrix} + \begin{bmatrix} e_d \\ e_q \end{bmatrix} \quad (3)$$

At this time, the absolute value of the composite voltage vector of the motor drive voltage waveforms, which is expressed by follows Eq. (4) below, fluctuates as shown in FIG. 22. The absolute value of the vector expressed by follows Eq. (4) is voltage energy applied to the motor, and accordingly, occurrence of a ripple in it means that the voltage is not effectively used with regard to the shaded portions in FIG. 22.

[Formula 3]

$$|V| = \sqrt{V_d^2 + V_q^2} \quad (4)$$

This deteriorates the rotation performance of a harmonic motor because a voltage has a large influence on the rotation performance of a motor.

Also, in recent years, there has been an increased need for motor-driven power steering systems, and thrust enhancement and noise lowering thereof. In particular, greater noise lowering is required for a column-type motor-driven power steering system since the system is arranged close to a driver. In order to provide a high thrust, it is necessary to increase the torque of a motor-driven motor used in a motor-driven power steering system. However, since a high-torque motor has a high torque constant, the torque ripple is increased which leads to deterioration in vibration and noise. Therefore, there is a demand for a system that maintains a favorable torque ripple property and also outputs high power without an increase in size.

In order to meet that demand, the present applicant proposed in the past a motor drive device and a motor-driven power steering system, configured so that: back electromotive voltages ea, eb and ec for the respective phases are calculated based on a rotor rotational angle θe and an electrical angular velocity ωe, using a conversion table; a torque is increased by making these back electromotive voltages ea, eb and ec have a rectangular waveform or pseudo-rectangular waveform of a n-th order high harmonic wave; the back electromotive voltages ea, eb and ec are subjected to three-phase/two-phase conversion to calculate a d-axis back electromotive voltage ed and a q-axis back electromotive voltage eq; a d-axis command value current Idref is calculated based on a torque command value Tref and the electrical angular velocity ωe; in order to suppress a torque ripple, a q-axis command value current Iqref is calculated based on follows Eq. (1) below, by applying an energy balance equation for a motor; these d-axis command value current Idref and q-axis command value current Iqref are subjected to two-phase/three-phase conversion to calculate current command values for a to c phases; and feedback control is performed based on the a to c-phase current command values to drive an electric motor have been proposed (see Japanese Patent Laid-Open No. 2006-158198).

$$Iqref=(\tfrac{2}{3}Tref \times \omega m - ed \times Idref)/eq \qquad (5)$$

Here, ωm is a mechanical angular velocity, which is a value obtained by dividing the electrical angular velocity we by the number of pole pairs P in the motor (=ωe/P).

However, the aforementioned conventional art example described in Japanese Patent Laid-Open No. 2006-158198 has an outstanding problem in that since induced voltages (EMF: Electromotive Force) $e_q$ and $e_d$ are calculated based on a rotor electrical angle θe and an electrical angular velocity ωe, applying an energy balance equation, a d-axis current command value $I_{dref}$ is calculated based on a torque command value Tref and the electrical angular velocity ωe, and a q-axis current command value $I_{qref}$, which determines a motor torque, is calculated from these induced voltages $e_q$ and $e_d$ and the d-axis current command value $I_{dref}$, the induced voltages $e_q$ and $e_d$ are functions of the motor electrical angle θe, and when current is actually applied to the motor, an armature reaction due to an armature magnetomotive force generated inside the motor by means of this applied current, and the magnetization characteristics of the stator distort the induced voltages, and accordingly, where the distortion factor is large, a torque ripple corresponding the distortion is generated Therefore, the present invention has been made focusing on the aforementioned outstanding problems in the conventional art examples, and a first object of the present invention is to provide a motor control device capable of increasing a motor output by suppressing fluctuations of a voltage composite vector as a result of actively controlling a d-axis current Id, which is not involved in generated torque, to shape the waveforms of motor drive voltages, and a motor-driven power steering system using this device.

Also, the present invention has been made focusing on the aforementioned outstanding problems in the conventional art examples, and a second object of the present invention is to provide a motor drive control device capable of effectively suppressing a torque ripple by controlling the driving of an electric motor in consideration of distortion of back electromotive voltages due to an armature magnetic field in the electric motor, and a motor-driven power steering system using this device.

In order to achieve the aforementioned first object, a motor control device is characterized by comprising: phase current detection means for detecting phase currents in a three-phase brushless motor; rotor rotational position detection means for detecting a rotational position of a rotor in the three-phase brushless motor; target current setting means for setting a target current for the three-phase brushless motor, and outputting motor phase current command values based on the target current and the rotor rotational position detected by the rotor rotational position detection means; drive voltage control means for controlling drive voltages based on the motor phase current command values output from the target current setting means and the phase currents detected by the phase current detection means; and a motor drive circuit that supplies phase currents to the three-phase brushless motor based on the drive voltages of the drive voltage control means, wherein the target current setting means is configured to output phase current command values that do not cause torque fluctuation, and provide an absolute value of a composite vector of the drive voltages of the respective phases that is substantially constant and corresponds to a value in the neighborhood of a value √3/2 times a power supply voltage including the value √3/2 times the power supply voltage.

In the invention, the phase currents $i_u$, $i_v$ and $i_w$ are determined so as to make $T\omega_m$ on the left-hand side of the energy balance equation in the above Eq. (1) constant, enabling calculation of phase current command values that do not cause torque fluctuation, and the absolute value of a composite vector of drive voltages for the respective phases is substantially constant and substantially corresponds to a value √3/2 times the power supply voltage, enabling effective use of a power supply voltage VR supplied from the motor drive circuit to the three-phase brushless motor. In other words, the voltage that can be applied to the U, V and W phases of the three-phase brushless motor is 0 to VR, and when each phase is expressed by a voltage vector, as shown in FIG. 23, phase voltages Vu, Vv and Vw are expressed by three phase vectors shifted from each other by 120 degrees. The voltage vector range that may be taken by the composite vector of these phase voltages Vu, Vv and Vw is the hatched area in FIG. 23, and the range in this area that can make the absolute value of the composite vector constant is within a range of up to power supply voltage×√3/2. Thus, the absolute value of the composite vector is set to a value in the neighborhood of a value √3/2 times the power supply voltage including the value √3/2 times the power supply voltage, enabling provision of a constant absolute value for the composite vector and effective use of the power supply voltage.

Also, a motor control device is characterized by comprising: phase current detection means for detecting phase currents in a three-phase brushless motor; rotor rotational position detection means for detecting a rotational position of a rotor in the three-phase brushless motor; target current setting means for setting target phase currents for the three-phase brushless motor, and outputting motor phase current command values based on the target phase currents and the rotor rotational position detected by the rotor rotational position detection means; drive voltage control means for controlling drive voltages based on the phase current command values output from the target current setting means and the phase currents detected by the phase current detection means; and a motor drive circuit that supplies phase currents to the three-phase brushless motor based on the drive voltages of the drive voltage control means, wherein the target current setting means includes lead angle control means for, when back electromotive voltages contain a harmonic component other than a fundamental wave component, performing lead angle control of waveforms of the phase current command values to enhance motor rotation performance for waveforms of the back electromotive voltages, and is configured to output phase current command values that do not cause torque fluctuation, and provide an absolute value of a composite vector of the drive voltages of the respective phases that is substantially constant and corresponds to a value in the neighborhood of a value $\sqrt{3}/2$ times a power supply voltage including the value $\sqrt{3}/2$ times the power supply voltage, during the lead angle control by the lead angle control means.

In the invention, even when lead angle control to enhance the motor rotation performance is performed by the lead angle control means, it is possible to cause no torque fluctuation, provide a substantially constant absolute value for the composite vector, and effectively use the power supply voltage.

Furthermore, a motor control device is characterized in that the target current setting means is configured to perform current control via a d-q coordinates obtained by conversion into two axes of a rotor rotation coordinate system based on the target current and the rotor rotational position detected by the rotor rotational position detection means.

In the invention, current control is performed via d-q coordinates to control the composite voltage vector $|V|(=\sqrt{(Vd^2+Vq^2)})$ of a d-axis voltage Vd and a q-axis voltage Vq to be constant, enabling the d-axis current to be controlled so that the variations of the d-axis voltage Vd and the 9-axis voltage Vq are close to meeting a condition related to a circle while a conditional expression for a constant torque being satisfied.

Still furthermore, a motor control device is characterized in that the target current setting means is configured to perform current control via a d-q coordinates obtained by conversion into two axes of a rotor rotation coordinate system based on the target current and the rotor rotational position detected by the rotor rotational position detection means, and includes a d-axis current determination means for calculating an alternate-current d-axis current value that provides driving at a frequency six times one cycle for an electrical angle and in a phase that is opposite or the same as that of an absolute value of a q-axis current based on at least the target current, the rotor electrical angle, a rotor electrical angular velocity and motor constant information, and q-axis current determination means for calculating a q-axis current based on the d-axis current value determined by the d-axis current determination means, the target current, the rotor electrical angle and the motor constant information, according to a conditional expression for a constant torque, and determines the motor phase current command values so that motor drive voltage waveforms that provide small fluctuation of an absolute value for a composite vector of drive voltages of the respective phases, the motor drive voltage waveforms suppressing torque fluctuation and effectively using a power supply voltage, are provided.

In the invention, when a d-axis current Id and a q-axis current Iq that provide a constant composite voltage vector are calculated, the calculation is complicated and the solution is hard to be obtained, and therefore, each of the voltage waveforms of the d-axis voltage Vd and the q-axis voltage Vq are approximated by the form of a vibration term of direct current+rotor electrical angle multiplied by six. In this case, the signs of the values of the q-axis current Iq and the q-axis voltage Vq may be opposite depending on the motor rotation direction. Here, description is made based on the premise that the q-axis current Iq and the q-axis voltage Vq are positive. The d-axis voltage Vd and the q-axis voltage Vq are made to have phases opposite each other and the direct-current component proportion is made to be in a converse relationship with the alternate-current component proportion of the both, as an amplitude condition, enabling the d-axis voltage Vd and the q-axis voltage Vq to be set so as for the composite voltage vector to move on a tangent to a circle that makes the composite voltage vector constant, and in order to set such d-axis voltage Vd and q-axis voltage Vq, the d-axis current Id and the q-axis current Iq have phases opposite each other, and the d-axis current Id is calculated by calculating the amplitude of the alternate component of the d-axis current Id, and the q-axis current Iq is calculated based on this d-axis current Id, the target current, the rotor electrical angle and a back electromotive voltage model, according to the conditional expression for a constant torque.

Contrary to the aforementioned motor rotation direction, when the q-axis current Iq and the q-axis voltage Vq are negative, the vibration term of the d-axis current Id is calculated using the absolute value of the q-axis current Iq or the d-axis current Id and the q-axis current Iq are made to have the same phase.

As a result, the motor phase current command values can be determined to provide motor drive voltage waveforms that provide small fluctuation of an absolute value for a composite vector of drive voltages of the respective phases, the motor drive voltage waveforms suppressing torque fluctuation and effectively using a power supply voltage.

Still furthermore, a motor control device is characterized in that the alternate-current d-axis current determination means is provided in advance with a control map indicating a relationship between the target current and d-axis amplitude, and is configured to calculate the d-axis amplitude of the alternate-current d-axis current value from the target current with reference to the control map.

In the invention, the amplitude of the alternate-current d-axis current value is calculated from the target current using the control map, and accordingly, the amplitude of the alternate-current d-axis current value can easily be calculated without complicated calculation, enabling substantial reduction of the load for calculating the d-axis current Id.

Also, a motor control device is characterized in that the target current setting means is configured to perform current control via a d-q coordinates obtained by conversion into two axes of a rotor rotation coordinate system based on at least the target currents and the rotor rotational position detected by the rotor rotational position detection means, and includes a direct-current d-axis current determination means for determining a direct-current d-axis current value from a relationship between the target currents and a rotor angular velocity, an alternate-current d-axis current determination means for calculating an alternate-current d-axis current value that provides driving at a frequency six times one cycle for an electrical angle and in a phase that is opposite or the same as that of an absolute value of a q-axis current based on at least the target currents, the rotor electrical angle, a rotor electrical angular velocity and motor constant information, and q-axis current determination means for calculating a q-axis current based on the direct-current d-axis current value, the alternate-current d-axis current value, the target currents, the rotor electrical angle and the motor constant information, according to a conditional expression for a constant torque, and determines the motor phase current command values so that motor drive voltage waveforms that provide small fluctuation of an absolute value for a composite vector of the drive voltages of the respective phases, the motor drive voltage waveforms suppressing torque fluctuation and effectively using a power supply voltage even during lead angle control, are provided.

In the invention, even when lead angle control is performed on a three-phase brushless motor by the lead angle control means, the d-axis current Id and the q-axis current Iq can be calculated.

Furthermore, a motor control device is characterized in that the alternate-current d-axis current determination means is provided in advance with a control map indicating a relationship between the target currents and d-axis amplitude, and is configured to calculate the d-axis amplitude of the alternate-current d-axis current value from the target currents with reference to the control map.

In the invention, the alternate-current d-axis current value where lead angle control is performed by the lead angle control means is calculated with reference to the control map, the alternate-current d-axis current value can easily be calculated without complicated calculation, enabling substantial reduction of the load for calculating the d-axis current Id.

Still furthermore, a motor-driven power steering system is characterized by controlling driving of a three-phase brushless motor that generates a steering auxiliary force for a steering system via the motor control device.

In the invention, a three-phase brushless motor that generates a steering auxiliary force for a motor-driven power steering system can optimally be driven effectively using the power supply voltage, and torque fluctuation provided to the steering system can be prevented, providing a favorable steering feeling.

Furthermore, in order to achieve the aforementioned second object, a motor drive control device provides a motor drive control device for driving an electric motor having a number of phases, the number being no less than three, characterized by comprising: a current command value calculation unit that calculates a current command value for driving the electric motor; and a vector control current command value calculation unit that calculates a phase current command value for each phase of the electric motor using vector control, wherein the vector control current command value calculation unit at least includes: a d-q axis back electromotive voltage calculation unit that calculates, from a back electromotive voltage of each phase of the electric motor, a d-axis back electromotive voltage and a q-axis back electromotive voltage that are a d-axis component and a q-axis component of an back electromotive voltage; a d-q axis current command value calculation unit that calculates a d-axis current command value and a q-axis current command value based on the d-axis back electromotive voltage, the q-axis back electromotive voltage, and the current command value, the d-q axis back electromotive voltage calculation unit being configured to calculate the d-axis back electromotive voltage and the q-axis back electromotive voltage using a motor electrical angle, a d-axis current value and a q-axis current value.

In the invention, the d-axis back electromotive voltage and the q-axis back electromotive voltage are calculated based on the motor electrical angle, the d-axis current value and the q-axis current value, enabling calculation including back electromotive voltage distortion relative to the motor phase currents, and the calculated d-axis back electromotive voltage and q-axis back electromotive voltage are used for calculation of the q-axis current command value, also enabling effective suppression of a torque ripple due to back electromotive voltage distortion. Also, as a result of using the calculated d-axis back electromotive voltage and q-axis back electromotive voltage for calculation of the d-axis current command value, a decrease in the rotation speed increase effect by means of lead angle control can be suppressed.

Also, a motor drive control device is characterized in that the motor drive control device includes a motor current detection unit that detects a motor phase current for each phase of the electric motor, and the d-q axis back electromotive voltage calculation unit is configured to calculate the d-axis back electromotive voltage and the q-axis back electromotive voltage based on the d-axis current value and the q-axis current value obtained by performing n-phase/two-phase conversion of the motor phase currents detected by the motor current detection unit, and the motor electrical angle.

In the invention, the d-axis back electromotive voltage and the q-axis back electromotive voltage are calculated based on actual phase currents that actually flow in the electric motor, using the calculated d-axis current value and q-axis current value, and accordingly, the back electromotive voltages can be calculated with higher precision, enabling effective suppression of a torque ripple.

Furthermore, a motor drive control device is characterized in that the motor current detection unit is configured to estimate a phase current detection value for at least one phase based on a remaining phase current detection value.

In the invention, the phase current detection value for at least one phase from among the motor phase currents is estimated, and accordingly, the number of phase current detection units can be reduced, enabling manufacturing cost reduction.

Furthermore, a motor drive control device is characterized in that the d-q axis back electromotive voltage calculation unit is configured to calculate the d-axis back electromotive voltage and the q-axis back electromotive voltage based on the d-axis current command value and the q-axis current command value or command value information corresponding to the d-axis current command value and the q-axis current command value, and the motor electrical angle.

In the invention, the d-axis current command value and the q-axis current command value or command value information corresponding to these command values are used instead of the d-axis current value and the q-axis current value used in the d-q axis back electromotive voltage calculation unit, enabling reduction of the calculation load during calculation processing.

Still furthermore, a motor device control device is characterized in that the electric motor is a brushless motor.

Also, a motor device control device is characterized in that the back electromotive voltage of the electric motor is either a rectangular-wave back electromotive voltage or a pseudo-rectangular-wave back electromotive voltage with a sine wave containing a harmonic component.

In the invention, the electric motor is a brushless motor, and accordingly, when the back electromotive voltage of the brushless motor is made to have a rectangular wave, or a pseudo-rectangular-wave with a sine wave containing a harmonic component, to contain the harmonic component to raise the first-order component (fundamental wave component) of the back electromotive voltage among the coil phases, the back electromotive voltage constant rises as a result of the rise in the first-order component (fundamental wave component) of the interphase back electromotive voltage because the first-order component (fundamental wave component) is dominant in the magnitude of the back electromotive voltage constant. The torque relational expression for a brushless motor is expressed by follows Eq. (2) below, and as is clear from follows Eq. (2), a back electromotive voltage constant $K_e$ and a motor torque constant $K_T$ have the same value, and accordingly, the advantageous effect of enhancing the torque performance of the motor can be obtained, and a torque ripple can be suppressed by using the aforementioned driving control, even thought a harmonic wave is contained.

$$T_m = EMF \cdot I_m / \omega_m = K_e \cdot I_m = K_T \cdot I_m \quad (2)$$

Here, $T_m$=motor torque, EMF is back electromotive voltage among coil phases, $\omega_m$ is a motor angular velocity, $I_m$ is motor phase current, $K_e$ is an back electromotive voltage constant, and $K_T$ is a motor torque constant.

Furthermore, a motor-driven power steering system is characterized by controlling driving of an electric motor that generates a steering auxiliary force for a steering system, via the motor drive control device.

In the invention, the driving of an electric motor that generates a steering auxiliary force for a steering system is controlled via the motor drive control device, enabling provision of a low-noise, high-power motor-driven power steering system.

Still furthermore, a motor drive control device provides a motor drive control unit for driving an electric motor having n phases, n being no less than 3, characterized by comprising: a current command value calculation unit that calculates a current command value for driving the electric motor; a motor angle detection unit that detects a motor angle of the electric motor; a motor angular velocity detection unit that detects a motor angular velocity of the electric motor; and an back electromotive voltage calculation unit that calculates a compensation back electromotive voltage based on at least one of d-axis current and q-axis current values calculated according to the d-q coordinates rotating at the motor angular velocity, and the motor angular velocity and the motor angle, wherein feedforward compensation is performed for an back electromotive voltage of the electric motor using the compensation back electromotive voltage calculated by the back electromotive voltage calculation unit.

In the invention, the back electromotive voltage calculation unit generates a compensation back electromotive voltage based on at least one of the d-axis current and q-axis current values calculated according to the d-q coordinates rotating at the motor angular velocity, and the motor angular velocity and the motor angle, and feedforward compensation is performed using the generated compensation back electromotive voltage, and accordingly, an back electromotive voltage compensation error due to back electromotive voltage distortion at a high rotation speed and high current can be reduced, the actual current more closely follows the current command value, and a desired torque can be obtained and harmonic vibration due to a compensation error can be reduced.

Still furthermore, a motor drive control device is characterized in that the feedforward compensation for a back electromotive voltage is performed for each phase of the electric motor.

In the invention, the feedforward compensation for a back electromotive voltage is performed for each phase of the electric motor, a back electromotive voltage compensation error due to back electromotive voltage distortion at a high rotation speed and high current can reliably be reduced for each phase.

Also, a motor drive control device is characterized in that the feedforward compensation for a back electromotive voltage is performed on d-q coordinates that rotate at a frequency corresponding the motor angular velocity.

In the invention, the feedforward compensation for a back electromotive voltage is performed on the d-q coordinates, and accordingly, a back electromotive voltage compensation error can precisely be reduced regardless of the number of phases in the electric motor, enabling simplification of the entire configuration.

Furthermore, a motor device control device is characterized in that at least one of the d-axis current value and the q-axis current value input to the back electromotive voltage calculation unit is at least one of a d-axis current command value and a q-axis current command value calculated from the current command value, or command value information corresponding to at least one of the d-axis current command value and the q-axis current command value.

In the invention, at least one of a d-axis current command value and a q-axis current command value calculated from the current command value, or command value information corresponding to at least one of the d-axis current command value and the q-axis current command value is input to the back electromotive voltage calculation unit, and accordingly, a back electromotive voltage compensation value can be changed according to the current command value.

Still furthermore, a motor drive control device is characterized in that at least one of a d-axis current and a q-axis current input to the back electromotive voltage calculation unit is at least one of a d-axis current value and a q-axis current value obtained by performing n-phase/two-phase conversion of detection phase currents detected by the current detection unit via the d-q coordinates that rotate at a frequency corresponding to the motor angular velocity.

In the invention, at least one of a d-axis current value and a q-axis current value obtained by performing n-phase/two-phase conversion of detection phase currents detected by the current detection unit via the d-q coordinates that rotate at a frequency corresponding to the motor angular velocity is input to the back electromotive voltage calculation unit, and accordingly, an back electromotive voltage compensation value can be changed according to the detection current.

Still furthermore, a motor drive control device is characterized in that the back electromotive voltage of the electric motor is either a rectangular-wave back electromotive voltage or a pseudo-rectangular-wave back electromotive voltage with a sine wave containing a harmonic component.

In the invention, the back electromotive voltage waveform is made to be either a rectangular-wave or a pseudo-back electromotive voltage with a sine wave containing a harmonic component, and as a result, compared to the case where control is performed using a sine-wave current or a sine-wave voltage, the rectangular-wave current or rectangular-wave voltage have larger effective values if it has the current peak value or the voltage peak value that is the same as that of the sine-wave current or the sine-wave voltage, and accordingly, a large output (power) can be provided.

Also, a motor-driven power steering system is characterized by controlling driving of an electric motor that generates a steering auxiliary force for a steering system, via the motor drive control device.

In the invention, a back electromotive voltage compensation error, which is a current control system disturbance, is reduced and the actual current more closely follows the current command value, enabling provision of a desired torque, and also, harmonic vibration due to a compensation error is reduced, enabling provision of favorable steering performance.

According to the present invention, the target current setting means is configured to output phase current command values that do not cause a torque fluctuation, and provide an absolute value of a composite vector of the drive voltages of the respective phases that is substantially constant and corresponds to a value in the neighborhood of a value √3/2 times a power supply voltage including the value √3/2 times the power supply voltage, and accordingly, an advantageous effect can be obtained in that the power supply voltage can effectively be used with the torque kept constant.

Here, when the current is controlled by means of a d-q axis coordinate system, an advantageous effect can be obtained in that harmonic motor control that suppresses torque fluctuation by means of a d-axis current and effectively uses a power supply voltage can be performed by determining a q-axis current according to a conditional expression for a constant torque, driving the d-axis current in a phase opposite that of the q-axis current at a frequency six times one cycle of a rotor electrical angle, calculating a d-axis current value in a phase that is opposite or the same as that of the absolution value of the q-axis current, and calculating the q-axis current based on the calculated d-axis current value and according to the conditional expression for a constant torque.

Also, an adventurous effect can be obtained in that a three-phase brushless motor that generates an auxiliary steering force for a motor-driven power steering system can optimally be driven by effectively using a power supply voltage, preventing torque fluctuation provided to a steering system to give a good steering feeling.

Furthermore, since a vector control current command value calculation unit calculates a d-axis back electromotive voltage and a q-axis back electromotive voltage based on a motor electrical angle, a d-axis current value and a q-axis current value, the calculation can be performed including back electromotive voltage distortion relative to the motor phase currents, and accordingly, an advantageous effect can be obtained in that a torque ripple due to back electromotive voltage distortion can be effectively suppressed by using the calculated d-axis back electromotive voltage and the q-axis back electromotive voltage for calculation of a q-axis current command value.

Still furthermore, an advantageous effect can be obtained in that a low-noise, high-power motor-driven power steering system can be provided by controlling driving of an electric motor that generates a steering auxiliary force for a motor-driven power steering system, via the aforementioned motor drive control device.

Moreover, an advantageous effect can be obtained in that a back electromotive voltage compensation error, which is a current control system disturbance, can be reduced by calculating a compensation back electromotive voltage to perform feedforward compensation with this compensation back electromotive voltage, resulting in an actual current more closely following a current command value, enabling provision of a desired torque and reduction of harmonic vibration due to an compensation error.

Also, an advantageous effect can be obtained in that favorable steering performance can be provided by controlling the driving of an electric motor that generates a steering auxiliary force for a motor-driven power steering system, via the aforementioned motor drive control device.

BEST MODE FOR CARRYING OUT THE INVENTION

Hereinafter, embodiments of the present invention will be described with reference to the drawings.

Figure 1:
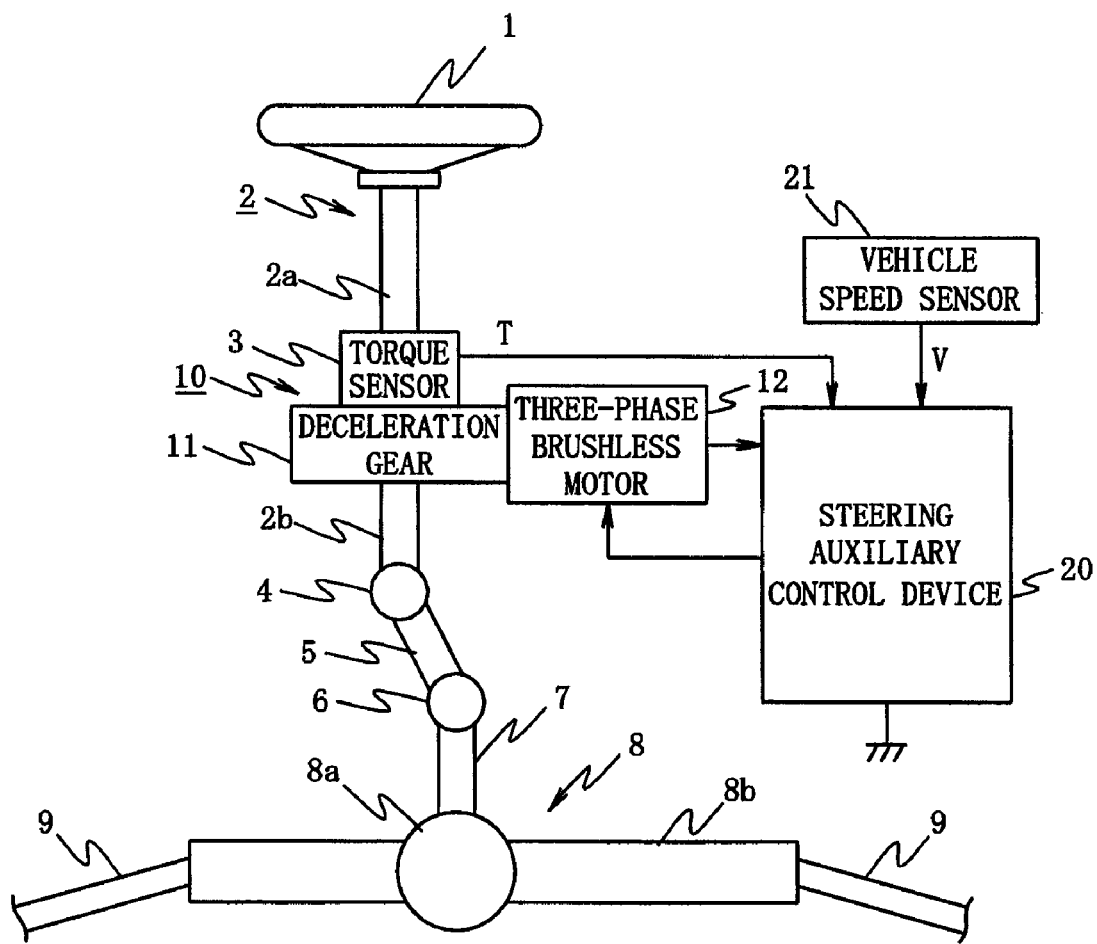
FIG. 1 is an overall configuration illustrating a first embodiment of the present invention.

FIG. 1 is an overall configuration of a first embodiment where the present invention is employed in a motor-driven power steering system, and in the Figure, reference numeral 1 denotes a steering wheel, and a steering force exerted by a driver to the steering wheel 1 is conveyed to a steering shaft 2 having an input shaft 2a and an output shaft 2b. One end of the input shaft 2a of this steering shaft 2 is connected to the steering wheel 1, and the other end is connected via a steering torque sensor 3 to one end of the output shaft 2b as steering torque detection means.

The steering force conveyed to the output shaft 2b is conveyed via a universal joint 4 to a lower shaft 5, and is further conveyed via a universal joint 6 to a pinion shaft 7. The steering force conveyed to this pinion shaft 7 is conveyed via a steering gear 8 to a tie rod 9 to turn steered wheels not shown. Here, the steering gear 8 is configured to have a rack-and-pinion structure having a pinion 8a connected to the pinion shaft 7 and a rack 8b that engages with this pinion 8a, and rotational motion conveyed to the pinion 8a is converted by the rack 8b into straight-ahead motion.

A steering auxiliary mechanism 10 that conveys a steering auxiliary force to the output shaft 2b is connected to the output shaft 2b of the steering shaft 2. This steering auxiliary mechanism 10 includes a deceleration gear 11 connected to the output shaft 2b, and a three-phase brushless motor 12, connected to this deceleration gear 11, that generates a steering auxiliary force.

The steering torque sensor 3, which detects a steering torque provided to the steering wheel 1 and conveyed to the input shaft 2a, is configured to detect a steering torque, for example, by converting the steering torque to a torsion angular displacement of a torsion bar, not shown, inserted between the input shaft 2a and the output shaft 2b and converting this torsion angle displacement to a resistance change or a magnetic change.

Figure 2:
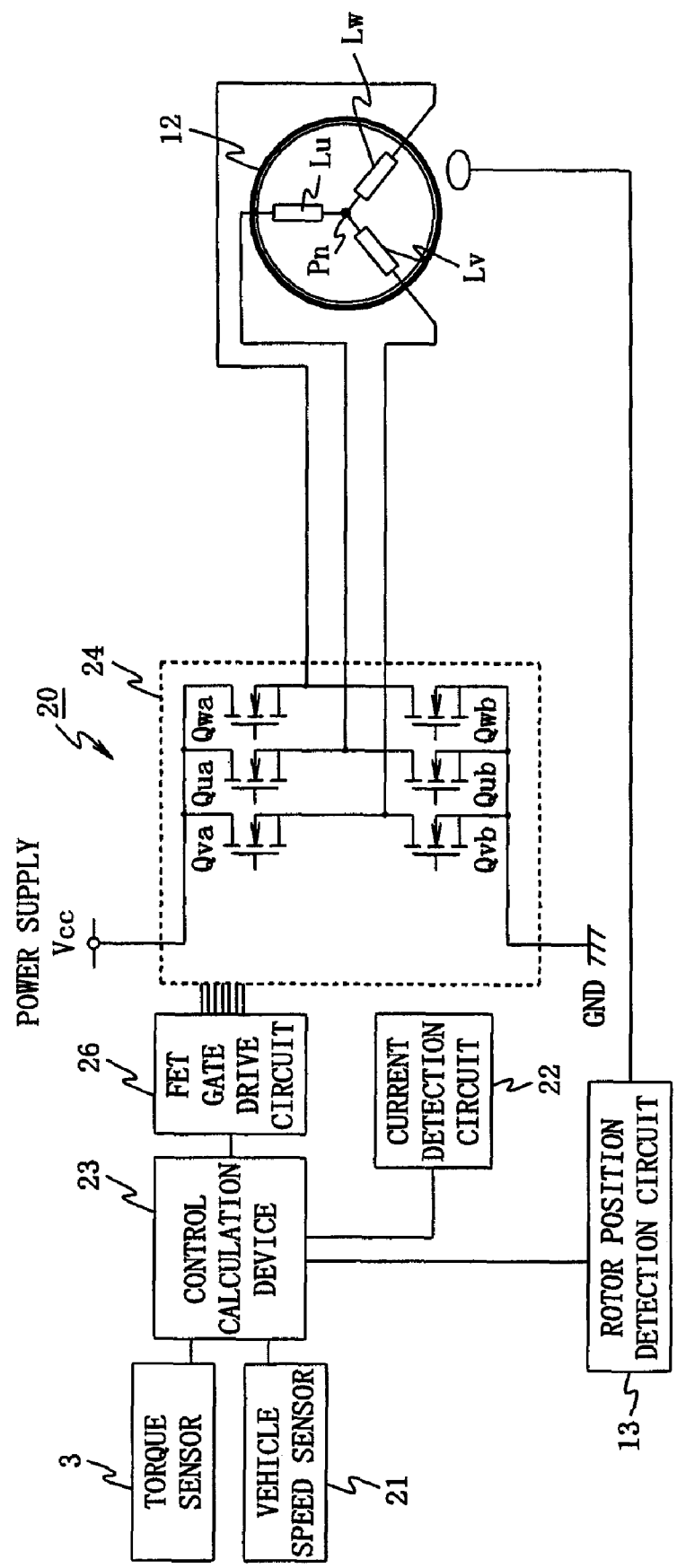
FIG. 2 is a block diagram illustrating an example of a motor control device.

Also, in the three-phase brushless motor 12, as shown in FIG. 2, the respective one ends of a U-phase coil Lu, a V-phase coil Lv and a W-phase coil Lw are interconnected to form a star connection, and the respective other ends of the coils Lu, Lv and Lw are connected to a steering auxiliary control device 20, and are respectively supplied with motor drive currents Iu, Iv and Iw. Also, the three-phase brushless motor 12 includes a rotor position detection circuit 13 consists of a resolver, a rotary encoder or the like which detects a rotational position of a rotor.

To the steering auxiliary control device 20, a steering torque T detected by the steering torque sensor 3 and a vehicle speed Vs detected by a vehicle speed sensor 21 are input, a rotor rotation angle θ detected by the rotor position detection circuit 13 is input, and motor drive current detection values Iud, Ivd and Iwd output from a motor current detection circuit 22 that detects motor drive currents Iu, Iv and Iw supplied to the respective phase coils Lu, Lv and Lw in the three-phase brushless motor 12 are input.

This steering auxiliary control device 20 includes: a control calculation device 23 that calculates a steering auxiliary target current value based on the steering torque T, the vehicle speed V, the motor current detection values Iud, Ivd and Iwd and the rotor rotation angle θ, and outputs motor voltage command values Vu, Vv and Vw; a motor drive circuit 24, including field-effect transistors (FETs), which drive the three-phase brushless motor 12; and a FET gate drive circuit 25 that control the gate currents of the field-effect transistors in the motor drive circuit 24 based on the phase voltage command values Vu, Vv and Vw output from the control calculation device 23.

Figure 3:
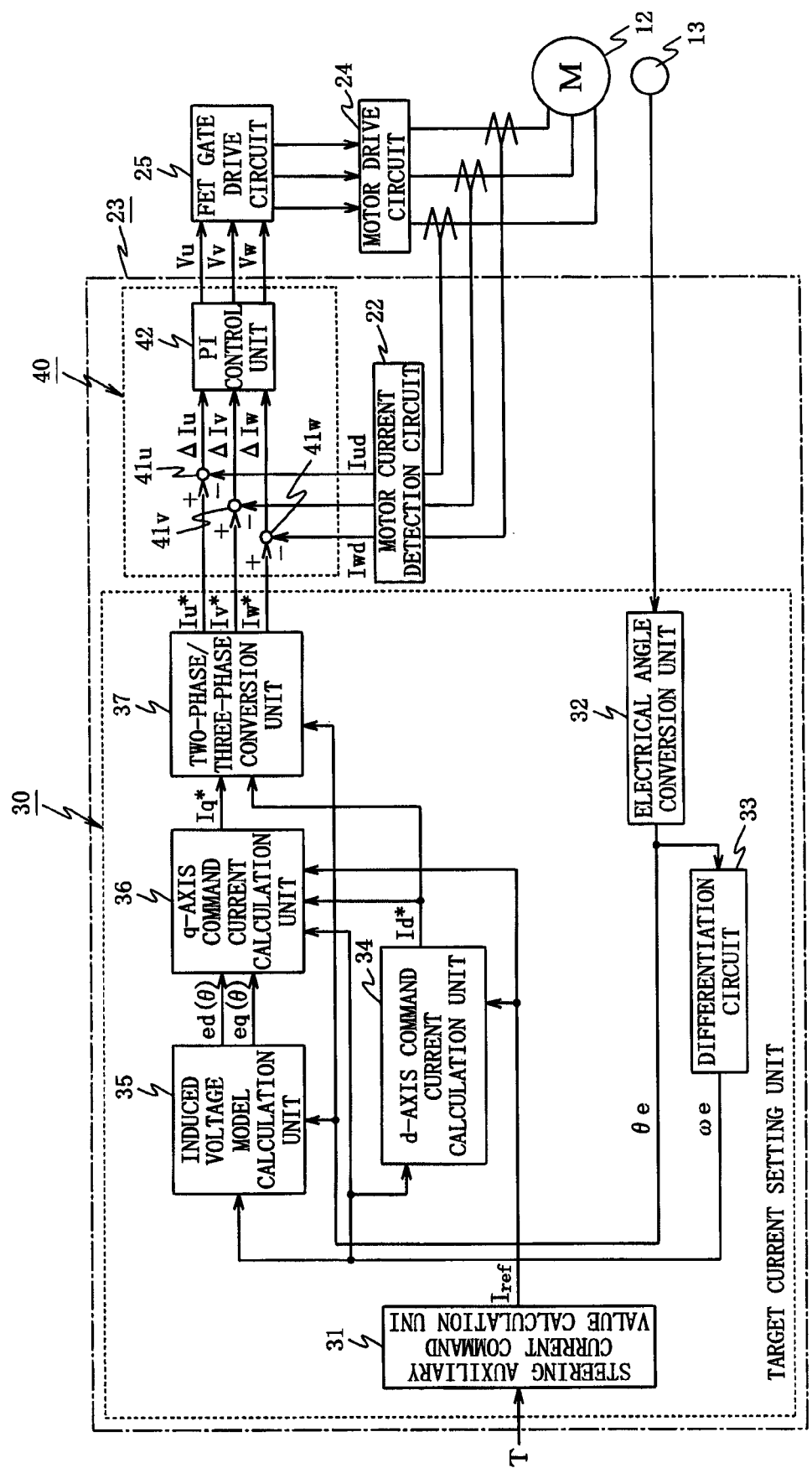
FIG. 3 is a block diagram illustrating a specific configuration of a control calculation device 23, which is shown in FIG. 2.

The control calculation device 23, as shown in FIG. 3, includes a target current setting unit 30 as target current setting means for, utilizing the excellent characteristics of vector control, performing the vector control of performing field weakening control to determine target current values $I_d(\theta)$ and $I_q(\theta)$, which are vector control d and q components that do not cause torque fluctuation in the three-phase brushless motor 12, and provide an absolute value of a composite vector of the respective phase drive voltages that is substantially constant and corresponds to a value in the neighborhood of a value $\sqrt{3}/2$ times a power supply voltage including the value $\sqrt{3}/2$ times the power supply voltage, and then converting these target current values $I_d(\theta)$ and $I_q(\theta)$ to respective phase target current command values Iu*, Iv* and Iw* corresponding the respective exciting coils Lu to Lw and outputting them; and a drive voltage control unit 40 as drive voltage control means for controlling a drive voltage by performing current feedback processing using the respective phase target current command values Iu*, Iv* and Iw* output from this target current setting unit 30 and the motor current detection values Iud, Ivd and Iwd detected by the motor current detection circuit 22.

Here, a basic principle of field weakening control to determine to the target current values $I_d(\theta)$ and $I_q(\theta)$, which do not cause torque fluctuation in the three-phase brushless motor 12, and provide an absolute value of a composite vector of the respective phase drive voltages that is substantially constant and corresponds to a value in the neighborhood of a value $\sqrt{3}/2$ times a power supply voltage including the value $\sqrt{3}/2$ times the power supply voltage will be described with reference to FIGS. 5 to 8.

First, the condition of not causing torque fluctuation, which is a first condition, is met by determining motor currents iu, iv and iw supplied to the exciting coils Lu, Lv and Lw in the three-phase brushless motor 12 so as to make the left-hand side $T\omega_m$ of the aforementioned energy balance equation in the above Eq. (1) be constant. This can be achieved by calculating a q-axis current $i_q$ from the aforementioned condition for a constant torque in the above Eq. (1) and according to follows Eq. (5) below.

[Formula 4]

$$i_q = \frac{\frac{2}{3}K_t i_{ref} \frac{1}{p}\omega_e - e_d i_d}{e_q} \quad (5)$$

Here, since a d-axis EMF component $e_{d0}$ can be expressed by $e_{d0}=e_d/\omega_e$, and a q-axis EMF component $e_{q0}$ can be expressed by $e_{q0}=e_{q0}/\omega_e$, the above Eq. (5) above can be transformed into follows Eq. (6) below, and Eq. (6) enables calculation of a q-axis current $i_q(\theta)$ according to the condition for a constant torque.

[Formula 5]

$$i_q(\theta) = \frac{\frac{2}{3}K_t i_{ref} \frac{1}{p}\omega_e - \omega_e e_{d0}(\theta) i_d(\theta)}{\omega_e e_{q0}(\theta)} = \frac{\frac{2}{3}\frac{1}{p}K_t i_{ref} - e_{d0}(\theta) i_d(\theta)}{e_{q0}(\theta)} \quad (6)$$

Figure 23:
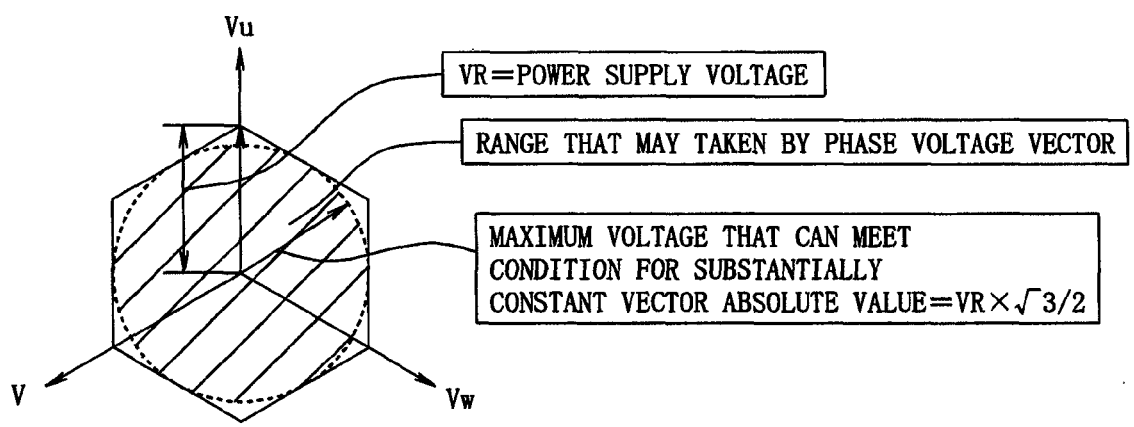
FIG. 23 is an explanatory diagram provided for description of a basic principle of the present invention.

Also, the condition of providing an absolute value of a composite vector of the respective phase drive voltages that is substantially constant and corresponds to a value in the neighborhood of a value √3/2 times a power supply voltage including the value √3/2 times the power supply voltage, which is a second condition, is a condition for effectively using a power supply voltage (battery voltage VR) supplied from an inverter included in a motor drive circuit 24, which will be described later.

Where the power supply voltage is defined to be VR, the voltages that can be applied to the respective U, V and W-phases of the three-phase brushless motor 12 is from 0 to VR, and where each phase is expressed in a voltage vector, vectors $v_u$, $v_v$, and $v_w$, as shown in FIG. 23, are expressed in three-phase vectors that are mutually shifted by 120 degrees. The voltage vector range that may be taken by a composite vector of these vectors $v_u$, $v_v$, and $v_w$ is the hatched area in FIG. 23, and the range of the area that can make the absolute value of the composite vector be constant is up to √3/2 times the power supply value. Accordingly, in order to most effectively use the voltage while meeting the condition of the absolute value of the composite vector being substantially constant, the absolute value is set to √3/2 times the power supply voltage.

Figure 8:
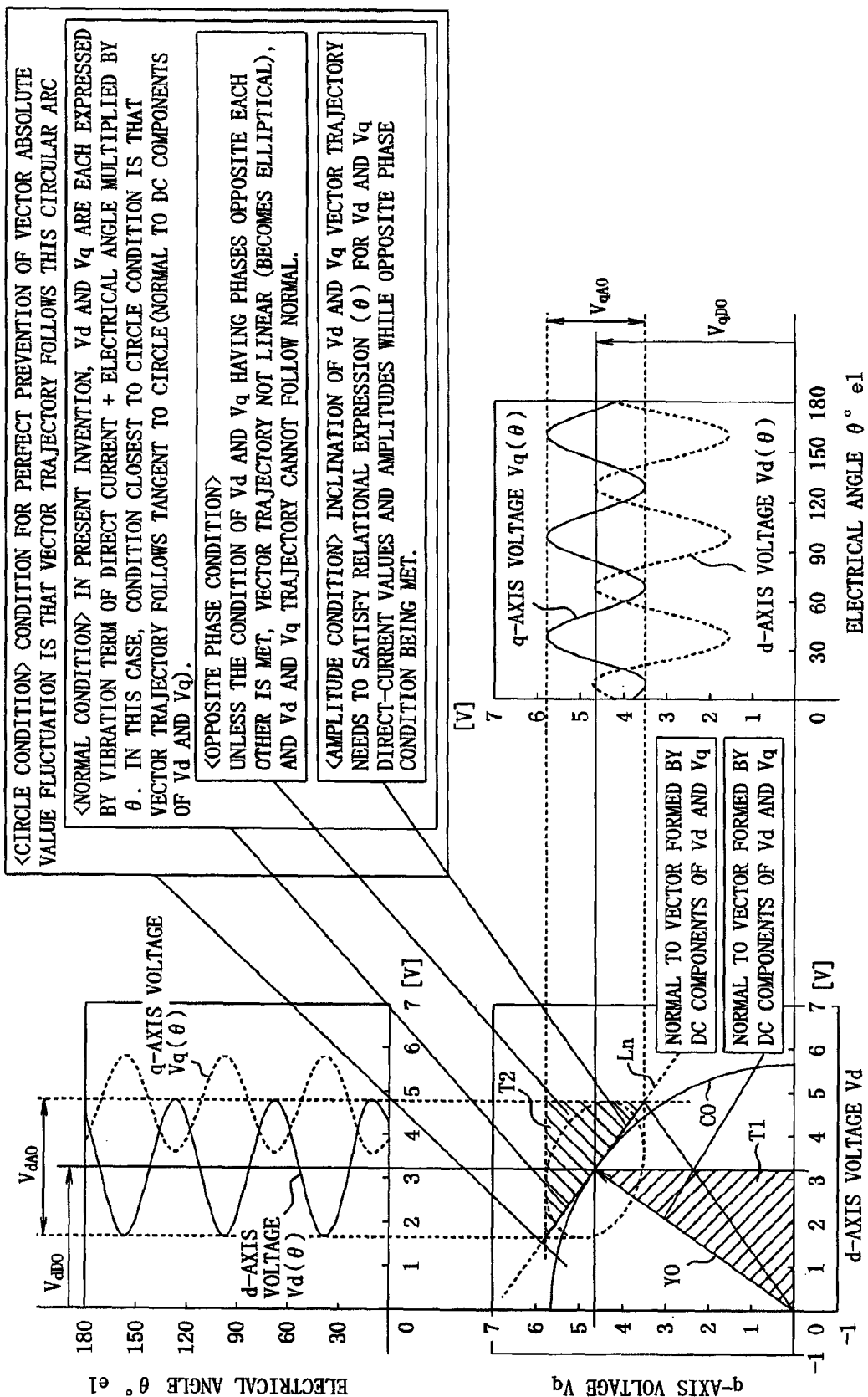
FIG. 8 is a waveform diagram provided for description of a basic principle of the present invention.

In order to meet this second condition, it is necessary that the vector trajectory in conversion into α-β be close to a circle, as shown in FIG. 8, and for that purpose, for meeting the condition of fluctuation of the absolute value $|V|=\sqrt{(Vd^2+Vq^2)}$ of the voltage composite vector of a d-axis voltage Vd and a q-axis voltage Vq in conversion into d-q being perfectly "0", as shown in FIG. 8, it is desirable that the vector trajectory drawn by the vector absolute value |V| follows a circle C0 with the origin (0, 0) as the center, which is indicated by a curve L1, but calculation to achieve such situation is so complicated that it is difficult to obtain the solution. Therefore, in the present embodiment, a d-axis current in which the voltage composite vector |V| is constant in a state close to the circle condition is calculated.

Hereinafter, for ease of description, the case where the d-axis current Id and the q-axis current Iq are both positive, that is, the rotation is unidirectional will be described.

In other words, in the present invention, paying attention on the fact that the d-axis voltage Vd and the q-axis voltage Vq are each expressed by the direct-current component+the vibration term of the electrical angle θ multiplied by six, the vector trajectory is set to follow a tangent to the circle (a normal to the direct-current components of the d-axis voltage Vd and the q-axis voltage Vq) as the condition closest to the circle condition.

In FIG. 8, as indicated by an arrow Y0, when considering the voltage composite vector |V| constituted by the direct-current components of the d-axis voltage Vd and q-axis voltage Vq, a d-axis current Id and a q-axis current Iq are set so that the voltage composite vector |V| moves on the tangent to the circle C0 at the intersection point of this voltage composite vector |V| and the circle C0 (normal Ln to the vector |V|).

As described above, in order for the composite vector |V| to move on the normal Ln, as shown in FIG. 8, where the d-axis voltage Vd(θ) and the q-axis voltage Vq(θ) have positive values, they need to have phases opposite each other, which are shifted from each other by 180 degrees, and the condition for the amplitudes of both is that a hatched triangle T1 constituted by a direct-current component $V_{dDC}$ of the d-axis voltage Vd and a direct-current component $V_{qDC}$ of the q-axis voltage Vq constituting the composite vector |V|, and a hatched triangle T2 constituted by the normal Ln, and the amplitude of an alternate-current component $V_{dAC}$ of the d-axis voltage Vd and the amplitude of an alternate-current component $V_{qAC}$ of the q-axis voltage Vq in FIG. 8 have figures similar to each other, and accordingly, the proportions between the direct-current components and the alternate-current components of the d-axis voltage Vd and the q-axis voltage Vq need to meet the normal condition expressed by follows Eq. (7) below.

[Formula 6]

$$\frac{V_{qAC}}{V_{dAC}} = \frac{\sqrt{v_{qc}^2 + v_{qs}^2}}{\sqrt{v_{dc}^2 + v_{ds}^2}} = \frac{V_{dDC}}{V_{qDC}} \quad (7)$$

Because of the condition for a constant torque, the q-axis current $i_q(\theta)$, as described above, is uniquely determined according to Eq. (6), and accordingly, it is necessary to set the d-axis current $i_d(\theta)$ so as to meet the second condition.

The d-axis voltage $V_d$ and the q-axis voltage $V_q$ can be calculated based on the d-axis current $i_d$ and the q-axis current $i_q$, and an electrical angular velocity ω, a motor resistance R and a motor inductance L, which are motor specifications, according to Eq. (3) mentioned above, but even though the d-axis voltage $V_d$ and the q-axis voltage $V_q$ are calculated by assigning the above Eq. (5) to the above Eq. (3), such calculation cannot be performed in a simple form because the above Eq. (5) includes differential terms and also the common denominators of the above Eq. (5) include $e_q$, resulting in the q-axis current $i_q$ containing infinite harmonic components.

Thus, in order to calculate the d-axis voltage $V_d$ and the q-axis voltage $V_q$, the d-axis current $i_d(\theta)$ and the q-axis current $i_q(\theta)$ can be approximated by follows Eq. (8) and (9) below, using the fact that the sixth-order harmonic component is dominant in the vibration components of the q-axis current $i_q(\theta)$.

[Formula 7]

$$i_d(\theta) = I_{dDC} + i_{dc}\cos(6\theta) + i_{ds}\sin(6\theta) \quad (8)$$

$$i_q(\theta) = I_{qDC} + i_{qc}\cos(6\theta) - i_{qs}\sin(6\theta) \quad (9)$$

provided that $$I_{qDC} = \frac{2K_t i_{ref}}{3pE_{qDC0}} \quad i_{qc} = \frac{2K_t i_{ref} e_{qAC0}}{3pE_{qDC0}^2} \quad i_{qs} = \frac{I_{dDC} e_{dAC0}}{E_{qDC0}}$$

Here, the above Eq. (9) above, the above Eq. (6) is further subjected to Taylor expansion to approximate the form of (direct current+vibration term of electrical angle $\theta_e$ multiplied by six).

In order to meet the aforementioned opposite phase condition, the d-axis current $i_d(\theta)$ has a phase opposite that of a d-axis current model defined by the above Eq. (8) above. In other words, the d-axis current $i_d(\theta)$ can be expressed as a d-axis current $i_d(\theta)$ having a phase component opposite that of the q-axis current $i_q(\theta)$, if it is defined by the form of follows Eq. (10) below, using the above Eq. (8).

[Formula 8]

$$i_d(\theta) = I_{dDC} - I_{dAmp}(i_{qc}\cos(6\theta) - i_{qs}\sin(6\theta)) \quad (10)$$

Here, $I_{dDC}$ is the direct-current component of a d-axis current, and $I_{dAmp}$ is an amplitude coefficient that determines the amplitude of the d-axis current. When the q-axis current $i_q(\theta)$ is calculated according to the above Eq. (9), the d-axis current $I_d$ is required, but since the phase and amplitude terms, which are undetermined parameters, affect an Iq model if they are of the components of the twelfth-order or higher, they are ignored in the Iq model. Accordingly, only the direct-current value $I_{dDC}$ is input to the Iq model as d-axis current information, and the calculation of the Iq model according to Eq. (9) is possible.

Also, the d-axis EMF component $e_{d0}$ and the q-axis EMF component $e_{q0}$ can be approximated by direct current+vibration term of electrical angle multiplied by six, as indicated in follows Eq. (11) and (12).

[Formula 9]

$$e_{g0} = e_q/\omega_e = E_{qDC0} - e_{qAC0}\cos(6\theta) \quad (11)$$

$$e_{d0} = e_d/\omega_e = e_{dAC0}\sin(6\theta) \quad (12)$$

Thus, each of the d-axis current $i_d$, the q-axis current $i_q$, the d-axis EMF component $e_{d0}$ and the q-axis EMF component

[Formula 11]

provided that $$V_{dDC} = R \cdot I_{dDC} + \omega \cdot L \cdot I_{qDC}$$

$$V_{dDC} = R \cdot I_{qDC} - \omega \cdot L \cdot E_q$$

$$V_{dAC} = v_{dc}\cos(6\theta) + v_{ds}\sin(6\theta)$$

$$V_{qAC} = v_{qc}\cos(6\theta) + v_{qs}\sin(6\theta)$$

$$v_{dc} = I_{dAmp}(-R \cdot i_{qc} - 6\omega \cdot L \cdot i_{qs}) + \omega \cdot L \cdot i_{qc}$$

$$v_{ds} = I_{dAmp}(-R \cdot i_{qc} - 6\omega \cdot L \cdot i_{qc}) + \omega \cdot L \cdot i_{qs} + e_{dAC}$$

$$v_{qc} = -(-R \cdot i_{qc} - 6\omega \cdot L \cdot i_{qs}) + I_{dAmp} \cdot \omega \cdot L \cdot i_{qc} - e_{qAC}$$

$$v_{qc} = -(-R \cdot i_{qs} - 6\omega \cdot L \cdot i_{qc}) + I_{dAmp} \cdot \omega \cdot L \cdot i_{qs}$$

Since the phase of the d-axis current $i_d(\theta)$ has been calculated according to the above Eq. (10) in such a manner as described above, only the amplitude coefficient $I_{dAmp}$ of the d-axis current $I_d(\theta)$ is an undetermined variable. Where the amplitude coefficient of the d-axis current $I_d(\theta)$ is calculated so that the relational expressions for the amplitudes of the d-axis voltage $V_d$ and the q-axis voltage $V_q$ in the above Eq. (13) meet the above Eq. (7) representing the normal condition, the calculation becomes one expressed in follows Eq. (14) below for, for example, clockwise (CW) rotation, making it possible to determine the direct-current component, amplitude and phase of the d-axis current $i_d(\theta)$ so that the absolute value of the voltage composite vector has a substantially constant value that corresponds to a value in the neighborhood of a value $\sqrt{3}/2$ times a power supply voltage including the value $\sqrt{3}/2$ times the power supply voltage.

$$I_{dAMP} = \begin{bmatrix} -\dfrac{1}{V_{dDC}^2(W^2+Y^2) - V_{dDC}^2(X^2+Z^2)} \\ \left\{ \begin{array}{c} (V_{qDC}^2((e_q+W)X+YZ) + V_{dDC}^2(WX+Y(e_d+Z))) \\ +\dfrac{1}{2}\sqrt{\begin{array}{c}4(e_qV_{qDC}^2X + V_{qDC}^2(WX+YZ) + V_{dDC}^2(WX+Y(e_d+Z)))^2 \\ -4(V_{dDC}^2(W^2+Y^2) - V_{dDC}^2(X^2+Z^2))(-V_{qDC}^2((e_q+W)^2+Y^2) + V_{dDC}^2(X^2+(e_d+Z)^2))\end{array}} \end{array} \right\} \\ -\dfrac{1}{V_{dDC}^2(W^2+Y^2) - V_{dDC}^2(X^2+Z^2)} \\ \left\{ \begin{array}{c} (V_{qDC}^2((e_q+W)X+YZ) + V_{dDC}^2(WX+Y(e_d+Z))) \\ -\dfrac{1}{2}\sqrt{\begin{array}{c}4(e_qV_{qDC}^2X + V_{qDC}^2(WX+YZ) + V_{dDC}^2(WX+Y(e_d+Z)))^2 \\ -4(V_{dDC}^2(W^2+Y^2) - V_{dDC}^2(X^2+Z^2))(-V_{qDC}^2((e_q+W)^2+Y^2) + V_{dDC}^2(X^2+(e_d+Z)^2))\end{array}} \end{array} \right\} \end{bmatrix} \quad (14)$$

provided that $$W = (-Ri_{qc} - 6\omega Li_{qs})X = \omega Li_{qc}$$

$$Y = (-Ri_{qs} - 6\omega Li_{qc})Z = \omega Li_{qs}$$

$e_{q0}$ in Eq. (3) can be approximated as "direct current+vibration term of electrical angle multiplied by six", and accordingly, by assigning these to the above Eq. (3), the d-axis voltage $V_d(\theta)$ and the q-axis voltage $V_q(\theta)$ can be approximated by follows Eq. (13).

[Formula 10]

$$V_d(\theta) = V_{dDC} - v_{dc}\cos(6\theta) + v_{ds}\sin(6\theta)$$

$$V_q(\theta) = V_{qDC} + v_{qc}\cos(6\theta) + v_{qs}\sin(6\theta) \quad (13)$$

Then, assigning the calculated d-axis current $i_d(\theta)$ to the above Eq. (6) enables generation of a real q-axis current $i_q(\theta)$ that does not cause torque fluctuation.

In order to provide the aforementioned field weakening control according to the present invention, the target current setting unit 30 is configured as shown in FIG. 3. In other words, the target current setting unit 30 includes: a steering auxiliary current command value calculation unit 31 that receives inputs of the steering torque T detected by the steering torque sensor 3 and the vehicle speed Vs detected by the vehicle speed sensor 21 and calculates a steering auxiliary current command value Iref based on them; an electrical angle conversion unit 32 that converts the rotor rotation angle θ detected by the rotor rotation angle detection circuit 13 to an electrical angle θe; a differentiation circuit 33 that differentiates the electrical angle θe output from this electrical angle conversion unit 32 to calculate an electrical angular velocity ωe; a d-axis target current calculation unit 34 that calculates a d-axis target current Id* based on the steering auxiliary current command value $I_{ref}$ and the electrical angular velocity ωe; an induced voltage model calculation unit 35 that calculates the d-axis EMF component $e_{d0}$ ($=e_d/\omega_e=e_{dAC0}\sin(\theta)$) and the q-axis EMF component $e_{q0}$ ($=e_q/\omega_e=E_{qDC0}-e_{qAC0}\cos(6\theta)$) of d-q axis induced voltage models EMF (Electromotive Force) based on the electrical angle θe and the electrical angular velocity $\omega_e$; a q-axis target current calculation unit 36 that calculates a q-axis target current $i_q(\theta)$ based on the d-axis EMF component $e_{d0}$ and the q-axis EMF component $e_{q0}$ output from this induced voltage model calculation unit 35, the d-axis target current $i_d(\theta)$ output from the d-axis target current calculation unit 34, and the steering auxiliary current command value $I_{ref}$ output from the steering auxiliary current command value calculation unit 31; and a two-phase/three-phase conversion unit 37 that converts the d-axis target current $i_d(\theta)$ output from the d-axis target current calculation unit 34 and the q-axis target current $i_q(\theta)$ output from the q-axis target current calculation unit 36 to three-phase current command values Iu*, Iv* and Iw*.

Figure 4:
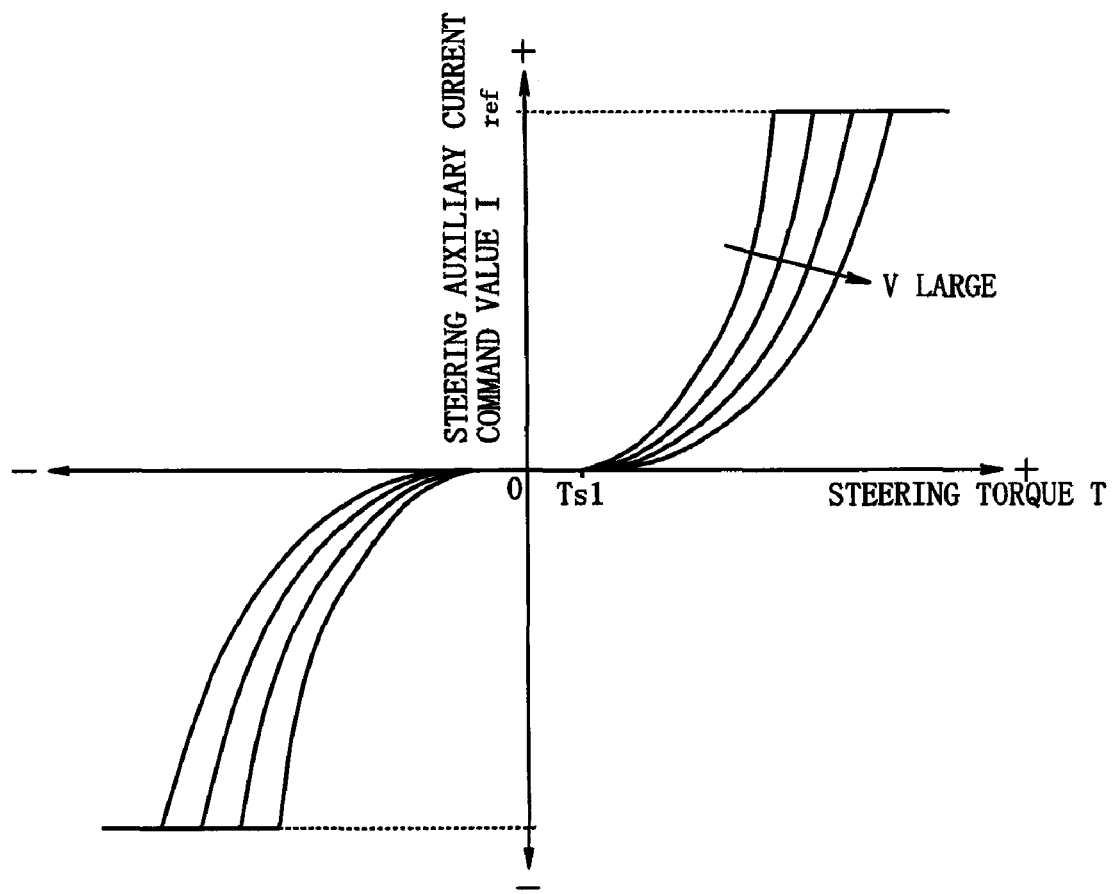
FIG. 4 is a characteristic line diagram illustrating a steering auxiliary current command value calculation map.

The aforementioned steering auxiliary current command value calculation unit 31 calculates the steering auxiliary current command value $I_{ref}$ based on the steering torque T and the vehicle speed Vs with reference to a steering auxiliary current command value calculation map, which is shown in FIG. 4. Here, the steering auxiliary current command value calculation map, as shown in FIG. 4, is formed of a characteristics line diagram expressed by parabolic curves wherein the abscissa axis is the steering torque T and the ordinate axis is the steering auxiliary current command value $I_{ref}$, and a vehicle speed detection value V is a parameter. The settings are made so that: when the steering torque T is "0" to a setting value T1 neighboring "0", the steering auxiliary current command value $I_{ref}$ is maintained at "0"; and when the steering torque T exceeds the setting value T1, at first, the steering auxiliary current command value $I_{ref}$ increases gently relative to the increase in the steering torque T, but when the steering torque T further increases, the steering auxiliary current command value $I_{ref}$ rapidly increases relative to that increase, and a plurality of characteristics curves are set in such a manner that the characteristic curves have smaller inclinations as the vehicle speed increases.

Figure 5:
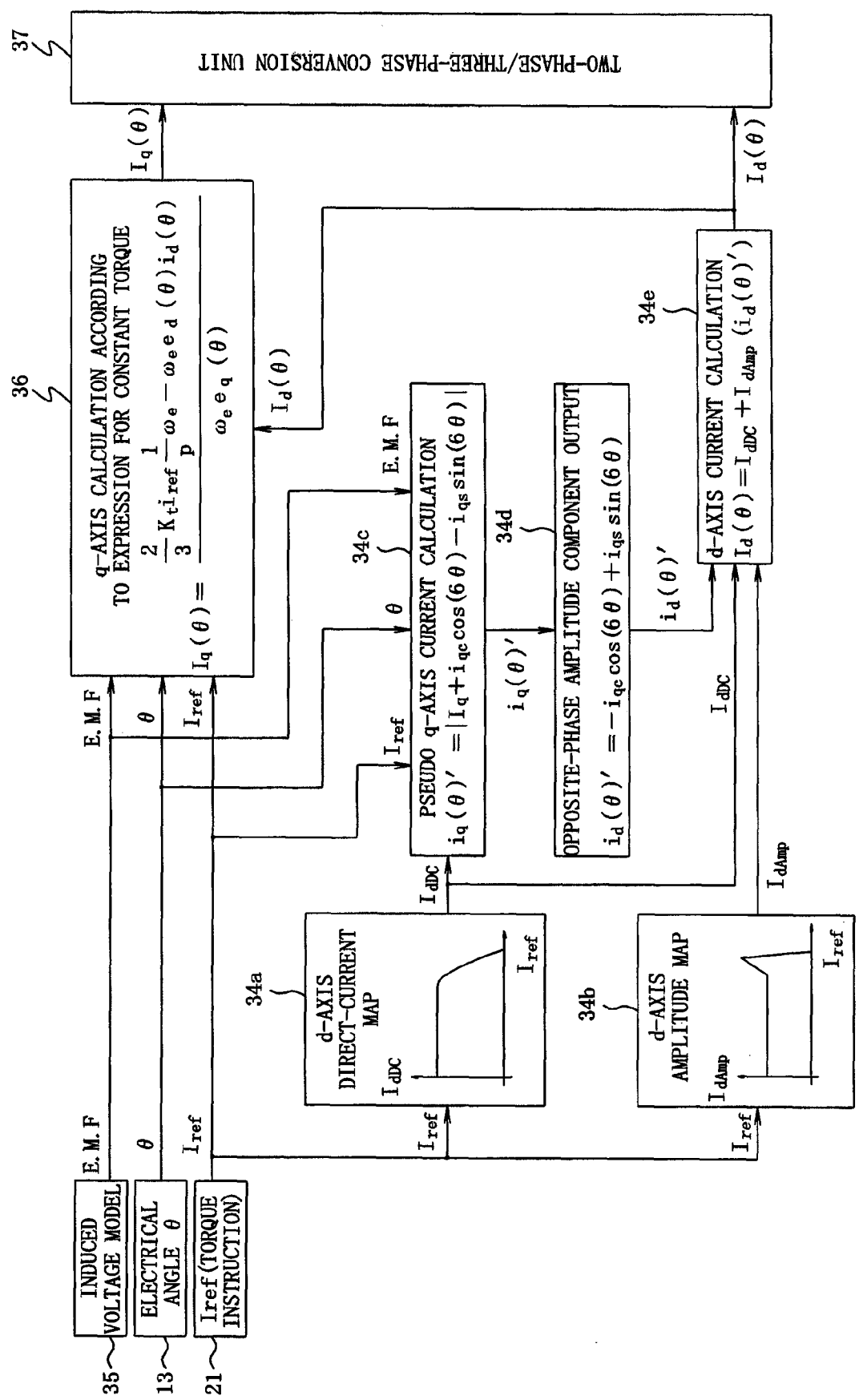
FIG. 5 is a block diagram illustrating a specific configuration of a d-axis current calculation unit, which is shown in FIG. 3.

Furthermore, as shown in FIG. 5, the steering auxiliary current command value $I_{ref}$ output from the steering auxiliary current command value calculation unit 31, the rotor electrical angle θe output from the electrical angle conversion unit 32, the direct-current component $E_{qDC0}$ ($\omega_e E_{qDC0}=E_{qDC}$) of the q-axis EMF, the amplitude component $e_{qAC0}$ ($\omega_e e_{qAC0}=e_{qAC}$) of the q-axis EMF and the amplitude component $e_{dAC0}$ ($\omega_e e_{dAC0}=e_{dAC}$) of the d-axis EMF that are expressed by the back electromotive voltage models output from the later-described back electromotive voltage calculation unit 35 are input to the d-axis target current calculation unit 34.

Figure 6:
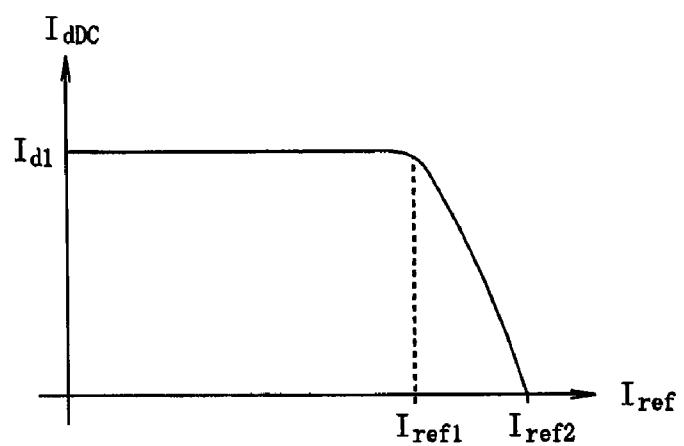
FIG. 6 is a characteristic line diagram illustrating a d-axis current direct-current component calculation map.
Figure 7:
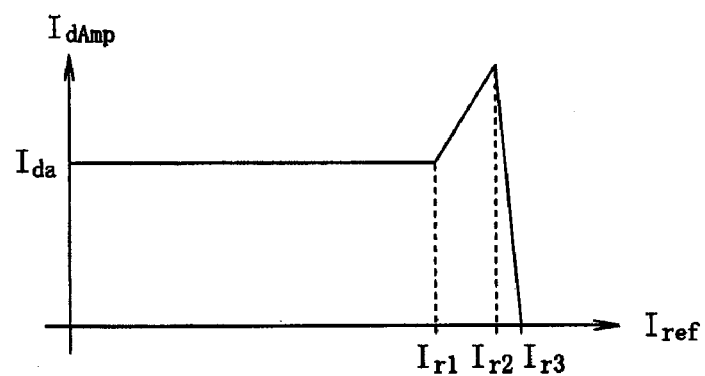
FIG. 7 is a characteristic line diagram illustrating an amplitude coefficient calculation map for d-axis current.

This d-axis target current calculation unit 34 includes: a d-axis current direct-current component calculation unit 34a as lead angle control means for calculating a provisional d-axis current direct-current component $I_{dDc}$, based on the input steering auxiliary current command value $I_{ref}$ with reference to a d-axis direct-current component calculation map, which is shown in FIG. 6; a d-axis amplitude coefficient calculation unit 34b that calculates an amplitude coefficient $I_{dAmp}$ to determine the amplitude of the d-axis current also based on the input steering auxiliary current command value $I_{ref}$, with reference to a d-axis amplitude coefficient calculation map, which is shown in FIG. 7; a pseudo-q-axis current calculation unit 34c that calculates a pseudo-q-axis current $i_q(\theta)'$ based on the steering auxiliary current command value $I_{ref}$, the rotor electrical angle θe and the back electromotive voltage models EMF; a d-axis current amplitude component calculation unit 34d that calculates a d-axis opposite-phase current component $I_d(\theta)'$ for calculating the opposite phase component in the amplitude component of the d-axis current based on the pseudo-q-axis current $i_q(\theta)'$ calculated by this pseudo-q-axis current calculation unit 34c; and a d-axis target current calculation unit 34e that calculates a d-axis target current $I_d(\theta)$ based on the d-axis direct-current component $I_{dDC}$, the d-axis amplitude coefficient $I_{Amp}$ and the d-axis opposite-phase component $I_d(\theta)'$.

Here, in the d-axis direct-current component calculation map, which is referred to by the d-axis direct-current component calculation unit 34a, as shown in FIG. 6, a characteristics line is set so that when the steering auxiliary current command value $I_{ref}$ is "0" to a predetermined value $I_{ref1}$, the d-axis direct-current component $I_{cDC}$ has a constant value Idd, when the steering auxiliary current command value $I_{ref}$ exceeds the predetermined value $I_{ref1}$, the d-axis direct-current component $I_{cDC}$ gradually decreases from the constant value Id1 according to the increase in the steering auxiliary current command value $I_{ref}$, and when the steering auxiliary current command value $I_{ref}$ reaches its maximum value $I_{ref2}$, the d-axis direct-current component $I_{dDC}$ becomes 0.

Also, in the d-axis amplitude coefficient calculation unit 34b referred to by the d-axis amplitude coefficient calculation map, as shown in FIG. 7, a characteristics line is set. This d-axis amplitude coefficient calculation map is a characteristics line diagram illustrating the relationship between the steering auxiliary current command value $I_{ref}$ and the amplitude coefficient $I_{dAmp}$ when a simulation is performed based on the variables in the above Eq. (14) so that the motor output becomes maximum for each rotation speed.

Furthermore, the pseudo-q-axis current calculation unit 34c calculates the pseudo-q-axis current $i_q(\theta)'$ based on the steering auxiliary current command value $I_{ref}$ output from the steering auxiliary current command value calculation unit 31, the rotor electrical angle θe output from the electrical angle conversion unit 32, the direct-current component $E_{qDC0}$ ($\omega_e E_{qDC0}=E_{qDC}$) of the q-axis EMF, the amplitude component $e_{qAC0}$ ($\omega_e e_{qAC0}=e_{qAC}$) of the q-axis EMF and the amplitude component $e_{dAC0}$ ($\omega_e e_{dAC0}=e_{dAC}$) of the d-axis EMF that are expressed by the back electromotive voltage models output from the later-described back electromotive voltage calculation unit 35, and the d-axis direct-current component $I_{dDC}$ calculated by the d-axis direct-current component calculation unit 34a, in consideration of forward and reverse driving of the motor, by performing calculation according to follows Eq. (15) below in which the right-hand side of the above Eq (9) is made to be an absolute value.

$$i_q(\theta)'=|I_{qDC}+i_{qc}\cos(6\theta)-i_{qs}\sin(6\theta)| \quad (15)$$

Also, the d-axis current amplitude component calculation unit 34d calculates an opposite-phase output $i_d(\theta)'$ of the amplitude component according to follows Eq. (16) below, by inversing the signs of the alternate-current components excluding the q-axis direct-current component $I_{qDC}$ in the first term of the right-hand side of the above Eq. (8) above.

$$i_d(\theta)' = -(i_{qc}\cos(6\theta) - i_{qs}\sin(6\theta)) \quad (16)$$

Furthermore, the d-axis current calculation unit 34e calculates a d-axis current command value $i_d(\theta)$ by performing calculation according to the above Eq. (10) based on the d-axis direct-current component $I_{dDC}$, the d-axis amplitude coefficient $I_{dAmp}$ and the opposite-phase component $i_d(\theta)'$ of the d-axis amplitude component.

Also, the q-axis target current calculation unit 36 calculates a q-axis current command value $i_q(\theta)$ based on the d-axis current command value $i_d(\theta)$, the electrical angular velocity $\omega_e$ of the rotor, the d-axis EMF component $e_{d0}(\theta)$ and the q-axis EMF component $e_{q0}(\theta)$, according to the conditional expression for a constant torque indicated by the above Eq. (6).

A voltage control unit 40 includes: subtractors 41u, 41v and 41w that calculate respective phase current errors $\Delta Iu$, $\Delta Iv$ and $\Delta Iw$ by reducing the motor phase current detection values Iud, Ivd and Iwd flowing in the respective phase coils Lu, Lv and Lw, which have been detected by the current detection circuit 22, from the current command values Iu*, Iv* and Iw* supplied from the target current setting unit 30; and a PI control unit 42 that calculates command voltages Vu, Vv and Vw by performing proportional-integral control on the calculated respective phase current errors $\Delta Iu$, $\Delta Iv$ and $\Delta Iw$.

Then, the command voltages Vu, Vv and Vw output from the PI control unit 42 are supplied to the FET gate drive circuit 25.

The motor drive circuit 24, as shown in FIG. 2, has an inverter configuration in which switching elements Qua, Qub, Qva, Qvb and Qwa, Qwb, which consist of N-channel MOS-FETs and are serially connected to the respective phase coils Lu, Lv and Lw, are connected in parallel, and the connection point of the switching elements Qua and Qub, the connection point of Qva and Qvb and the connection point of Qwa and Qwb are respectively connected to the sides of the phase coils Lu, Lv and Lw opposite a neutral point Pn.

PWM (pulse-width modulation) signals output from the FET gate drive circuit 25 are supplied to the gates of the switching elements Qua, Qub, Qva, Qvb, and Qwa and Qwb included in the motor drive circuit 24.

Next, an operation in the first embodiment will be described.

Where the steering wheel 1 is operated now, the then steering torque T is detected by the steering torque sensor 3, and the vehicle speed V is detected by the vehicle speed sensor 21. Then, the detected steering torque T and vehicle speed V are input to the steering auxiliary current command value calculation unit 31 of the target current setting unit 30 in the control calculation device 23, whereby this steering auxiliary current command value calculation unit 31 calculates a steering auxiliary current command value $I_{ref}$ with reference to the steering auxiliary current command value calculation map shown in FIG. 4.

Then, the calculated steering auxiliary current command value $I_{ref}$ is supplied to the d-axis target current calculation unit 34 and the q-axis target current calculation unit 36.

Meanwhile, a rotor position signal detected by the rotor position detection circuit 13 is supplied to the electrical angle conversion unit 32 and converted to an electrical angle $\theta_e$, and this electrical angle $\theta_e$ is differentiated by the differentiation circuit 33 to calculate an electrical angular velocity $\omega_e$, and these electrical angle $\theta_e$ and the electrical angular velocity $\omega_e$ are supplied to the back electromotive voltage model calculation unit 35 to calculate a d-axis EMF component $e_{d0}(\theta)$ and a q-axis EMF component $e_{q0}(\theta)$, which are supplied to the pseudo-q-axis current calculation unit 34c of the d-axis current calculation unit 34 and the q-axis current calculation unit 36.

Thus, in the d-axis current calculation unit 34, the d-axis direct-current component calculation unit 34a calculates a d-axis direct-current component $I_{dDC}$ based on the steering auxiliary current command value $I_{ref}$ with reference to the d-axis direct-current component calculation map shown in FIG. 6, and the d-axis amplitude coefficient calculation unit 34b calculates a d-axis amplitude coefficient $I_{dAmp}$ with which the d-axis voltage Vd and the q-axis voltage Vq satisfy the above Eq. (7), which is a relational expression for amplitude, based on the steering auxiliary current command value $I_{ref}$ with reference to the q-axis amplitude coefficient calculation map shown in FIG. 7.

Furthermore, the pseudo-q-axis current calculation unit 34c calculates a pseudo-q-axis current $i_q(\theta)'$ according to the above Eq. (15), and then, the d-axis current amplitude component calculation unit 34d calculates a d-axis opposite-phase component $i_d(\theta)'$ according to the above Eq. (16).

Then, the d-axis target current calculation unit 34e calculates a d-axis target current $i_d(\theta)$ by performing calculation according to the above Eq. (10), and supplies the calculated d-axis target current $i_d(\theta)$ to the q-axis current calculation unit 36 and also to the two-phase/three-phase conversion unit 37.

Thus, the q-axis current calculation unit 36 calculates a q-axis target current $i_q(\theta)$ that does not cause torque fluctuation, by performing calculation according to the above Eq. (6), and supplies this q-axis target current $i_q(\theta)$ to the two-phase/three-phase conversion unit 37.

Figure 9:
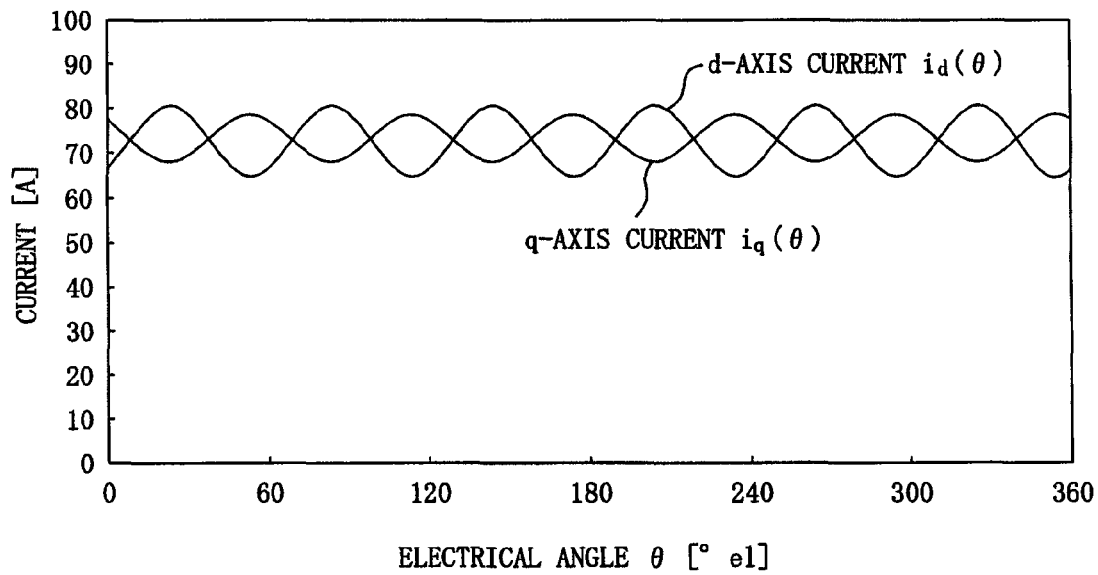
FIG. 9 is a waveform diagram illustrating current waveforms of a d-axis current and a q-axis current according to the present invention.
Figure 10:
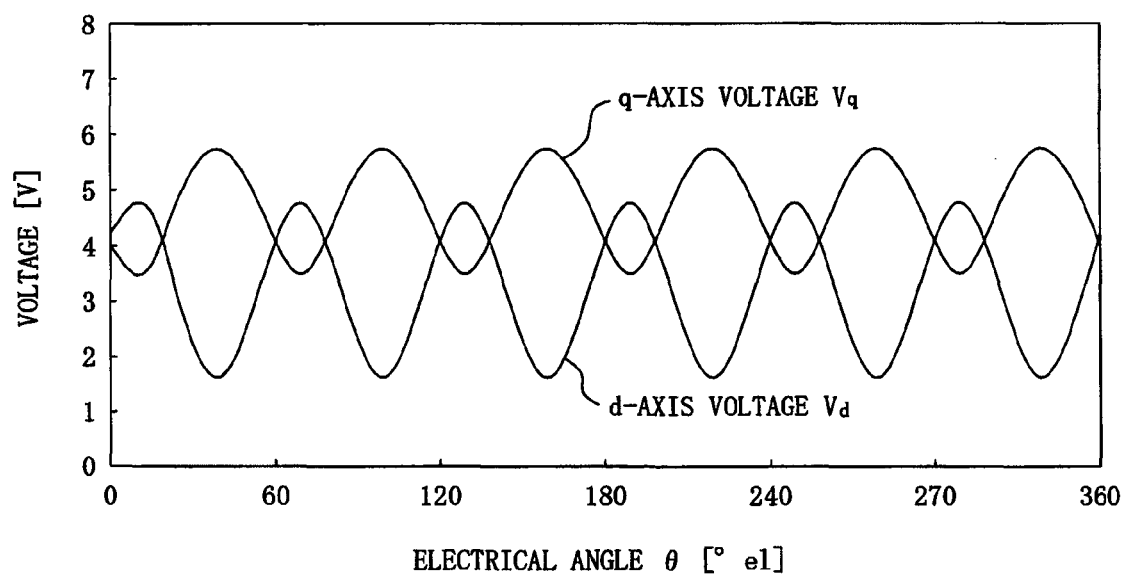
FIG. 10 is a waveform diagram illustrating voltage waveforms of a d-axis voltage and a q-axis voltage according to the present invention.

As described above, the d-axis target current $i_d(\theta)$ calculated by the d-axis current calculation unit 34 and the q-axis target current $i_q(\theta)$ calculated by the q-axis current calculation unit 36, as shown in FIG. 9, have phases opposite each other, which are shifted from each other by approximately 180 degrees, and the d-axis voltage Vd and the q-axis voltage Vq, as shown in FIG. 10, also have phases opposite each other, which are shifted from each other by approximately 180 degrees.

At this time, the amplitude coefficient calculation unit 34b of the d-axis current calculation unit 34 calculates the amplitude coefficient $I_{dAmp}$ so that the direct-current component proportion and the vibration component proportion of the d-axis voltage Vd and the q-axis voltage Vq satisfy the above Eq. (7), and accordingly, as described with reference to FIG. 8, the movement trajectory of the absolute value |V| ($=\sqrt{Vd^2+Vq^2}$) of the voltage composite vector follows the direction of the tangent to the circle C0 with the original point of the d-q axes as its center at the contact point between the circle C0 and the absolute value |V| of the voltage composite vector, that is, a normal to the direct-current components of the d-axis voltage Vd and the q-axis voltage Vq.

Figure 11:
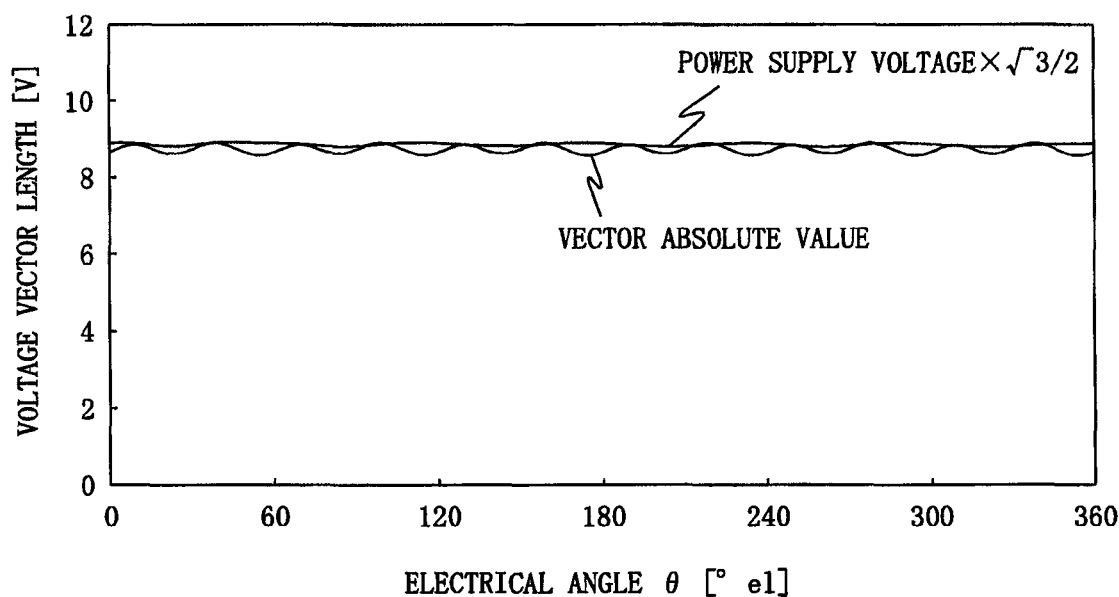
FIG. 11 is a waveform diagram illustrating an absolute value waveform of a voltage vector according to the present invention.
Figure 12:
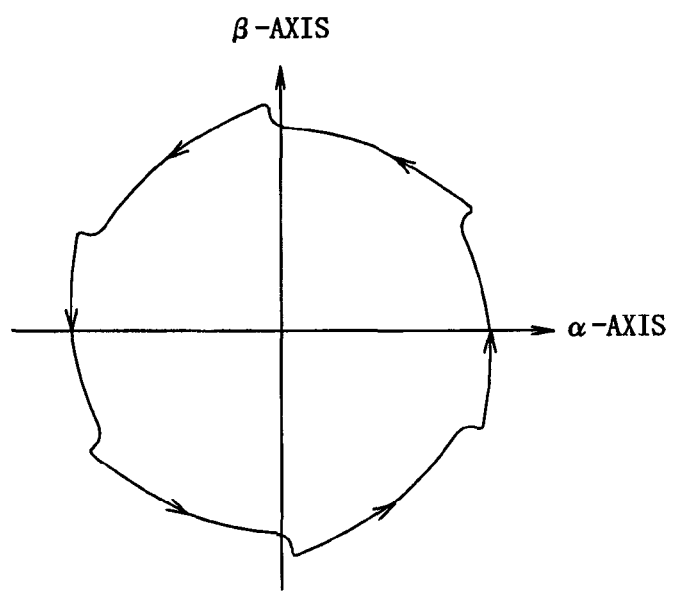
FIG. 12 is an explanatory diagram illustrating a voltage vector trajectory in the case of conversion into α-β.

Thus, the absolute value |V| of the voltage composite vector of the d-axis voltage Vd and the q-axis voltage Vq, as shown in FIG. 11, can be maintained at a substantially constant value relative to the electrical angle $\theta_e$ by suppressing a ripple in the range neighboring the value of the power supply voltage$\times\sqrt{3}/2$ [V], making it possible to effectively use the power supply voltage. The voltage vector trajectory when conversion into $\alpha$-$\beta$ is performed, as shown in FIG. 12, can have a substantially circular shape.

Figure 13:
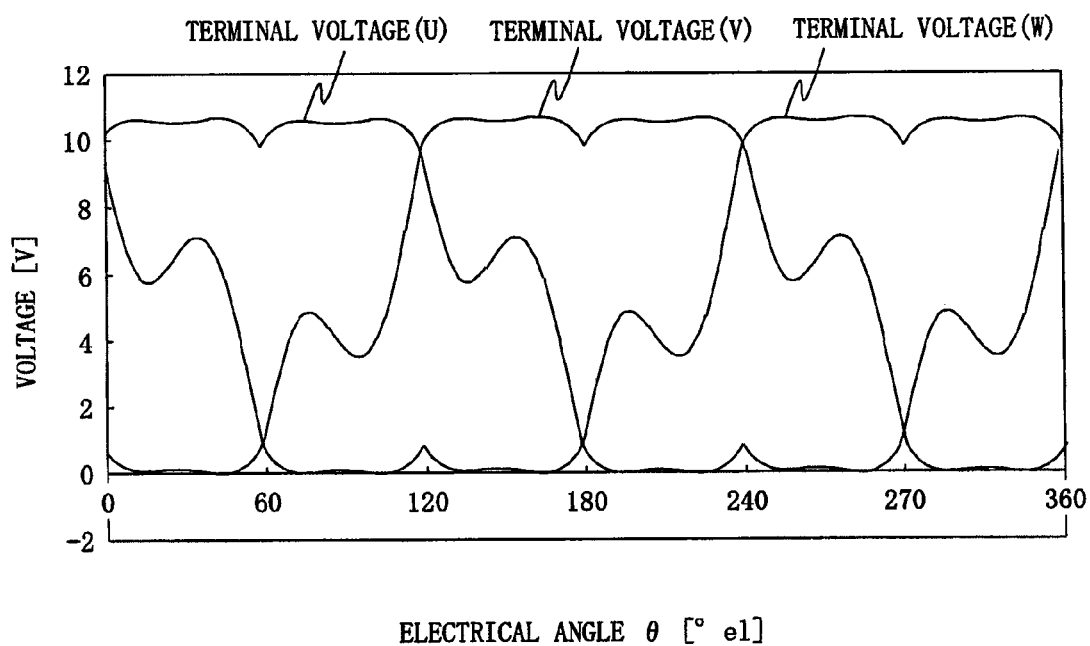
FIG. 13 is a waveform diagram illustrating motor terminal voltage waveforms when lead angle control is not performed.

Also, in the case of no lead angle control in which the direct-current component $I_{dDC}$ of the d-axis current in the first term of the right-hand side of the above Eq. (10) is set to "0", the terminal voltage waveforms of motor drive voltages applied to the exciting coils Lu, Lv and Lw of the three-phase brushless motor 12, as shown in FIG. 13, has substantially-flat characteristics as a result of preventing peaks from occurring near the power supply voltage, enabling increasing the voltage use efficiency to enhance the motor rotation performance, and also enabling the three-phase brushless motor 12 to generate an optimum steering auxiliary force according to the steering torque to provide a favorable steering wheel 1 operation. At this time, the torque generated at the three-phase brushless motor 12 is controlled to be constant, and accordingly, vibration or the like is not given to the steering wheel 1, enabling provision of a favorable steering feeling.

Figure 14:
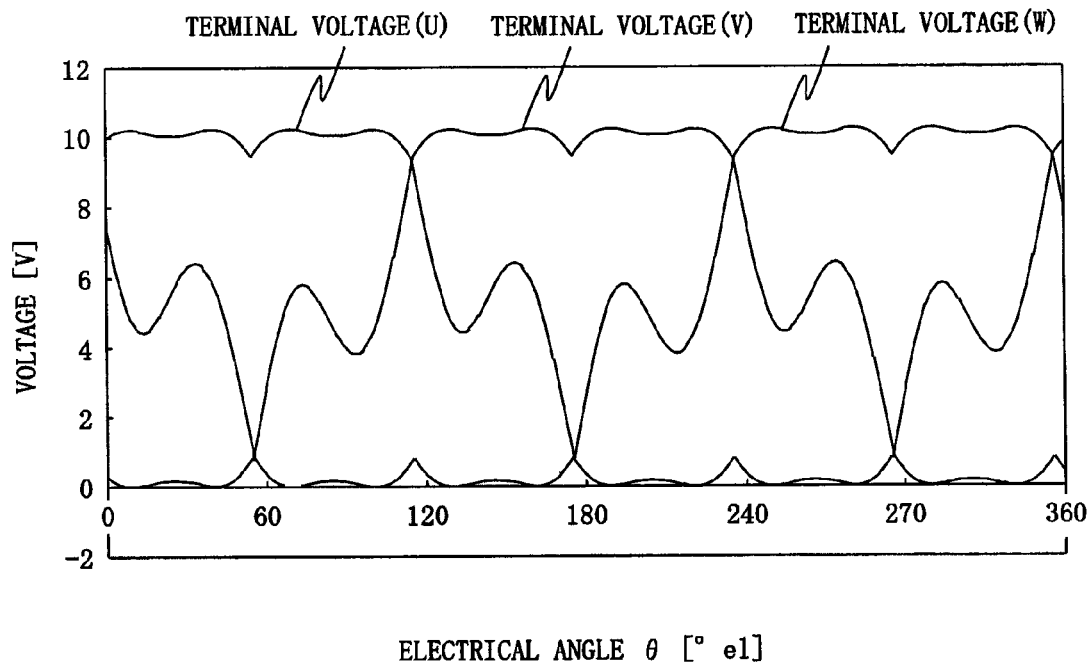
FIG. 14 is a waveform diagram illustrating motor terminal voltage waveforms when lead angle control is performed.

Also, even where lead angle control to control the direct-current component $I_{dDC}$ of the d-axis current, the terminal voltage waveforms of the motor drive voltages applied to the exciting coils Lu, Lv and Lw of the three-phase brushless motor 12, as shown in FIG. 14, can have flat characteristics by preventing peaks from occurring near the power supply voltage, enabling enhancing the voltage use efficiency to enhance the motor rotation performance.

Figure 15A:
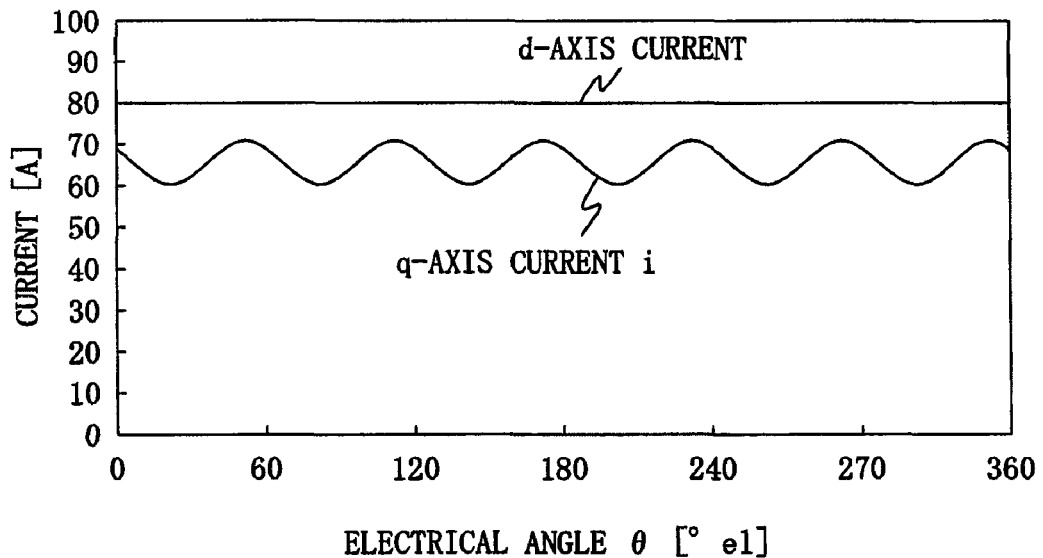
FIG. 15 shows waveform diagrams illustrating waveforms of d and q-axis currents and d and q-axis voltages according to a conventional art example.
Figure 15B:
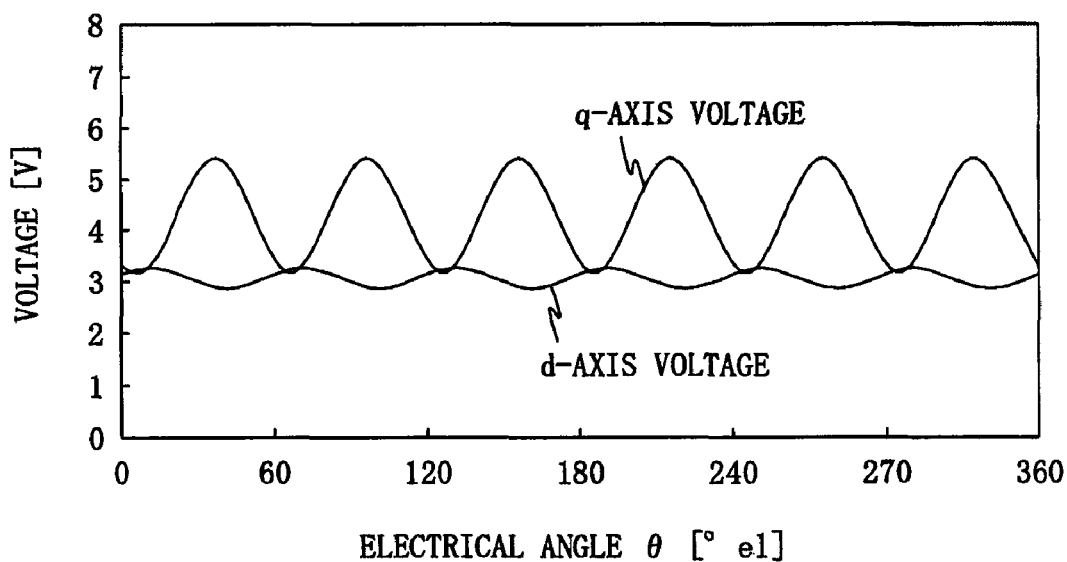
Figure 16A:
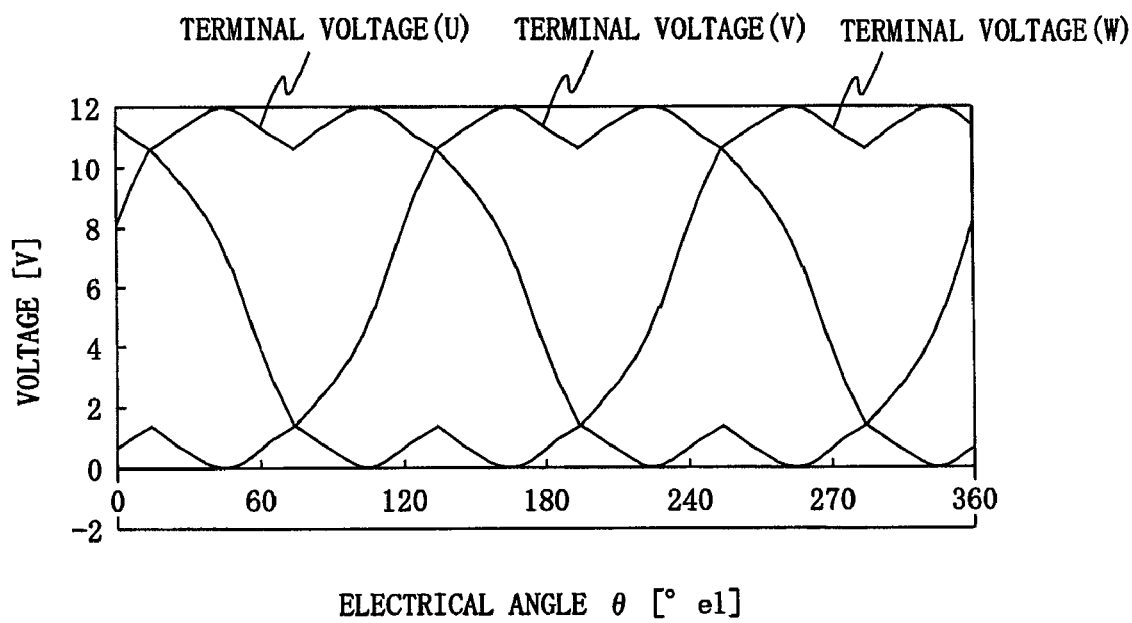
FIG. 16 shows waveform diagrams illustrating motor terminal voltage waveforms in a conventional art example when lead control is not performed and when example lead control is performed.
Figure 16B:
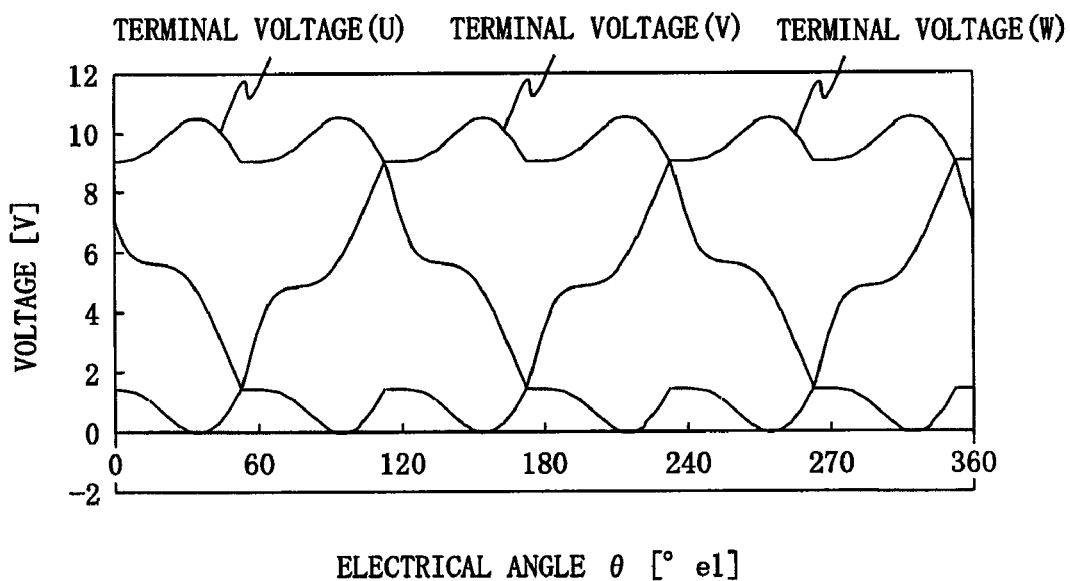

In a conventional art example, the d-axis current and the q-axis current exhibit the characteristics shown in FIG. 15(*a*), and accordingly, the d-axis voltage Vd and q-axis voltage Vq exhibit the characteristics shown in FIG. 15(*b*). Thus, for the terminal voltage waveforms, as shown in FIG. 16(*a*) where lead angle control is not performed and as shown in FIG. 16(*b*) where lead angle control is performed, the voltage waveforms near the power supply voltage have two peaks in both cases, lowering the effective values of the terminal voltages of the respective phases, resulting in lowering the motor rotation performance.

Figure 17:
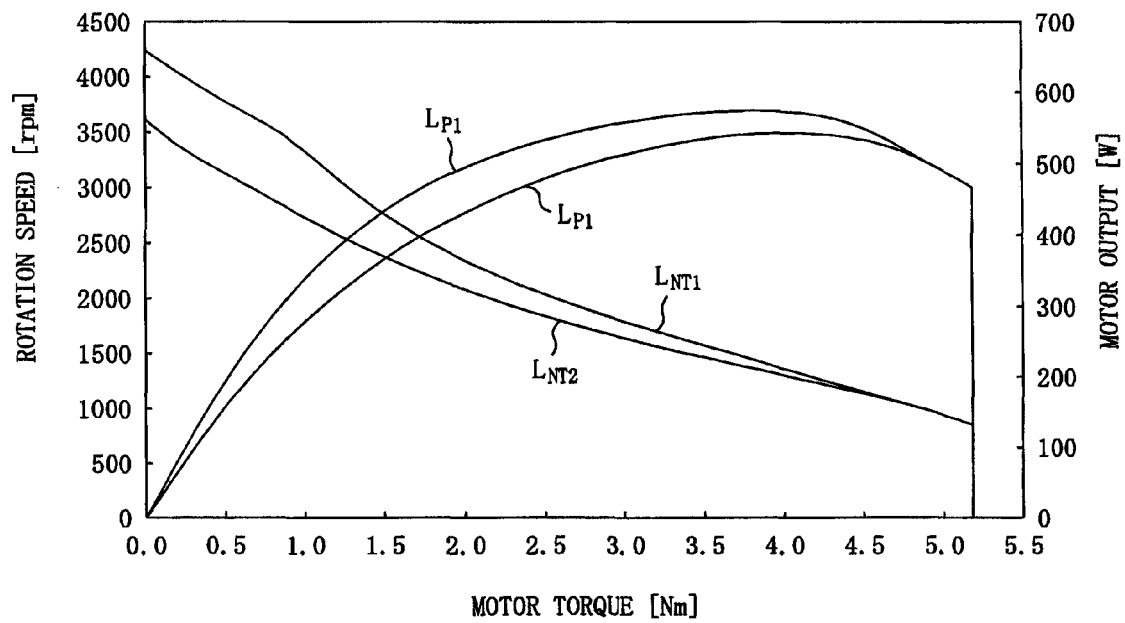
FIG. 17 is a characteristic line diagram for comparing the characteristics of the present invention and those of a conventional art example.
Figure 18:
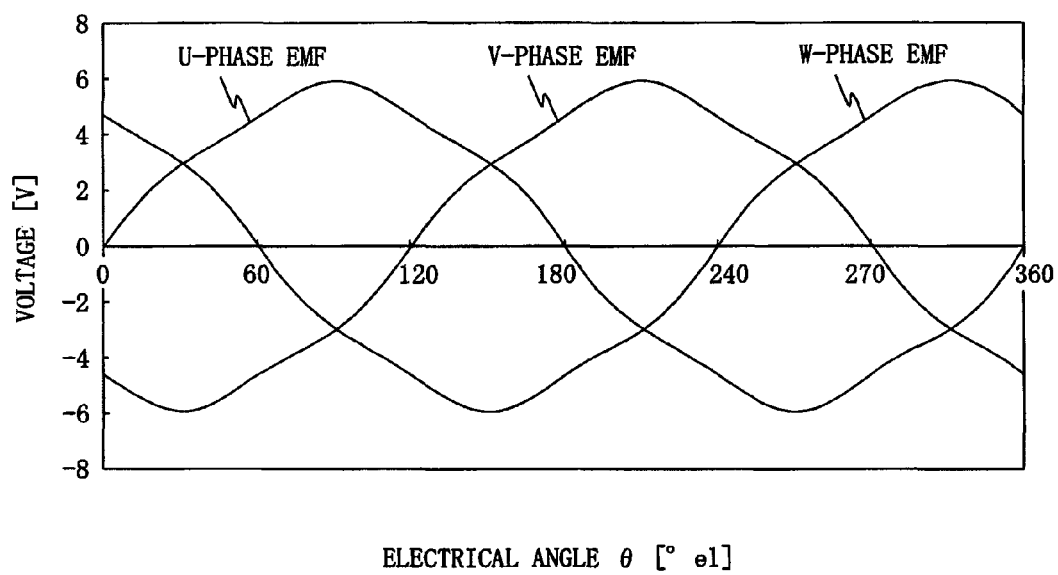
FIG. 18 is a waveform diagram illustrating back electromotive voltage waveforms according to a conventional harmonic motor.
Figure 19:
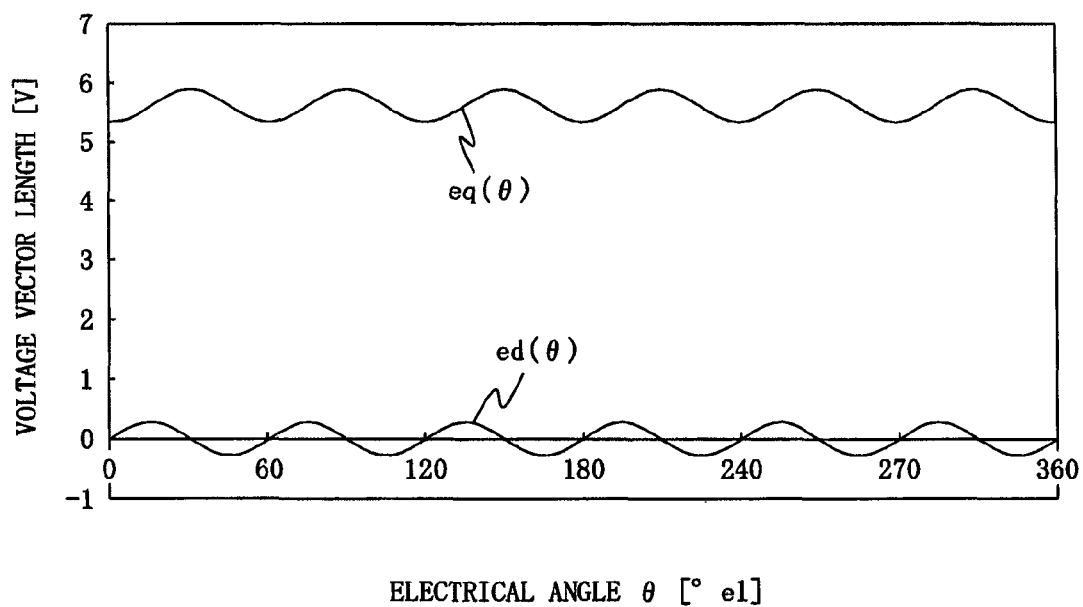
FIG. 19 is a waveform diagram illustrating waveforms converted into d-q according to a conventional harmonic motor.
Figure 20:
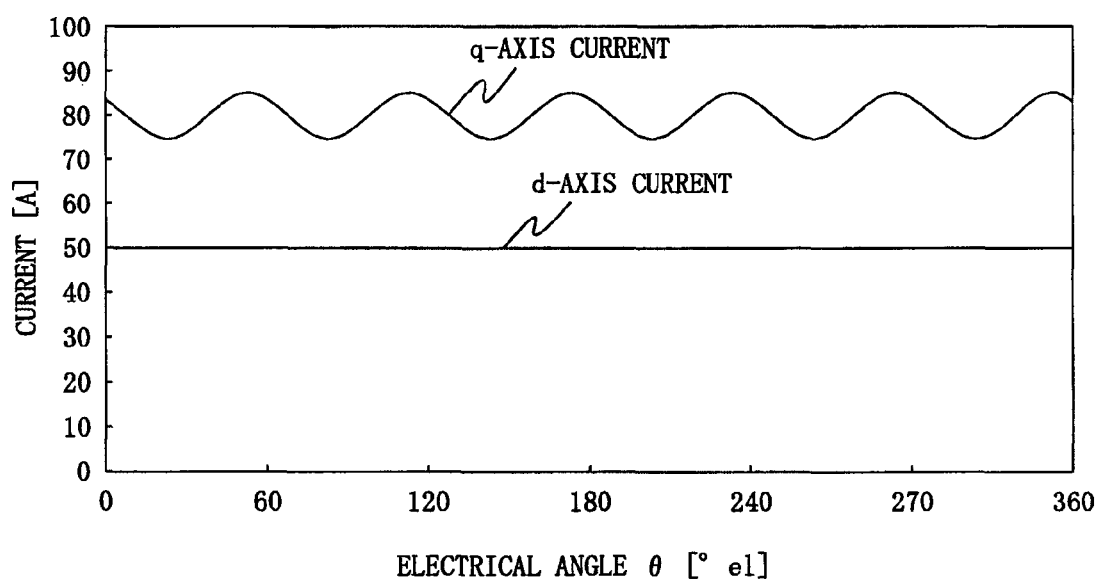
FIG. 20 is a waveform diagram illustrating d-axis and q-axis current waveforms according to a conventional harmonic motor.
Figure 21:
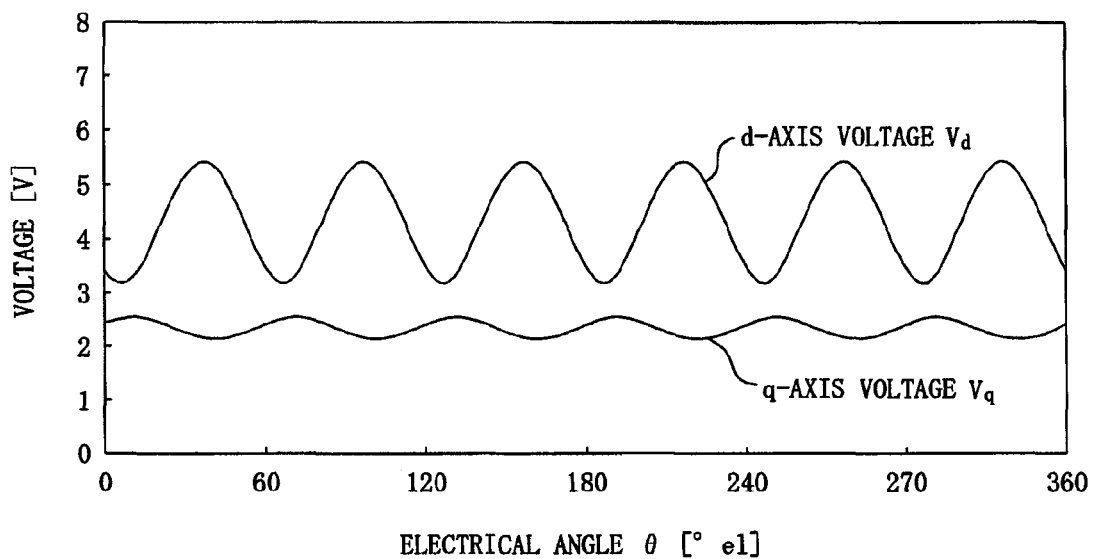
FIG. 21 is a waveform diagram illustrating d-axis and q-axis voltages waveforms according to a conventional harmonic motor.
Figure 22:
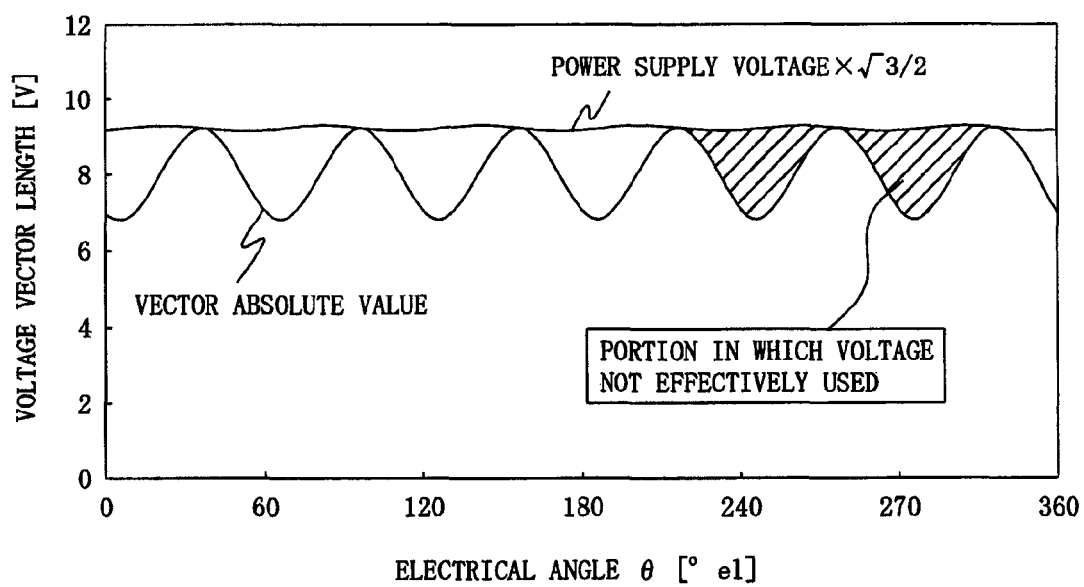
FIG. 22 is a waveform diagram illustrating an absolute value waveform of a current composite vector according to a conventional harmonic motor.

Thus, according to the present invention, as shown in FIG. 17, a characteristics line $L_{NT1}$ in a rotation speed N—motor torque T line graph is enhanced compared to a characteristics line $L_{NT2}$ for a conventional art example in the rotation speed—motor torque T line graph, and a characteristics line $L_{P1}$ in a motor output line graph is also enhanced compared to a characteristics line $L_{P2}$ for the conventional art example in the motor output line graph.

Also, as in the aforementioned embodiment, an amplitude coefficient $I_{dAmp}$ used for calculating a d-axis target current $i_d(\theta)$ is calculated with reference to an amplitude coefficient calculation map, whereby the amplitude coefficient $I_{dAmp}$ can easily be calculated without performing complicated calculation according to the above Eq. (14).

Although the first embodiment has been described in terms of the case where the d-axis target current $i_d(\theta)$ and the q-axis target current $i_q(\theta)$ are converted by the two-phase/three-phase conversion unit 37 to the three-phase target currents Iu*, Iv* and Iw* and then supplied to the voltage control unit 40, but the present invention is not limited to this case, and it is possible that: the two-phase/three-phase conversion unit 37 is omitted; instead, the motor currents Idu, Idv and Idw detected by the current detection circuit 22 are supplied to a three-phase/two-phase conversion unit to convert them to a d-axis detection current and a q-axis detection current; the deviations between the converted d-axis detection current and q-axis detection current, and the d-axis target current $i_d(\theta)$ and the q-axis target current $i_q(\theta)$ calculated by the target current setting unit 30 is calculated; and then, the deviations are subjected to two-phase/three-phase conversion to calculate phase control voltages.

Also, although the aforementioned first embodiment has been described in terms of the case where the present invention has been applied to a motor-driven power steering system, but the present invention is not limited to this case, and the present invention can be applied to a three-phase brushless motor in an in-vehicle electrically-powered device, such as an electric brake, or any other electrically-powered device.

The first embodiment corresponds to the invention according to claims 1 to 8 in the CLAIMS section.

Next, a second embodiment of the present invention will be described with reference to FIGS. 24 to 27.

In this second embodiment, to the steering auxiliary control device 20 in the first embodiment, a steering torque T detected by the steering torque sensor 3 and a vehicle speed V detected by the vehicle speed sensor 21 are input, and also an angle detection signal θm detected by the motor position detection circuit 13 is input, and based on this angle detection signal θm, an electrical angle θe output from an electrical angle calculation unit 50 that calculates an electrical angle θe is input, and furthermore, motor drive current detection values $I_{adet}$ and $I_{cdet}$ output from a motor current detection unit 57 that detects, in the later-described inverter circuit 56, motor drive currents Ia and Ic supplied to phase coils La and Lc in the three-phase brushless motor 12, and $I_{bdet}$ estimated from the motor drive currents Ia and Ic are input.

Figure 24:
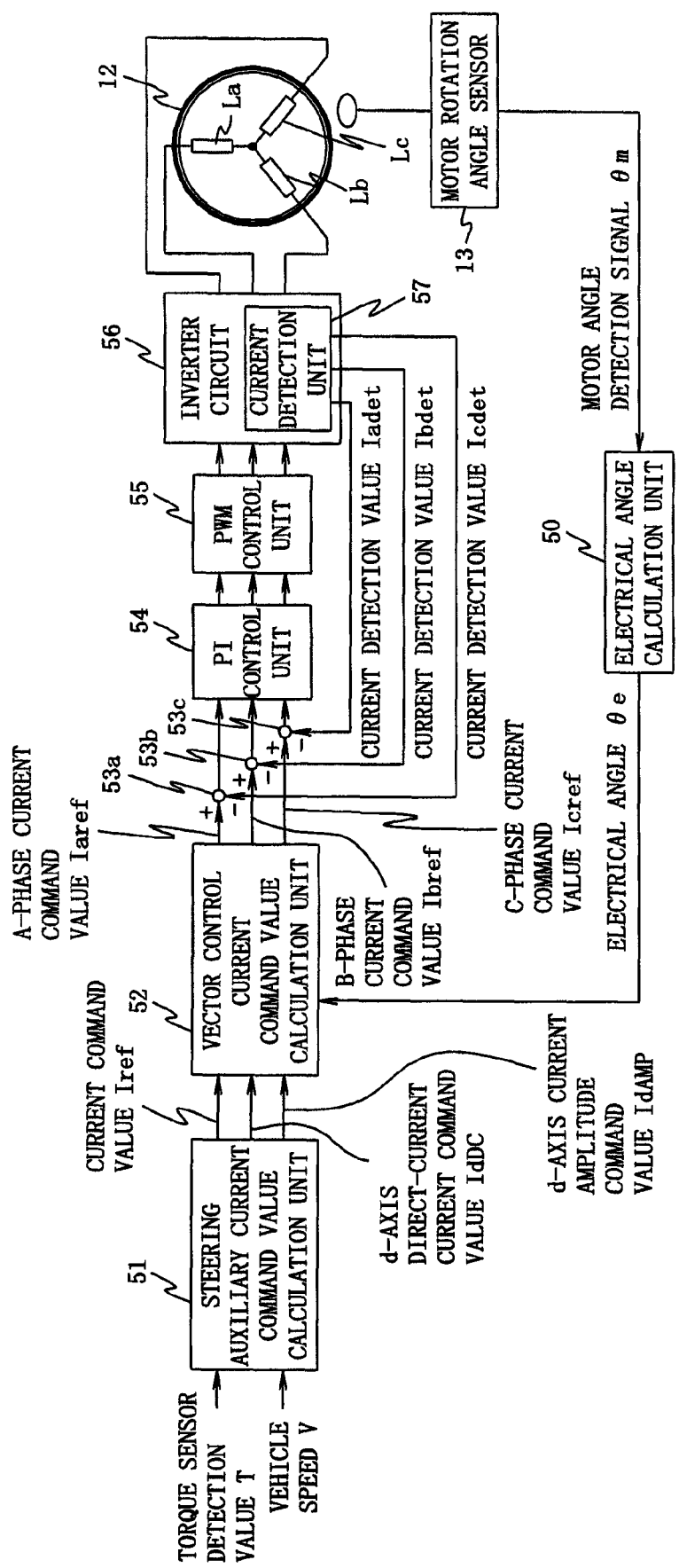
FIG. 24 is a block diagram illustrating a specific configuration of a control device according to a second embodiment of the present invention.

This steering auxiliary control device 20, as shown in FIG. 24, includes: a steering auxiliary current command value calculation unit 51 that calculates a steering auxiliary current command value $I_{ref}$ based on the steering torque T and the vehicle speed V, and calculates a d-axis direct-current current command value $I_{dDC}$ and a d-axis current amplitude command value $i_{dAMP}$ based on the calculated steering auxiliary current command value $I_{ref}$; and a vector control current command value calculation unit 52 that performs vector control calculation based on the steering auxiliary current command value $I_{ref}$, the d-axis direct-current current command value $I_{dCD}$ and the d-axis current amplitude command value $i_{dAMP}$ output from this steering auxiliary current command value calculation unit 51 and the electrical angle θe to calculate a d-axis current command value $I_{dref}$ and a q-axis current command value $I_{qref}$, and performs two-phase/three-phase conversion processing on these d-axis current command value $I_{dref}$ and q-axis current command value $I_{qref}$ to calculate an a-phase current command value $I_{aref}$, a b-phase current command value $I_{bref}$ and a c-phase current command value $I_{cref}$ for the electric motor 12.

Here, the steering auxiliary current command value calculation unit 51 calculates the steering auxiliary current command value $I_{ref}$ based on the steering torque T and the vehicle speed V with reference to the steering auxiliary current command value calculation map shown in FIG. 4, and calculates the d-axis direct-current current command value $I_{dDC}$ and the d-axis current amplitude command value $i_{DAMP}$ based on the calculated steering auxiliary current command value $I_{ref}$ with reference to the d-axis direct-current current command value calculation map and the d-axis current amplitude command value calculation map shown in FIGS. 6 and 7.

Figure 25:
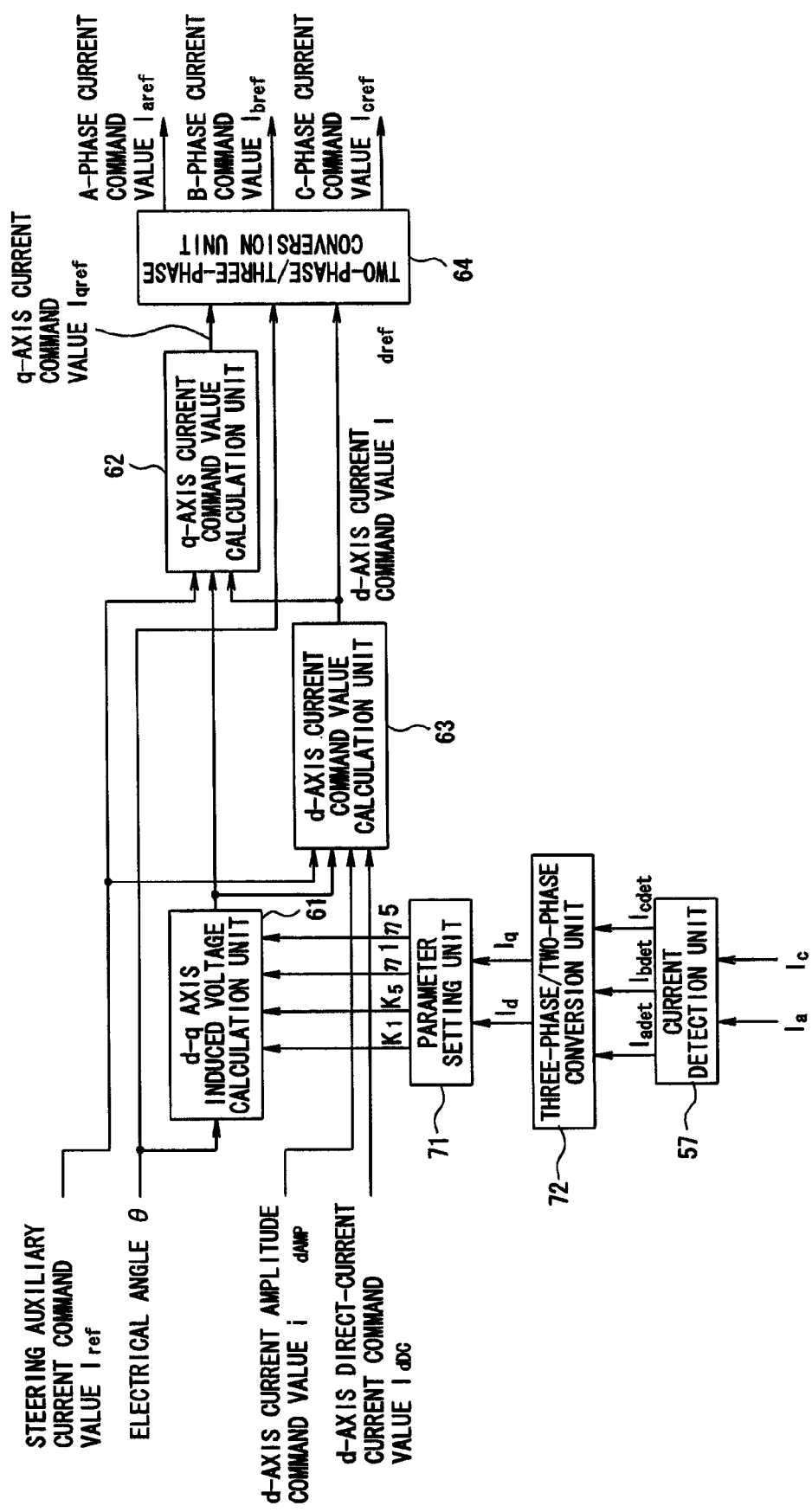
FIG. 25 is a block diagram illustrating a specific configuration of a vector control current command value calculation unit in the second embodiment.

Also, the vector control current command value calculation unit 52, as shown in FIG. 25, includes: a d-q axis back electromotive voltage calculation unit 61 that receives inputs of the steering auxiliary current command value $I_{ref}$, the d-axis direct-current current command value $I_{dDC}$ and the d-axis current amplitude command value $I_{dAMP}$ output from the steering auxiliary current command value calculation unit 51, and calculates d-axis and q-axis back electromotive voltages $e_{d0E}$ and $e_{q0E}$ based on the electrical angle θe and distortion parameters $K_4$, $K_5$, η1 and η5 output from a parameter setting unit 71, which is described later; a q-axis current command value calculation unit 62 that calculates the q-axis current command value $I_{qref}$ based on the steering auxiliary current command value $I_{ref}$, the back electromotive voltages $e_{d0E}$ and $e_{q0E}$ and the later-described d-axis current command value $I_{dref}$; a d-axis current command value calculation unit 63 that calculates the d-axis current command value $I_{dref}$ based on the steering auxiliary current command value $I_{ref}$, the back electromotive voltages $e_{d0E}$ and $e_{q0E}$, and the d-axis direct-current current command value $I_{dDC}$ and the d-axis current amplitude command value $i_{dAMP}$; and a two-phase/three-phase conversion unit 64 that performs two-phase/three-phase conversion processing based on the d-axis current command value $I_{dref}$, the q-axis current command value $I_{qref}$ and the electrical angle θe to calculate the a-phase current command value $I_{aref}$, the b-phase current command value $I_{bref}$ and the c-phase current command value $I_{cref}$.

Here, the d-q axis back electromotive voltage calculation unit 61 calculates the d-axis back electromotive voltage $e_{d0E}$ and the q-axis back electromotive voltage $e_{q0E}$ taking back electromotive voltage distortion into account by performing calculation according to follows Eq. (17) and (18) below representing a d-axis back electromotive voltage calculation formula and a q-axis back electromotive voltage calculation formula.

$$e_{d0E}=e_{dE}/\omega_m=K_1E_1\sin(\eta 1)+K_5E_5\sin(6\theta+\eta 5) \quad (17)$$

$$e_{q0E}=e_{qE}/\omega_m=K_1E_1\cos(\eta 1)+K_5E_5\cos(6\theta+\eta 5) \quad (18)$$

because $E_k$ is back electromotive voltage wave height value (k=1 or 5) of a k-th order harmonic wave during no current being applied, at an angular velocity of 1 [rad/s]

$K_k$ is k-th order harmonic-wave wave height value distortion gain (k=1 or 5)

$\eta_k$ is k-th order harmonic wave distortion phase angle (k=1 or 5)

$$e_{aE}=K_1E_1\omega_m\sin(\theta+\eta 1)+K_5E_5\omega_m\sin(5\theta+\eta 5)$$

$$e_{bE}=K_1E_1\omega_m\sin(\theta-(2/3)\pi+\eta 1)+K_5E_5\omega_m\sin(5(\theta-(2/3)\pi)+\eta 5)$$

$$e_{cE}=K_1E_1\omega_m\sin(\theta+(2/3)\pi+\eta 1)+K_5E_5\omega_m\sin(5(\theta+(2/3)\pi)+\eta 5)$$

$$e_{dE}=(2/3)\{e_{aE}\cos\theta+e_{bE}\cos(\theta-(2/3)\pi)+e_{cE}\cos(\theta+(2/3)\pi)\}$$

$$e_{qE}=(2/3)\{e_{aE}\sin\theta+e_{bE}\sin(\theta-(2/3)\pi)+e_{cE}\sin(\theta+(2/3)\pi)\}$$

In these the above Eq. (17) and (18), suffix E is added to distinguish between possibility and impossibility of consideration of back electromotive voltage distortion. Parameters $K_1$, $K_5$, $\eta 1$ and $\eta 5$ in the above Eq. (17) and (18) are set by the parameter setting unit 71 that is included in the d-q axis back electromotive voltage calculation unit 61 and consists of, for example, a microcomputer.

This parameter setting unit 71 receives inputs of a d-axis current values $I_d$ and a q-axis current value $I_q$ from a three-phase/two-phase conversion unit 72 that calculates the d-axis current value $I_d$ and the q-axis current value $I_q$ by performing three-phase/two-phase conversion of current detection values $I_{aref}$, $I_{bref}$ and $I_{cref}$ of the electric motor 12, which have been detected and estimated by the motor current detection unit 57, and sets the parameters $K_1$, $K_5$, $\eta 1$ and $\eta 5$ by performing parameter setting processing, which is described later.

Also, the q-axis current command value calculation unit 62 calculates the q-axis current command value $I_{qref}$ according to an expression for a constant torque. This constant torque expression is a relational expression represented by follows Eq. (19) and (20) below, which have been calculated from the energy equation of the motor.

$$T_m\omega_m = K_t I_{ref}\omega_m = I_a e_{aE} + I_b e_{bE} + I_c e_{cE} = (2/3)(I_q e_{qE} + I_d e_{dE}) \quad (19)$$

$$I_{qref} = \{(2/3)K_t I_{ref}\omega_m - e_{dE}I_{dref}\}/e_{qE} = \{(2/3)K_t I_{ref} - e_{d0E}I_{dref}\}/e_{q0E} \quad (20)$$

Here, $T_m$ is a motor torque, $\omega_m$ is a motor mechanical angular velocity, $K_t$ is a motor torque constant, $I_a$, $I_b$ and $I_c$ are respective phase current values of the three phases, $e_{aE}$, $e_{bE}$ and $e_{cE}$ are respective phase back electromotive voltages, $I_d$ and $I_q$ are d-axis and q-axis currents, and $e_{dE}$, $e_{qE}$, $e_{d0E}$ and $e_{q0E}$ are d-axis and q-axis back electromotive voltages talking distortion calculated according to follows Eq. (21) and (22) below into account.

$$e_{d0E}=e_{dE}/\omega_m \quad (21)$$

$$e_{q0E}=e_{qE}/\omega_m \quad (22)$$

Also, the d-axis current command value calculation unit 63, as with the d-axis target current calculation unit 34e in the first embodiment, calculates the d-axis current command value $I_{dref}$ by performing calculation according to follows Eq. (23) below based on the d-axis back electromotive voltage $e_{d0E}$ and q-axis back electromotive voltage $e_{q0E}$ output from the d-q axis back electromotive voltage calculation unit 61 and the d-axis direct-current current command value $I_{dDC}$ and the d-axis current amplitude command value $I_{dAMP}$ output from the steering auxiliary current command value calculation unit 51.

$$I_d=I_{dAMP}\{i_{qc}\cos(6\theta)-i_{qs}\sin(6\theta)\} \quad (23)$$

$I_{dDC}$ in the above Eq. (23) is a parameter that can arbitrarily be determined, $i_{dAMP}$, $i_{qc}$ and $i_{qs}$ are parameters determined to enhance the use efficiency of the voltage applied to the motor, $i_{qc}$ and $i_{qs}$ are defined in "Formula 7" and $i_{dAMP}$ is defined in the Above Eq. (14).

Also, the d-q axis back electromotive voltage calculation unit 61 calculates back electromotive voltages based on d-q axis back electromotive voltage calculation expressions. Here, where distortion of the back electromotive voltages is not considered, d-q axis back electromotive voltage calculation expressions for calculating a d-axis back electromotive voltage $e_{d0}$ and a q-axis back electromotive voltage $e_{q0}$ can be represented by follows Eq. (24) and (25) below.

$$e_{d0}=e_d/\omega_m=E_5\sin(6\theta) \quad (24)$$

$$e_{q0}=e_q/\omega_m=E_1-E_5\cos(6\theta) \quad (25)$$

because $E_k$ is a back electromotive voltage wave height value (k=1 or 5) of a k-th order harmonic wave during no power being applied, at an angular velocity of 1 [rad/s]

$$e_a=E_1\omega_m\sin\theta+E_5\omega_m\sin 5\theta$$

$$e_b=E_1\omega_m\sin(\theta-(2/3)\pi)+E_5\omega_m\sin 5(\theta-(2/3)\pi)$$

$$e_c=E_1\omega_m\sin(\theta+(2/3)\pi)+E_5\omega_m\sin 5(\theta+(2/3)\pi)$$

$$e_d=(2/3)\{e_a\cos\theta+e_b\cos(\theta-(2/3)\pi)+e_c\cos(0+(2/3)\pi)\}$$

$$e_q=(2/3)\{e_a\sin\theta+e_b\sin(\theta-(2/3)\pi)+e_c\sin(\theta+(2/3)\pi)\}$$

Eq. (24) and (25) are expressions for the case where the back electromotive voltages contain harmonic waves, and for the harmonic wave order number k, in reality, components of the seventh order or higher are difficult to be controlled in many cases because of the effect of an upper limit for control responsiveness and the like. Accordingly, the fifth order is determined to the upper limit for the high-order components of a back electromotive voltage in many cases, and thus, the above description is made for up to fifth-order. Also, the third-order harmonic wave is not converted to torque, and thus is not considered in the above Eq. (24) and (25) above, and it has separately been confirmed that sufficient performance can be provided under the foregoing conditions. Where the back electromotive voltages are sine waves, $E_5$, may be zero, and also where they contain harmonic waves of the seventh order or higher, a similar expansion can be made.

Distortion occurring in back electromotive voltages results in a torque ripple.

The factor that generates this torque ripple will be described. In general, in order to drive an electric motor, a voltage is applied to respective phases to generate an armature magnetomotive force at the respective phase coils by means of currents, and the rotor is rotated for driving, utilizing the attractive force and repulsive force between the rotor and a permanent magnet attached to the rotor, but the magnetomotive forces generated due to the armature currents make a gap magnetic flux generated by the permanent magnet distort, and as a result, the distortion of the back electromotive voltages occur. This is called an armature reaction. An armature reaction includes a direct-axis armature reaction and a quadrature-axis armature reaction.

Figure 26A:
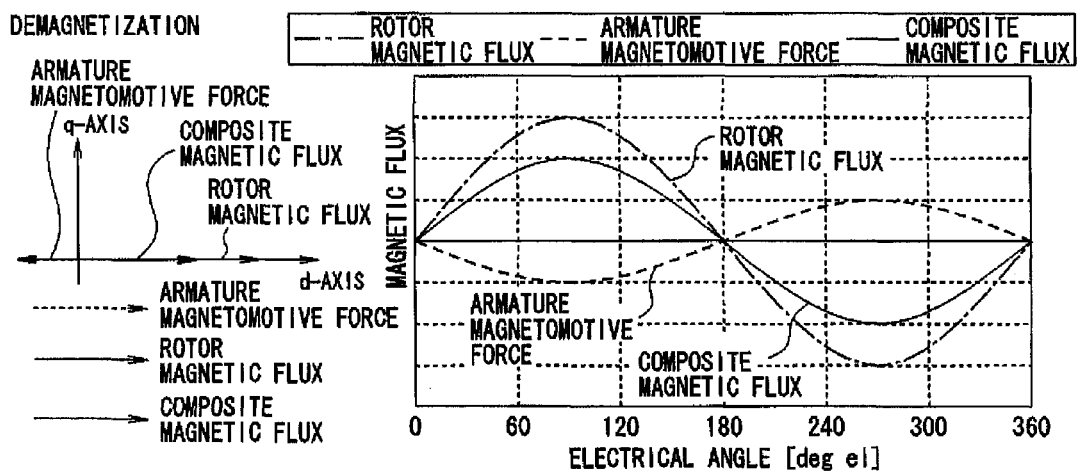
FIG. 26 shows explanatory diagrams provided for description of armature reactions.
Figure 26B:
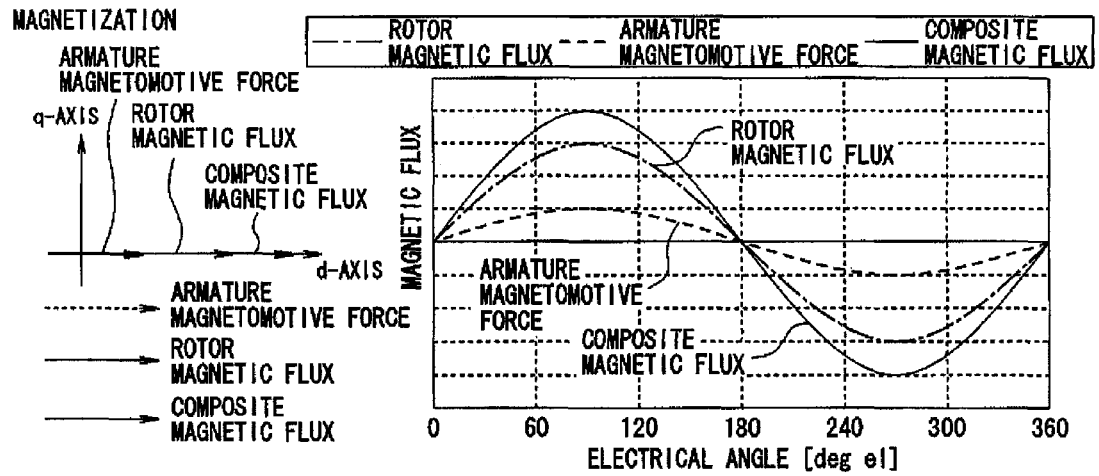
Figure 26C:
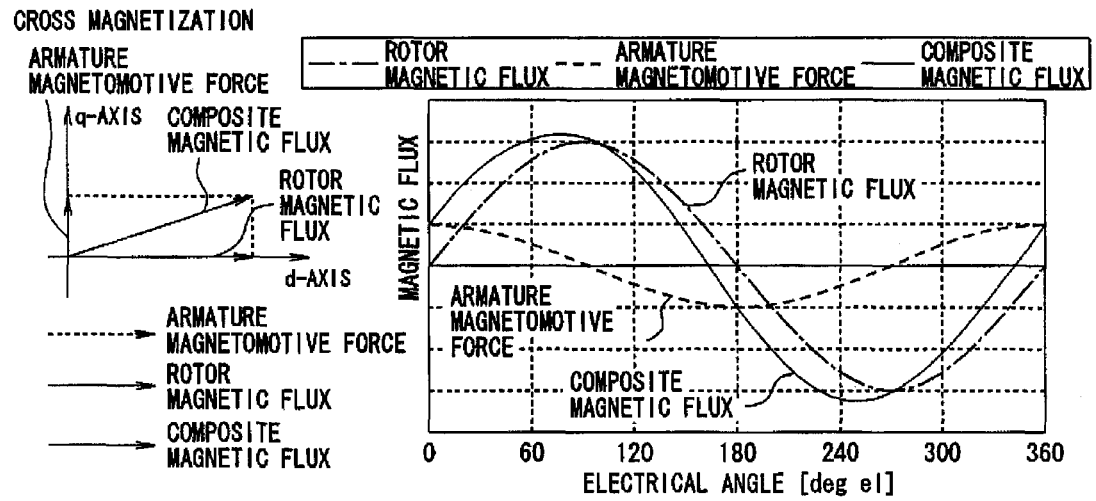

A direct-axis armature reaction occurs when an armature magnetomotive force vector is arranged in the same axis direction as that of a rotor magnetic flux vector of the motor: as shown in FIG. 26(*a*), demagnetization (field weakening) occurs when the aforementioned two vectors are arranged in opposite directions, and as shown in FIG. 26(*b*), magnetization (field strengthening) occurs when the aforementioned two vectors are arranged in the same direction. In either case, the vector phase of back electromotive voltages is not shifted by the effect of a direct-axis armature reaction, and accordingly, even though back electromotive voltages contains high-order harmonic waves, they does not cause torque fluctuation.

Meanwhile, a quadrature-axis armature reaction (cross magnetization), as shown in FIG. 26(*c*), occurs when the armature magnetomotive force vector is arranged in the direct-axis direction perpendicular to the rotor magnetic flux vector of the motor, and strongly occurs especially when the power factor=1. The composite magnetic flux of the armature magnetomotive force generated by armature current and the rotor magnetic flux generated by the permanent magnet distorts in the q-axis direction by means of the armature magnetomotive force, and accordingly, the magnet appears to advance in the rotation direction in terms of the back electromotive voltages. Where the back electromotive voltages and phase currents have sine waves, a torque ripple due to phase shifting is hard to occur, but where the back electromotive voltages and phase currents have rectangular waves or pseudo-rectangular waves (sine wave+harmonic component), a torque ripple occurring at the harmonic component due to phase shifting of the back electromotive voltages cannot be suppressed, which becomes a factor that causes a torque ripple (this is referred to as "factor A").

Also, another factor that causes a torque ripple can be found in nonlinearity of the stator magnetization characteristics. Where the stator magnetization characteristics are linear, an armature magnetomotive force caused by current application have an ideal magnetomotive force waveform, but the magnetization characteristics of an electromagnetic steel plate actually used as a stator are not linear, and accordingly, an ideal armature magnetomotive force cannot be generated in a high-current region, and the peak portions of the composite waveform distort, resulting in occurrence of a torque ripple and torque dropping at the high-current region (this is referred to "factor B").

The two factors A and B mentioned above are different from each other in occurrence mechanism but both can be understood as ones causing back electromotive voltage distortion related to motor phase currents.

As described above, back electromotive voltages are distorted by an armature magnetomotive force, so there may be a case where the q-axis current command value calculation unit 63 cannot effectively suppress a torque ripple even using a q-axis current command value $I_{qref}$ calculated according to the constant torque expression, based the back electromotive voltages $e_{d0}$ and $e_{q0}$ in the above Eq. (24) and (25) mentioned above, as described later.

Therefore, in the present embodiment, supposing that respective order wave height values and phases change taking back electromotive voltage distortion due to phase currents into account, d-q axis back electromotive voltage calculation expressions are defined as the above Eq (17) and (18) mentioned above.

In the above Eq. (17) and (18), harmonic-wave wave height value distortion gains $K_1$ and $K_5$ and harmonic-wave distortion phase angles $\eta 1$ and $\eta 5$ are distortion parameters that are determined by phase current values, and these parameters are determined for every phase current at the parameter setting unit 71, enabling generation of a d-axis back electromotive voltage $e_{d0E}$ and a q-axis back electromotive voltage $e_{q0E}$ with distortion taken into account.

Hereinafter, a principle and method of estimating distortion parameters, which is performed by the parameter setting unit 71 in the present embodiment, will be described.

Since it is extremely difficult to directly measure back electromotive voltages during current being applied to the electric motor 12, the distortion parameters are estimated from back electromotive voltages during no current being applied.

First, a control system is composed of back electromotive voltages with distortion according to Eq. (24) and (25) not taken into account to measure average torque and a torque ripple with the actual motor. In other words, it is composed by substituting $e_{d0E}$ and $e_{q0E}$ in Eq. (20) with $e_{d0}$ and $e_{q0}$ in Eq. (24) and (25).

It is known that the sixth-order component 60 of an electrical angle $\theta e$ is dominant in a torque ripple, and accordingly, motor torque at certain phase currents can be expressed by an approximate expression such as follows Eq. (26).

$$T_m = T_0 + T_{6c} \cos(6\theta) + T_{6s} \sin(6\theta) \tag{26}$$

In Eq. (26), the first term $T_0$ in the right-hand side is average torque, the second term $T_{6c}$ and the third term $T_{6s}$ in the right-hand side are respective amplitude values when the torque ripple sixth-order component is decomposed with regard to cos and sin. The above three parameters can be calculated by performing fast Fourier transformation (FFT) of the torque ripple measurement result.

The above measurement result exhibits a torque ripple waveform measured by means of the control with back electromotive voltage distortion not taken into account, and follows Eq (27) below can be obtained based on the above Eq. (17), (18) and (26).

$$T_m = (2/3)(e_{q0E} I_q + e_{d0E} I_d) = T_0 + T_{6c} \cos(6\theta) + T_{6s} \sin(6\theta) \tag{27}$$

Here, the q-axis current value $I_q$ is a q-axis current value $I_{qref}$ calculated according to the constant torque expression, but because the q-axis back electromotive voltage $e_{q0}$ is contained in the common denominator of the above Eq. (20), which is a q-axis current calculation expression for make the torque be constant, the component order number for $I_q$ becomes infinite, and thus, the solutions for the distortion parameters cannot be obtained using this expression as it is.

Therefore, since it is known from actual measurement that the direct-current component and the amplitude component of the electrical angle sixth-order component are dominant in the actually used q-axis current $I_q$, calculation is performed according to follows Eq. (28) below as an approximate expression for a component of up to the sixth-order, using Taylor expansion.

$$I_q = I_{qDC} + i_{qc}\cos(6\theta) - i_{qs}\sin(6\theta) \quad (28)$$

because $I_{qDC} = 2K_1 I_{ref}/3E_1$
$i_{qc} = (E_5/E_1)I_{qDC}$
$i_{qs} = (E_5/E_1)I_{dDC}$ Also, the d-axis current $I_d$ is defined by the above Eq. (23).

Meanwhile, the average torque $T_0$, the cos amplitude $T_{6c}$ and the sin amplitude $T_{6s}$ are calculated according to the following expressions, based on the above Eq. (27), (28) and (23).

$$T_0 = (2/3)E_1(I_{qDC}K_{1C} + I_{dDC}K_{1S}) \quad (29)$$

$$T_{6C} = (2/3)E_5(I_{qDC}(K_{1C} - K_{5C} - i_{dAMP}K_{1S}) + I_{dDC}K_{5S}) \quad (30)$$

$$T_{6S} = (2/3)E_5(-I_{dDC}(K_{1C} - K_{5C} - i_{dAMP}K_{1S}) + I_{qDC}K_{5S}) \quad (31)$$

because $K_{1S} = K_1 \sin(\eta 1)$
$K_{1C} = K_1 \cos(\eta 1)$
$K_{5S} = K_5 \sin(\eta 5)$
$K_{5C} = K_5 \cos(\eta 5)$ In the above expressions, four distortion parameters ($K_1$, $K_5$, $\eta 1$, $\eta 5$) to be obtained are converted to new four parameters ($K_{1S}$, $K_{1C}$, $K_{5S}$, $K_{5C}$), and if these new four parameters can be estimated, all the distortion parameters to be obtained can be calculated. The above-indicated new four parameters are determined from the relationships between the q-axis current value and the d-axis current value, and the distortion parameters, based on data obtained as a result of repeatedly performing torque ripple measurement with the q-axis current value $I_q$ and the d-axis current value $I_d$ respectively changed.

The determined distortion parameters are set in the parameter setting unit 71, the calculation expressions in the d-q axis back electromotive voltage calculation unit 61 are changed to the back electromotive voltage calculation the above Eq. (17) and (18) with distortion taken into account, torque ripple measurement is performed with the actual device, and more effective values are finally determined with reference to the measurement results. At this time, since the back electromotive voltage information is also used to calculate $i_{qc}$ and $i_{qs}$, which are values necessary for calculating the aforementioned d-axis current command value $I_{dref}$ the expressions are re-created to be follows Eq. (32) and (33) below using the back electromotive voltages with distortion taken into account, and the map for the d-axis current amplitude command value $i_{dAMP}$ is also re-created.

$$i_{qc} = (K_5 E_5/K_1 C^2 E_1)I_{qDC} - (K_{1S} K_5 E_5 K_1 C^2 E_1)I_{dDC} \quad (32)$$

$$i_{qs} = (K_5 E_5/K_1 C E_1)I_{dDC} \quad (33)$$

Then, the determined distortion parameters $K_1$, $K_5$, and $\eta 5$ are set in the parameter setting unit 71.

Next, an operation of the second embodiment will be described.

First, the distortion parameters determined by the aforementioned determination method are set in the parameter setting unit 71.

When the steering wheel 1 is operated in this state, the then steering torque T is detected by the steering torque sensor 3, and a vehicle speed V is detected by the vehicle speed sensor 21. Then, the detected steering torque T and vehicle speed V are input to the steering auxiliary current command value calculation unit 51, and this steering auxiliary current command value calculation unit 51 then calculates a steering auxiliary current command value $I_{ref}$ with reference to the steering auxiliary current command value calculation map in FIG. 4, and also calculates a d-axis direct-current current command value $I_{dDC}$ and a d-axis current amplitude command value $I_{dAMP}$ based on the calculated steering auxiliary current command value $I_{ref}$ with reference to the maps.

Then, the calculated steering auxiliary current command value $I_{ref}$ is supplied to the d-axis current command value calculation unit 63 and the q-axis current command value calculation unit 62 in the vector control current command value calculation unit 52.

Meanwhile, a motor angle detection signal $\theta m$ detected by the rotor position detection circuit 13 is supplied to the electrical angle calculation unit 50 and converted to an electrical angle $\theta e$.

Then, the steering auxiliary current command value $I_{ref}$, the d-axis direct-current current command value $I_{dDC}$, the d-axis current amplitude command value $I_{dAMP}$ calculated by the steering auxiliary current command value calculation unit 51 and the electrical angle $\theta e$ are supplied to the vector control current command value calculation unit 52.

Meanwhile, $I_{adet}$ and $I_{cdet}$ detected by the current detection unit 57 and $I_{bdet}$ estimated in that detection unit are converted by the three-phase/two-phase conversion unit 72 to a d-axis current value $I_d$ and a q-axis current value $I_q$, and input to the parameter setting unit 71 included in the d-q axis back electromotive voltage calculation unit 41, distortion parameters $K_1$, $K_5$, $\eta 1$ and $\eta 5$ are output according to the input d-axis current value $I_d$ and q-axis current value $I_q$, and the d-q axis back electromotive voltage calculation unit 61 calculates a d-axis back electromotive voltage $e_{d0E}$ and a q-axis back electromotive voltage $e_{q0E}$, which are back electromotive voltages with distortion taken into account, based on the output distortion parameters $K_1$, $K_5$, $\eta 1$ and $\eta 5$ and the electrical angle $\theta e$, and supplies them to the d-axis current command value calculation unit 63 and the q-axis current command value calculation unit 62.

Thus, the d-axis current command value calculation unit 63 calculates a d-axis current command value $I_{dref}$ by performing calculation according to the above Eq. (23) based on the steering auxiliary current command value $I_{ref}$, the d-axis direct-current current command value $I_{dDC}$ and the d-axis current amplitude command value $i_{dAMP}$, and the d-axis back electromotive voltage $e_{d0E}$ and the q-axis back electromotive voltage $e_{q0E}$.

Meanwhile, the q-axis current command value calculation unit 62 calculates a q-axis current command value $I_{qref}$ that does not cause torque fluctuation, by performing calculation according to the above Eq. (18) based on the d-axis current command value $I_{dref}$, the steering auxiliary current command value $I_{ref}$ and the back electromotive voltages $e_{d0E}$ and $e_{q0E}$.

Then, the d-axis current command value $I_{dref}$ and the q-axis current command value $I_{qref}$ are supplied to the two-phase/three-phase conversion unit 64, and thereby converted to three-phase current command value $I_{aref}$, $I_{bref}$ and $I_{cref}$ and these three-phase current command values $I_{aref}$, $I_{bref}$ and $I_{cref}$ are supplied to subtractor units 53a, 53b and 53c, and $I_{adet}$ and $I_{cdet}$ detected by the motor current detection unit 57 and $I_{cdet}$ estimated in that detection unit 57 are subtracted from the three-phase current command value $I_{aref}$, $I_{bref}$ and $I_{cref}$ to calculate current deviations ΔIa, ΔIb and ΔIc. PI control of these current deviations ΔIa, ΔIb and ΔIc is performed by the PI control unit 54 to convert them to voltage command values $V_{aref}$, $V_{bref}$ and $V_{cref}$, and pulse width modulation signals are formed by the PWM control unit 55 based on these voltage command values $V_{aref}$, $V_{bref}$ and $V_{cref}$, and supplied to an inverter circuit 56 to supply three-phase currents to the electric motor 12, and as a result, the electric motor 12 is driven to generate a steering auxiliary force according to the steering auxiliary current command value $I_{ref}$. Then, the steering auxiliary force generated by the electric motor 12 is conveyed via the deceleration gear 11 to the output shaft 2b of the steering shaft 2, enabling the steering wheel 1 to be operated with a small steering force.

At this time, as described above, since the d-q axis back electromotive voltage calculation unit 61 in the vector control current command value calculation unit 52 calculates the d-axis back electromotive voltage $e_{d0E}$ and the q-axis back electromotive voltage $e_{q0E}$ using the d-axis current value and the q-axis current value, and accordingly, the d-axis back electromotive voltage $e_{d0E}$ and the q-axis back electromotive voltage $e_{q0E}$ with back electromotive voltage distortion, which is caused due to an armature magnetomotive force, taken into account can be calculated, enabling effective suppression of a torque ripple due to back electromotive voltage distortion.

Also, since the d-axis current value and the q-axis current value supplied to the parameter setting unit 71 can be calculated by estimating the remaining one phase current detection value from two phase current detection values to perform three-phase/two-phase conversion, the number of phase current detection units can be reduced, thereby enabling manufacturing cost reduction.

Figure 27:
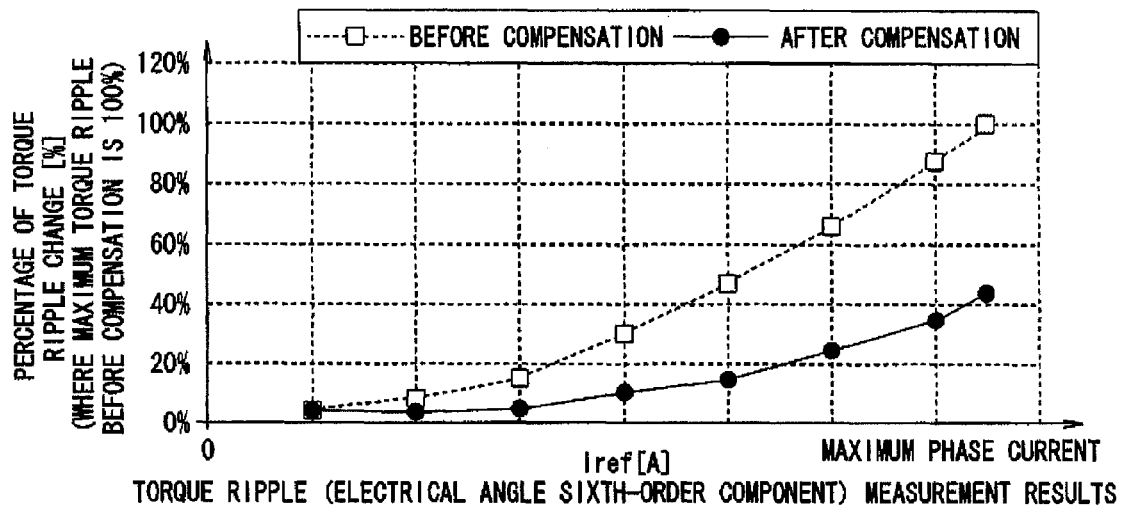
FIG. 27 shows characteristic line diagrams illustrating actual measurement results in the second embodiment.
Figure 27:
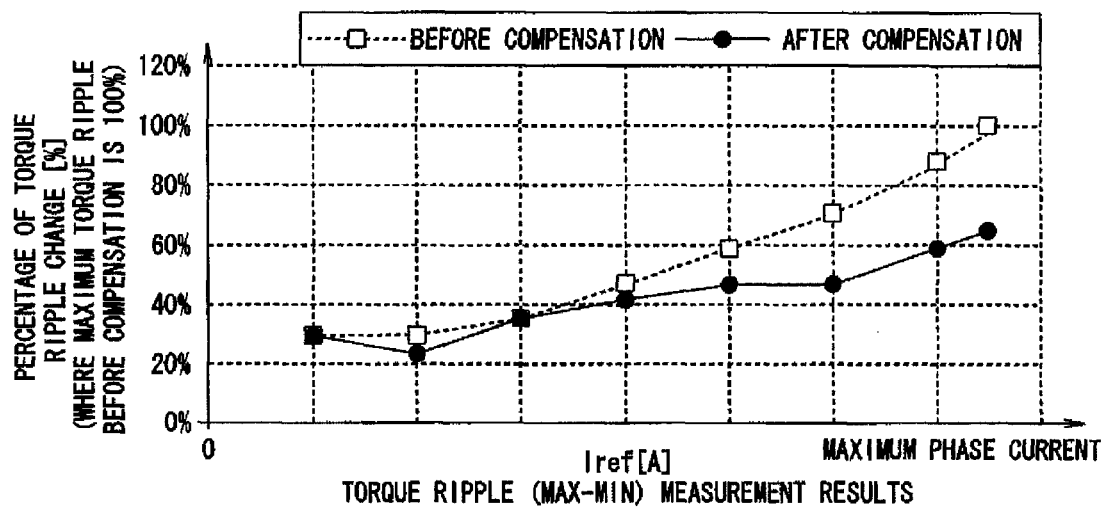
Figure 27:
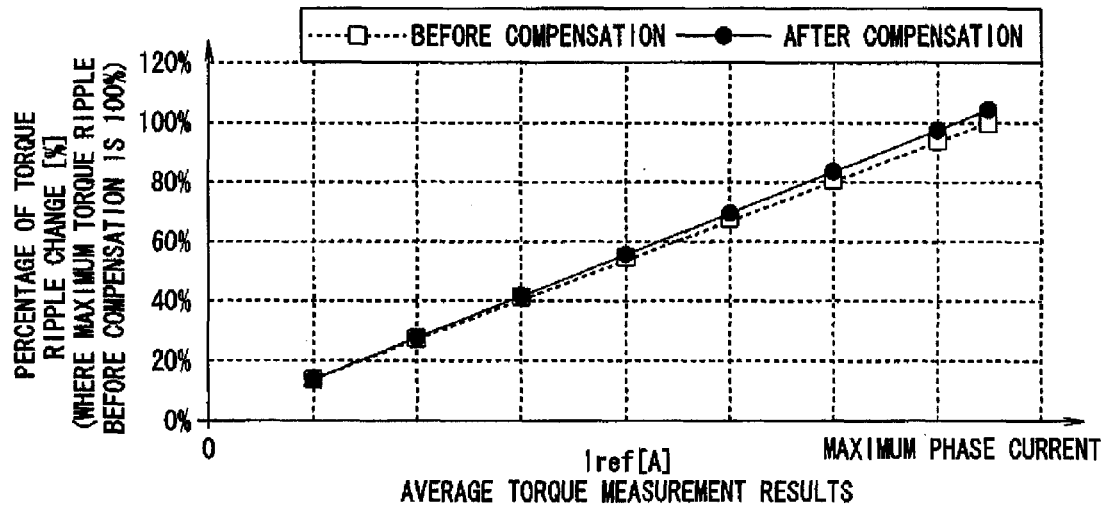

The results of actual device confirmations using the configuration of the second embodiment are shown in FIG. 27. After practicing the present technique, the torque ripple sixth-order component has been reduced and the entire torque ripple has also been reduced, whereby the effect of the present embodiment has been confirmed. Also, an increase in the average torque at a high current region has been confirmed, and the effect of improvement against torque dropping due to nonlinearity of the stator magnetization characteristics has also been confirmed.

In addition, as described above, since the d-axis current command value $I_{dref}$ is calculated by performing calculation according to the above Eq. (9), harmonic motor control effectively utilizing the power supply voltage can be performed.

Also, as in the aforementioned embodiment, the d-axis current amplitude command value $i_{dAMP}$ used for calculating the d-axis current command value $I_{dref}$ is calculated with reference to the d-axis current amplitude command value calculation map, whereby the d-axis current amplitude command value $I_{dAMP}$ can easily be calculated without performing complicated calculation according to the above Eq. (14).

Although in the second embodiment, the distortion parameters of the back electromotive voltages have been estimated from the torque ripple measurement results using an actual device, for example, where distortion parameters for back electromotive voltages are known in advance by means of a magnetic field analysis, such parameters may be used.

Also, although the second embodiment is based on the premise that, where parameters with distortion taken into account are incorporated in the d-q axis back electromotive voltage calculation unit 61, $e_{d0}$ and $e_{q0}$ are changed to $e_{d0E}$ and $e_{q0E}$, $e_{d0E}$ and $e_{q0E}$ can be calculated based on back electromotive voltages $e_{d0}$ and $e_{q0}$ with distortion not taken into account (back electromotive voltages during no current being applied) using the following expressions.

$$e_{d0E} = E_1(K_{1S}+K_{5S})+K_{5C}e_{d0}-K_{5S}e_{q0}$$

$$e_{q0E} = E_1(K_{1C}-K_{5C})+K_{5S}e_{d0}+K_{5C}e_{q0}$$

Also, although in the second embodiment, in order to avoid an increase in calculation load and diversification of estimation parameters, back electromotive voltages have been considered in terms of up to fifth-order components, this will not apply to the case where parameters are obtained in advance from magnetic analysis results or the like and high-speed calculation can thereby be performed.

Furthermore, although the second embodiment has been described in terms of the case where the d-axis current value and the q-axis current value calculated by estimating one phase current detection value from two phase current detection values actually measured by the parameter setting unit 71 in the d-q axis back electromotive voltage calculation unit 61 and performing three-phase/two-phase conversion is used, the present invention is not limited to this case, and a d-axis current value and a q-axis current value calculated by performing three-phase/two-phase conversion of actually measured three phase current detection values may be used, and in that case, estimated calculation errors can be eliminated, enabling more effective torque ripple suppression. Meanwhile, the d-axis current command value $I_{dref}$ calculated by the d-axis current command value calculation unit 63 and the q-axis current command value $I_{qref}$ calculated by the q-axis current command value calculation unit 62, or command value information corresponding to these d-axis current command value $I_{dref}$ and q-axis current command value $I_{qref}$ may be used, and in that case, the calculation load for calculation processing can be reduced.

Furthermore, although the second embodiment has been described in terms of the case where the d-axis current command value $I_{dref}$ and the q-axis current command value $I_{qref}$ are supplied to the subtractor unit 53a, 53b and 53c after being converted by the two-phase/three-phase conversion unit 64 to three phase command current values $I_{aref}$, $I_{bref}$ and $I_{cref}$, the present invention is not limited to this case, and it is possible that: the two-phase/three-phase conversion unit 64 is omitted; instead, the motor current detection values $I_{adet}$ and $I_{bdet}$ detected by the current detection unit 57 and the current value $I_{cdet}$ estimated by that detection unit are supplied to the three-phase/two-phase conversion unit to convert them to a d-axis detection current and a q-axis detection current; the deviations between the converted d-axis detection current and q-axis detection current, and the d-axis current command value $I_{dref}$ calculated by the d-axis current command value calculation unit 43 and the q-axis current command value $I_{qref}$ calculated by the q-axis current command value calculation unit 62 are calculated; and then, the deviations are subjected to two-phase/three-phase conversion and supplied to the PI control unit 54.

Furthermore, although the second embodiment has been described in terms of the case where the present invention has been applied to a three-phase brushless motor, the present invention is not limited to this case, and the present invention can also be applied to a n-phase brushless motor, n being four or more.

Furthermore, although the second embodiment has been described in terms of the case where the present invention has been applied to a motor-driven power steering system, the present invention is not limited to this case, and the present invention can also be applied to a device employing a n-phase brushless motor such as an in-vehicle motor-driven device, e.g., an electric brake, or any other motor-driven device.

The aforementioned second embodiment corresponds to the invention according to claims 9 to 15 in the CLAIMS section.

Next, a third embodiment of the present invention will be described with reference to FIG. 28.

This third embodiment reduces an back electromotive voltage compensation error where the back electromotive voltage compensation error due to back electromotive voltage distortion significantly increases at a high rotation speed and a high current, in addition to the generation of current command values in conformity to distorted back electromotive voltages to provide a constant torque in the aforementioned second embodiment.

Figure 28:
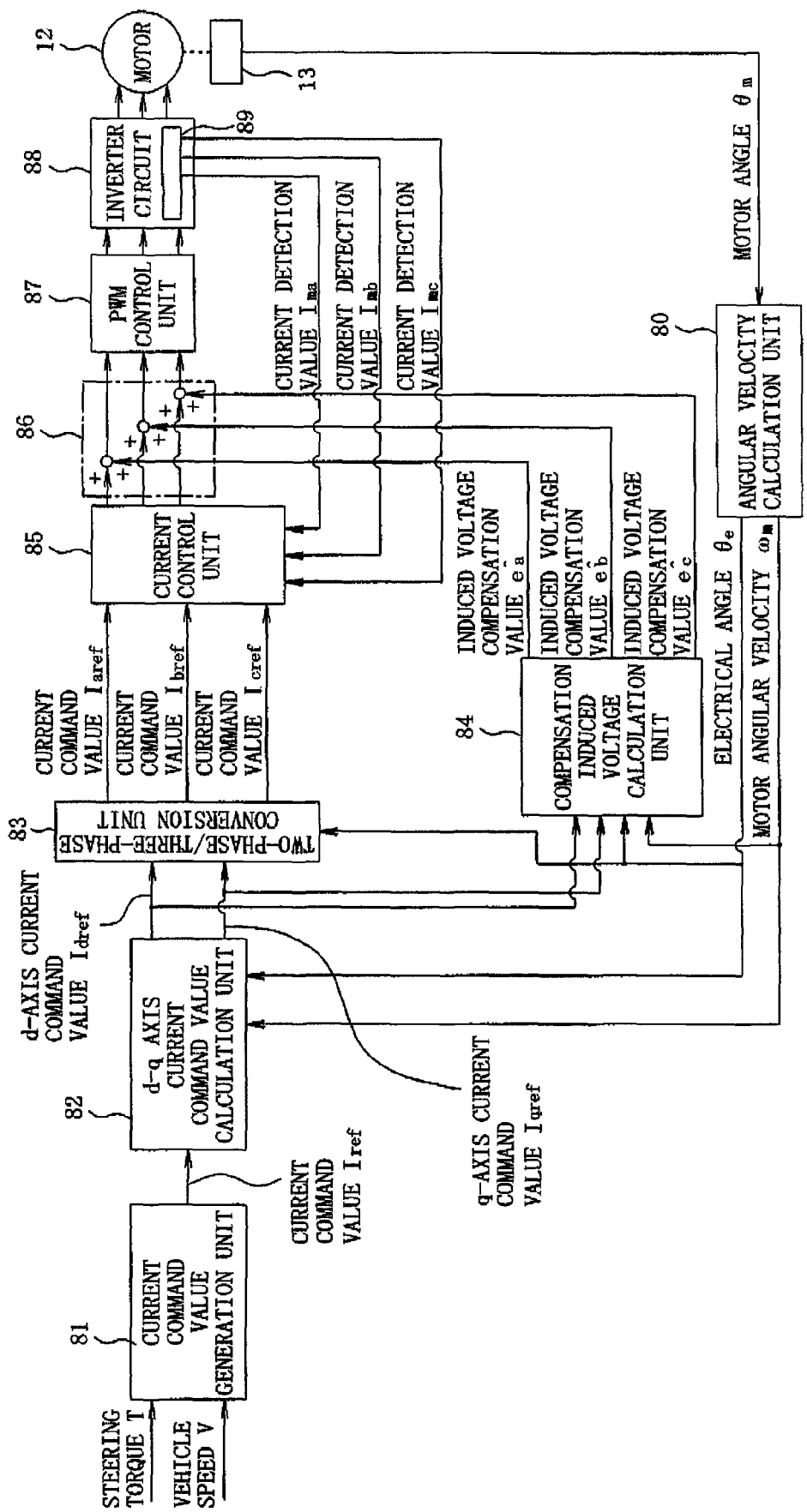
FIG. 28 is a block diagram illustrating a specific configuration of a control device according to a third embodiment of the present invention.

In other words, in the third embodiment, a control device 20, as shown in FIG. 28, includes an angular velocity calculation unit 80, a current command value generation unit 81, a d-q axis current command value calculation unit 82, a two-phase/three-phase conversion unit 83, a compensation back electromotive voltage calculation unit 84, a current control unit 85, an adder unit 86, a PWM control unit 87, and an inverter circuit 88.

The angular velocity calculation unit 80 calculates an electrical angle θe and a motor angle velocity ωm based on a motor angle θm detected by the rotor position detection circuit 13, which detects motor currents in the inverter circuit 88.

The current command value generation unit 81 receives inputs of a steering torque T detected by the steering torque sensor 3 and a vehicle speed Vs detected by the vehicle speed sensor 21, generates, based on them, a current command value $I_{ref}$ for the electric motor 12 with reference to the current command value calculation map in FIG. 4, and outputs the generated current command value $I_{ref}$ to the d-q axis current command value calculation unit 82.

The d-q axis current command value calculation unit 82 includes the d-axis current command value calculation unit 34, the back electromotive voltage model calculation unit 35 and the q-axis current command value calculation unit 36 in the first embodiment, calculates, based on the current command value $I_{ref}$ generated by the current command value generation unit 81, a d-axis current command value $I_{dref}$ and a q-axis current command value $I_{qref}$ in a d-q axis coordinate system for the electric motor 12, and outputs these d-axis current command value $I_{dref}$ and q-axis current command value $I_{qref}$ to the two-phase/three-phase conversion unit 83.

The two-phase/three-phase conversion unit 83 performs two-phase/three-phase conversion of the d-axis current command value $I_{dref}$ and the q-axis current command value $I_{qref}$ generated by the d-q axis current command value calculation unit 82, based on the electrical angle θe output from the angular velocity calculation unit 80 to calculate respective phase current command values $I_{aref}$, $I_{bref}$ and $I_{cref}$, and outputs the calculated respective phase current command values $I_{aref}$, $I_{bref}$ and $I_{cref}$ to the current control unit 85.

The compensation back electromotive voltage calculation unit 84 receives inputs of the d-axis current command value $I_{dref}$ and the q-axis current command value $I_{qref}$ output from the d-q axis current command value calculation unit 82 and the electrical angle θe and the motor angular velocity ωm output from the angular velocity calculation unit 80, performs, based on them, calculation according to follows Eq. (34) below to calculate back electromotive voltage compensation values eˆa, eˆb and eˆc for the respective phases of the electric motor 12, and outputs these back electromotive voltage compensation values eˆa, eˆb and eˆc to the adder unit 86 as feedforward compensation values.

$$e \wedge a = K_1 E_1 \omega m \sin(\theta + \eta 1) + K_5 E_5 \omega m \sin(5\theta + \eta 5) \quad (34)$$
$$e \wedge b = K_1 E_1 \omega m \sin(\theta - (2/3)\pi + \eta 1)$$
$$+ K_5 E_5 \omega m \sin(5(\theta - (2/3)\pi) + \eta 5)$$
$$e \wedge c = K_1 E_1 \omega m \sin(\theta + (2/3)\pi + \eta 1)$$
$$+ K_5 E_5 \omega m \sin(5(\theta + (2/3)\pi) + \eta 5)$$

The current control unit 85 includes the subtractor units 33a to 33c and the PI control unit 34 in the second embodiment, and receives inputs of the phase current command values $I_{aref}$, $I_{bref}$ and $I_{cref}$ output from the two-phase/three-phase conversion unit 83 and respective phase currents Ima, Imb and Imc for the electric motor 12, which are detected by the motor current detection unit 87 provided in the inverter circuit 88, to calculate current deviations $\Delta I_A$ to $\Delta I_C$, performs, for example, PI control processing on these current deviations $\Delta I_A$ to $\Delta I_C$ to calculate voltage command values $V_{aref}$ to $V_{cref}$, and outputs the calculated voltage command values $V_{aref}$ to $V_{cref}$ to the PWM control unit 87.

The PWM control unit 87 forms pulse-width modulation (PWM) signals based on the voltage command values $V_{aref}$, $V_{bref}$ and $V_{cref}$ output from the current control unit 85 and outputs them to the inverter circuit 88.

The inverter circuit 88 supplies the electric motor 12 with the phase currents Ima, Imb and Imc according to the phase current command values $I_{aref}$, $I_{bref}$ and $I_{cref}$ converted by the two-phase/three-phase conversion unit 83.

According to this third embodiment, the compensation back electromotive voltage calculation unit 84 is provided in the configuration of the control device 20 in the first and second embodiments, and this compensation back electromotive voltage calculation unit 84 calculates the back electromotive voltage compensation values eˆa, eˆb and eˆc for the respective phases of the electric motor 12 based on the d-axis current command value $I_{dref}$ and the q-axis current command value $I_{qref}$ calculated by the d-q axis current command value calculation unit 82, and the electrical angle θe and the motor angular velocity ωm calculated by the angular velocity calculation unit 80. Thus, the calculated back electromotive voltage compensation values eˆa, eˆb and eˆc become values according to distorted back electromotive voltage waveforms, and these back electromotive voltage compensation values eˆa, eˆb and eˆc are supplied to the adder unit 86 as feedforward compensation values.

Thus, since the adder unit 86 respectively adds the back electromotive voltage compensation values eˆa, eˆb and eˆc to the voltage command values $V_{aref}$, $V_{bref}$ and $V_{bref}$ output from the current control unit 85, feedforward compensation is performed using the back electromotive voltage compensation values eˆa, eˆb and eˆc according to the distorted back electromotive voltage waveforms, enabling reduction of a back electromotive voltage compensation error due to back electromotive voltage distortion, which is a current control system disturbance caused at a high rotation speed and a high current. Thus, the actual current supplied to the electric motor 12 more closely follows the current command value, providing a desired steering auxiliary torque, and also since harmonic vibration due to a compensation error is reduced, favorable steering performance can be provided.

Figure 29:
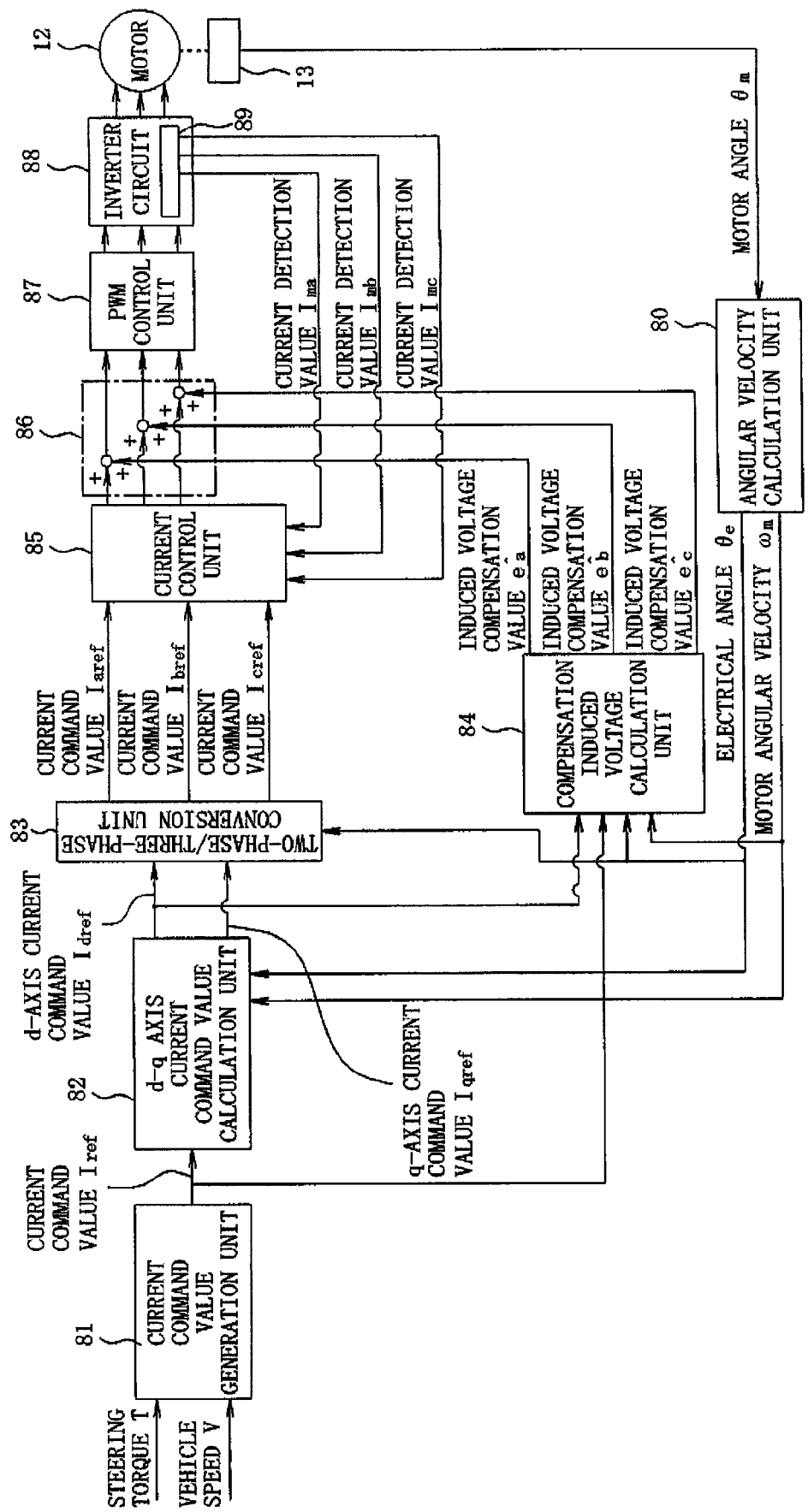
FIG. 29 is a block diagram, similar to that of FIG. 28, which illustrates a modification of the third embodiment.

Although the third embodiment has been described in terms of the case where the d-axis current command value $I_{dref}$ and the q-axis current command value $I_{qref}$ calculated by the d-q axis current command value calculation unit 82 are supplied to the compensation back electromotive voltage calculation unit 84, the present invention is not limited to this case, and since the q-axis current command value $I_{qref}$ calculated by the d-q axis current command value calculation unit 82 is calculated based on the current command value $I_{ref}$ input from the current command value generation unit 61, as shown in FIG. 29, an operational advantageous effect similar to that of the third embodiment can be provided even if the current command value $I_{ref}$ calculated by the current command value generation unit 81 is supplied to the compensation back electromotive voltage calculation unit 84 instead of the q-axis current command value $I_{qref}$.

Figure 30:
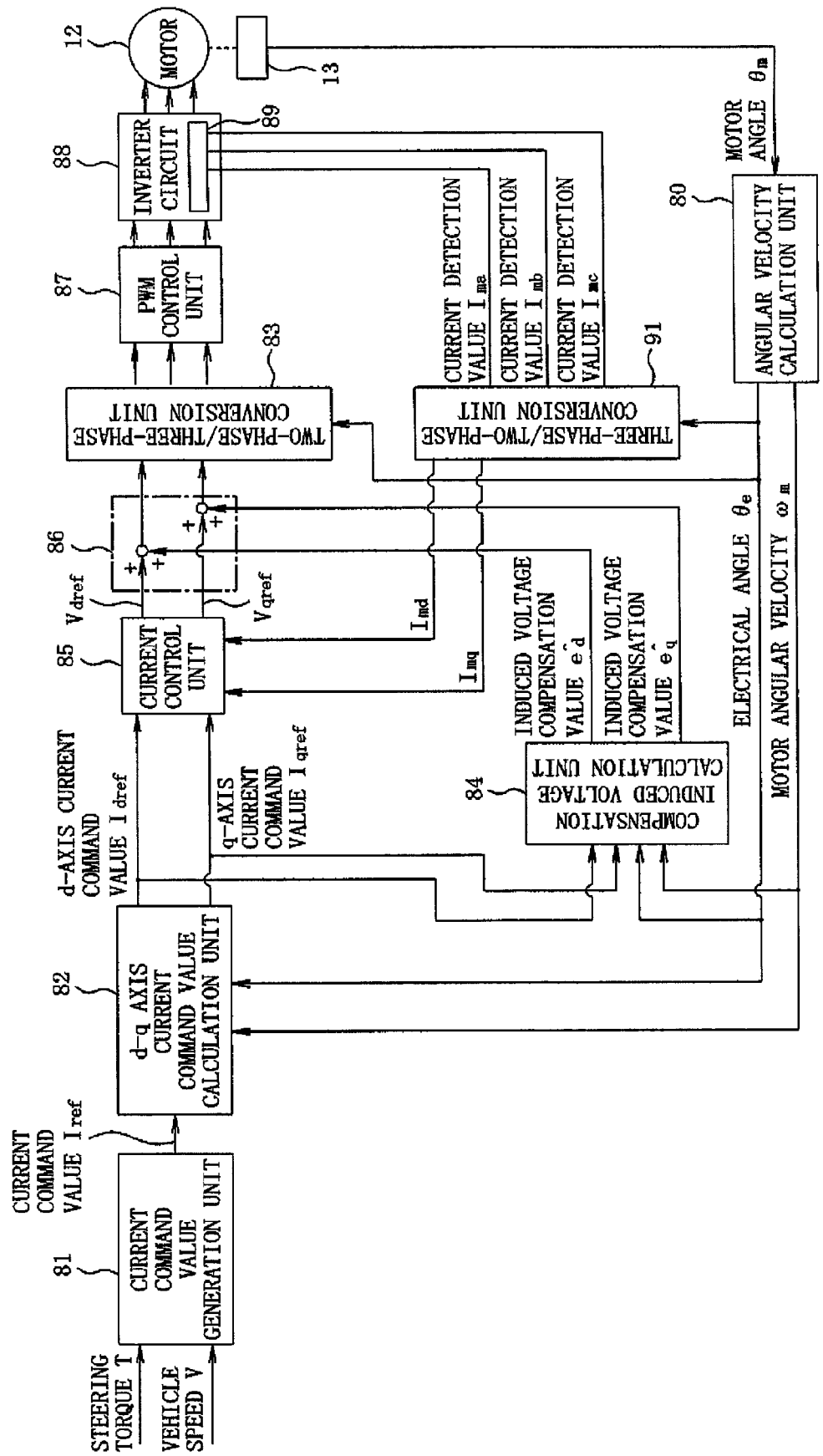
FIG. 30 is a block diagram illustrating a specific configuration of a control device, which is another modification of the third embodiment.

Also, although the second embodiment has been described in terms of the case where the compensation back electromotive voltage calculation unit 84 calculates the three phase back electromotive voltage compensation values eˆa to eˆc according to the respective phases of the electric motor 12, the present invention is not limited to this case, and as shown in FIG. 30, is configured so that: the two-phase/three-phase conversion unit 83, and the current control device 85 and the adder unit 86 are interchanged; the motor currents Ima to Imc detected by the motor current detection unit 87 are supplied to a three-phase/two-phase conversion unit 91 to convert them to a d-axis motor detection current Imd and a q-axis motor detection current Imq and supply them to the current control unit 85; the current control unit 85 calculates current deviations ΔId and ΔIq between the d-axis current command value $I_{dref}$ and the q-axis current command value $I_{qref}$ and the d-axis motor detection current Imd and the q-axis motor detection current Imq; and the calculated current deviations ΔId and ΔIq are subjected to, for example, PI control processing to calculate voltage command values $V_{dref}$ and $V_{dref}$.

Also, the compensation back electromotive voltage calculation unit 84 may be configured so as to calculate a d-axis back electromotive voltage compensation value eˆd and a q-axis back electromotive voltage compensation value eˆq based on the d-axis current command value $I_{dref}$ and the q-axis current command value $I_{qref}$ input from the d-q axis current command value calculation unit 82 and the electrical angle θe and the motor angular velocity ωm input from the angular velocity calculation unit 60 to supply the calculated d-axis back electromotive voltage compensation value eˆd and q-axis back electromotive voltage compensation value eˆq to the adder unit 86 as feedforward compensation values. In this case, the compensation back electromotive voltage calculation unit 84 only needs to calculates back electromotive voltage compensation values for two phases, i.e., d and q-axes, which enables calculation load reduction, and also enables calculation of back electromotive voltage compensation values according to the d-axis current command value $I_{dref}$ and the q-axis current command value $I_{qref}$.

Figure 31:
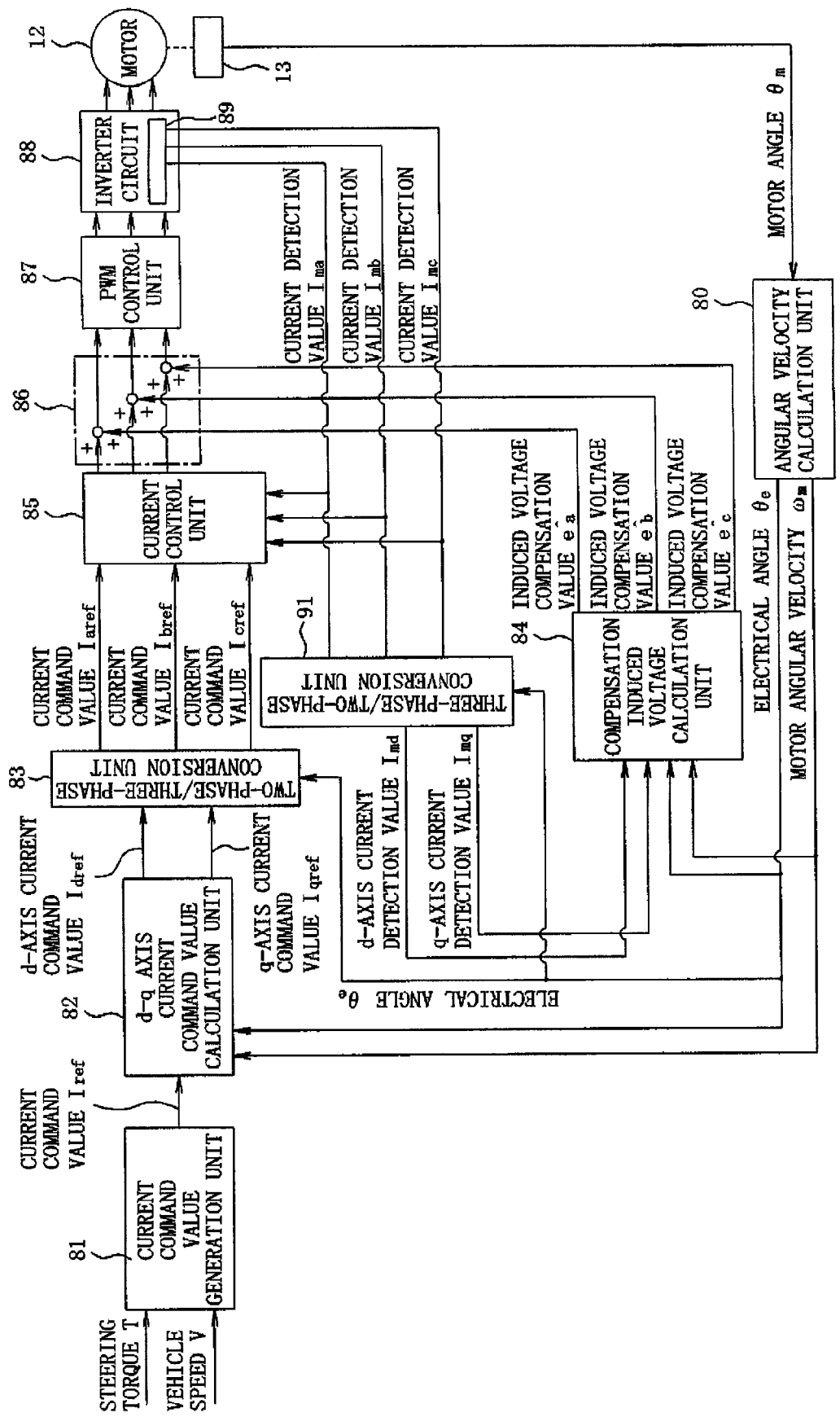
FIG. 31 is a block diagram illustrating a specific configuration of a control device, which is a still another modification of the third embodiment.

Furthermore, although the third embodiment has been described in terms of the case where the d-axis current command value $I_{dref}$ and the q-axis current command value $i_{qref}$ calculated by the d-q axis current command value calculation unit 82 are input to the compensation back electromotive voltage calculation unit 84, the present invention is not limited to this case, and as shown in FIG. 31, may be configured so that: instead of the d-axis current command value $I_{dref}$ and the q-axis current command value $I_{qref}$, the motor currents Ima to Imc detected by the motor current detection unit 87, as in FIG. 30, are supplied to the three-phase/two-phase conversion unit 91 to convert them to a d-axis current detection value Imd and a q-axis current detection value Imq; and these values are supplied to the compensation back electromotive voltage calculation unit 84 to calculate back electromotive voltage compensation values eˆa, eˆb and eˆc for the respective phases of the electric motor 12 based on these d-axis current detection value Imd and the q-axis current detection value Imq, and the electrical angle θe and the motor angular velocity ωm input from the angular velocity calculation unit 80. In this case, the back electromotive voltage compensation values can be calculated according to the current detection values.

Furthermore, although the third embodiment has been described in terms of the case where the d-q axis current command value calculation unit 82 includes the d-axis current command value calculation unit 34, the back electromotive voltage model calculation unit 35 and the q-axis current command value calculation unit 36 in the first embodiment, the present invention is not limited to this case, and may include the vector control current command value calculation unit 52 in the second embodiment, and in this case, the present invention may be configured so that the current command value generation unit 81 outputs a d-axis direct-current current command value $I_{dDC}$ and a d-axis current amplitude command value $I_{dAMP}$ based on the current command value $I_{ref}$.

Furthermore, although the third embodiment has been described in terms of the case where the present invention has been applied to a motor-driven power steering system, the present invention is not limited to this case, and the present invention can be applied to a device employing a n-phase brushless motor such as an in-vehicle motor-driven device, e.g., an electric brake, or any other motor-driven device.

INDUSTRIAL APPLICABILITY

At least, it is possible to provide a motor drive control device capable of effectively using a power supply voltage with torque kept constant by configuring target current setting means so as to output phase current command values that do not generate torque fluctuation, and provide an absolute value of a composite vector of respective phase drive voltages that is substantially constant and corresponds to a value in the neighborhood of a value √3/2 times a power supply voltage including the value √3/2 times the power supply voltage, and a motor-driven power steering system using this motor drive control device.

Also, since a vector control current command value calculation unit calculates a d-axis back electromotive voltage and a q-axis back electromotive voltage based on a motor electrical angle, a d-axis current value and a q-axis current value, such voltages can be calculated including back electromotive voltage distortion relative to motor phase currents, and accordingly it is possible to provide a motor drive control device also capable of effectively suppressing a torque ripple due to back electromotive voltage distortion by using the calculated d-axis back electromotive voltage and q-axis back electromotive voltage for calculation of a q-axis current command value, and a motor-driven power steering system using the motor drive control device.

Furthermore, it is possible to provide a motor drive control device capable of reducing an back electromotive voltage compensation error, which is a current control system disturbance, by calculating compensation back electromotive voltages and performing feedforward compensation using these compensation back electromotive voltages, whereby the actual current more closely follows a current command value, a desired torque can be provided, and also harmonic vibration due to an compensation error can be reduced, and a motor-driven power steering system using this motor drive control device.

The invention claimed is:

1. A motor control device, comprising: phase current detection means for detecting phase currents in a three-phase brushless motor; rotor rotational position detection means for detecting a rotational position of a rotor in the three-phase brushless motor; target current setting means for setting a target current for the three-phase brushless motor, and outputting motor phase current command values based on the target current and the rotor rotational position detected by the rotor rotational position detection means; drive voltage control means for controlling drive voltages based on the motor phase current command values output from the target current setting means and the phase currents detected by the phase current detection means; and a motor drive circuit that supplies phase currents to the three-phase brushless motor based on the drive voltages of the drive voltage control means, wherein the target current setting means is configured to output phase current command values that do not cause torque fluctuation, and provide an absolute value of a composite vector of the drive voltages of the respective phases that is substantially constant and corresponds to a value in the neighborhood of a value $\sqrt{3}/2$ times a power supply voltage including the value $\sqrt{3}/2$ times the power supply voltage.

2. The motor control device according to claim 1, wherein the target current setting means is configured to perform current control via a d-q coordinates obtained by conversion into two axes of a rotor rotation coordinate system based on the target current and the rotor rotational position detected by the rotor rotational position detection means.

3. The motor control device according to claim 1, wherein the target current setting means is configured to perform current control via a d-q coordinates obtained by conversion into two axes of a rotor rotation coordinate system based on the target current and the rotor rotational position detected by the rotor rotational position detection means, and includes a d-axis current determination means for calculating an alternate-current d-axis current value that provides driving at a frequency six times one cycle for an electrical angle and in a phase that is opposite or the same as that of an absolute value of a q-axis current based on at least the target current, the rotor electrical angle, a rotor electrical angular velocity and motor constant information, and q-axis current determination means for calculating a q-axis current based on the d-axis current value determined by the d-axis current determination means, the target current, the rotor electrical angle and the motor constant information, according to a conditional expression for a constant torque, and determines the motor phase current command values so that motor drive voltage waveforms that provide small fluctuation of an absolute value for a composite vector of drive voltages of the respective phases, the motor drive voltage waveforms suppressing torque fluctuation and effectively using a power supply voltage, are provided.

4. The motor control device according to claim 3, wherein the alternate-current d-axis current determination means is provided in advance with a control map indicating a relationship between the target current and d-axis amplitude, and is configured to calculate the d-axis amplitude of the alternate-current d-axis current value from the target current with reference to the control map.

5. A motor-driven power steering system characterized by controlling driving of a three-phase brushless motor that generates a steering auxiliary force for a steering system via the motor control device according to claim 1.

6. A motor control device, comprising: phase current detection means for detecting phase currents in a three-phase brushless motor; rotor rotational position detection means for detecting a rotational position of a rotor in the three-phase brushless motor; target current setting means for setting target phase currents for the three-phase brushless motor, and outputting phase current command values based on the target phase currents and the rotor rotational position detected by the rotor rotational position detection means; drive voltage control means for controlling drive voltages based on the phase current command values output from the target current setting means and the phase currents detected by the phase current detection means; and a motor drive circuit that supplies phase currents to the three-phase brushless motor based on the drive voltages of the drive voltage control means, wherein the target current setting means includes lead angle control means for, when back electromotive voltages contain a harmonic component other than a fundamental component, performing lead angle control of waveforms of the phase current command values to enhance motor rotation performance for waveforms of the back electromotive voltages, and is configured to output phase current command values that do not cause torque fluctuation, and provide an absolute value of a composite vector of the drive voltages of the respective phases that is substantially constant and corresponds to a value in the neighborhood of a value $\sqrt{3}/2$ times a power supply voltage including the value $\sqrt{3}/2$ times the power supply voltage, during the lead angle control by the lead angle control means.

7. The motor control device according to claim 6, wherein the target current setting means is configured to perform current control via a d-q coordinates obtained by conversion into two axes of a rotor rotation coordinate system based on at least the target currents and the rotor rotational position detected by the rotor rotational position detection means, and includes a direct-current d-axis current determination means for determining a direct-current d-axis current value from a relationship between the target currents and a rotor angular velocity, an alternate-current d-axis current determination means for calculating an alternate-current d-axis current value that provides driving at a frequency six times one cycle for an electrical angle and in a phase that is opposite or the same as that of an absolute value of a q-axis current based on at least the target currents, the rotor electrical angle, a rotor electrical angular velocity and motor constant information, and q-axis current determination means for calculating a q-axis current based on the direct-current d-axis current value, the alternate-current d-axis current value, the target currents, the rotor electrical angle and the motor constant information, according to a conditional expression for a constant torque, and determines the motor phase current command values so that motor drive voltage waveforms that provide small fluctuation of an absolute value for a composite vector of the drive voltages of the respective phases, the motor drive voltage waveforms suppressing torque fluctuation and effectively using a power supply voltage even during lead angle control, are provided.

8. The motor control device according to claim 7, wherein the alternate-current d-axis current determination means is provided in advance with a control map indicating a relationship between the target currents and d-axis amplitude, and is configured to calculate the d-axis amplitude of the alternate-current d-axis current value from the target currents with reference to the control map.

9. A motor drive control device for driving an electric motor having a number of phases, the number being no less than three, comprising: a current command value calculation unit that calculates a current command value for driving the electric motor; and a vector control current command value calculation unit that calculates a phase current command value for each phase of the electric motor using vector control, wherein the vector control current command value calculation unit at least includes: a d-q axis back electromotive voltage calculation unit that calculates, from a back electromotive voltage of each phase of the electric motor, a d-axis back electromotive voltage and a q-axis back electromotive voltage that are a d-axis component and a q-axis component of a back electromotive voltage; a d-q axis current command value calculation unit that calculates a d-axis current command value and a q-axis current command value based on the d-axis back electromotive voltage, the q-axis back electromotive voltage, and the current command value, the d-q axis back electromotive voltage calculation unit being configured to calculate the d-axis back electromotive voltage and the q-axis back electromotive voltage using a motor electrical angle, a d-axis current value and a q-axis current value.

10. The motor drive control device according to claim 9, wherein the motor drive control device includes a motor current detection unit that detects a motor phase current for each phase of the electric motor, and the d-q axis back electromotive voltage calculation unit is configured to calculate the d-axis back electromotive voltage and the q-axis back electromotive voltage based on the d-axis current value and the q-axis current value obtained by performing n-phase/two-phase conversion of the motor phase currents detected by the motor current detection unit, and the motor electrical angle.

11. The motor drive control device according to claim 10, wherein the motor current detection unit is configured to estimate a phase current detection value for at least one phase based on a remaining phase current detection value.

12. The motor drive control device according to claim 9, wherein the d-q axis back electromotive voltage calculation unit is configured to calculate the d-axis back electromotive voltage and the q-axis back electromotive voltage based on the d-axis current command value and the q-axis current command value or command value information corresponding to the d-axis current command value and the q-axis current command value, and the motor electrical angle.

13. The motor drive control device according to claim 9, wherein the electric motor is a brushless motor.

14. The motor drive control device according to claim 9, wherein the back electromotive voltage of the electric motor is either a rectangular-wave back electromotive voltage or a pseudo-rectangular-wave back electromotive voltage with a sine wave containing a harmonic component.

15. A motor-driven power steering system characterized by controlling driving of an electric motor that generates a steering auxiliary force for a steering system, via the motor drive control device according to claim 9.

16. A motor drive control device for driving an electric motor having a number of phases, n being no less than 3, characterized by comprising: a current command value calculation unit that calculates a current command value for driving the electric motor; a motor angle detection unit that detects a motor angle of the electric motor; a motor angular velocity detection unit that detects a motor angular velocity of the electric motor; and an back electromotive voltage calculation unit that calculates a compensation back electromotive voltage based on at least one of d-axis current and q-axis current values calculated according to d-q coordinates rotating at the motor angular velocity, and the motor angular velocity and the motor angle, wherein feedforward compensation is performed for a back electromotive voltage of the electric motor using the compensation back electromotive voltage calculated by the back electromotive voltage calculation unit, wherein the feedforward compensation for a back electromotive voltage is performed on d-q coordinates that rotate at a frequency corresponding the motor angular velocity.

17. The motor drive control device according to claim 16, wherein at least one of the d-axis current value and the q-axis current value input to the back electromotive voltage calculation unit is at least one of a d-axis current command value and a q-axis current command value calculated from the current command value, or command value information corresponding to at least one of the d-axis current command value and the q-axis current command value.

18. The motor drive control device according to claim 16, wherein at least one of a d-axis current and a q-axis current input to the back electromotive voltage calculation unit is at least one of a d-axis current value and a q-axis current value obtained by performing n-phase/two-phase conversion of detection phase currents detected by the current detection unit via the d-q coordinates that rotate at a frequency corresponding the motor angular velocity.

19. The motor drive control device according to claim 16, wherein the back electromotive voltage of the electric motor is either a rectangular-wave back electromotive voltage or a pseudo-rectangular-wave back electromotive voltage with a sine wave containing a harmonic component.

20. A motor-driven power steering system characterized by controlling driving of an electric motor that generates a steering auxiliary force for a steering system, via the motor drive control device according to claim 16.

* * * * *